(12) United States Patent
Kondo et al.

(10) Patent No.: US 8,264,600 B2
(45) Date of Patent: Sep. 11, 2012

(54) IMAGE PROCESSING APPARATUS FOR CONVERTING A LOWER RESOLUTION IMAGE INTO A HIGHER RESOLUTION IMAGE USING CYCLIC COEFFICIENTS

(75) Inventors: Tetsujiro Kondo, Tokyo (JP); Masashi Uchida, Tokyo (JP); Takuo Morimura, Kanagawa (JP); Daisuke Kikuchi, Tokyo (JP); Takeshi Miyai, Kanagawa (JP); Hideo Kasama, Tokyo (JP); Takeshi Kunihiro, Kanagawa (JP); Yoshiaki Nakamura, Tokyo (JP); Hideki Mori, Kanagawa (JP); Yasuhiko Suga, Kanagawa (JP); Kenichiro Hosokawa, Kanagawa (JP); Shizuo Chikaoka, Tokyo (JP)

(73) Assignee: Sony Corporation, Tokyo (JP)

( * ) Notice: Subject to any disclaimer, the term of this patent is extended or adjusted under 35 U.S.C. 154(b) by 1309 days.

(21) Appl. No.: 11/687,294

(22) Filed: Mar. 16, 2007

(65) Prior Publication Data
US 2007/0216802 A1   Sep. 20, 2007

(30) Foreign Application Priority Data
Mar. 16, 2006   (JP) ................................. 2006-073558

(51) Int. Cl.
*H04N 7/01* (2006.01)
*H04N 11/20* (2006.01)
(52) U.S. Cl. ................ 348/441; 348/452; 710/5; 710/6; 710/15; 710/16; 358/1.8; 358/518; 358/521
(58) Field of Classification Search .................. 348/441, 348/452; 710/5, 6, 15, 16; 358/1.8, 518, 358/521
See application file for complete search history.

(56) References Cited

U.S. PATENT DOCUMENTS

| 5,317,397 | A | * | 5/1994 | Odaka et al. ............. 375/240.15 |
| 5,666,164 | A | | 9/1997 | Kondo et al. |
| 6,760,067 | B1 | * | 7/2004 | Sano et al. .................... 348/241 |
| 7,047,325 | B2 | * | 5/2006 | Kondo et al. .................... 710/16 |
| 2005/0264693 | A1 | * | 12/2005 | Kondo et al. ................. 348/458 |
| 2007/0216801 | A1 | * | 9/2007 | Kondo et al. ................. 348/452 |

FOREIGN PATENT DOCUMENTS
JP   7-79418   3/1995

* cited by examiner

*Primary Examiner* — Liangche A Wang
(74) *Attorney, Agent, or Firm* — Oblon, Spivak, McClelland, Maier & Neustadt, L.L.P.

(57) ABSTRACT

An image processing apparatus includes a converter converting an interlace image including a first number of pixels into a first progressive image, an interpolator interpolating the first progressive image to generate a second progressive image including a second number of pixels, a classification unit classifying, in accordance with a feature of the second progressive image, into classes, subject pixels forming a third progressive image, which serves as a target image, including the second number of pixels and having a quality higher than the second progressive image, a storage unit storing a prediction coefficient for each of the classes obtained by conducting learning using a plurality of progressive images, each including the second number of pixels, and a computation unit performing computation using the second progressive image and the prediction coefficient for each of the classes to determine the third progressive image from the second progressive image.

5 Claims, 43 Drawing Sheets

BACKGROUND ART

BACKGROUND ART

IMAGE PROCESSING APPARATUS FOR CONVERTING A LOWER RESOLUTION IMAGE INTO A HIGHER RESOLUTION IMAGE USING CYCLIC COEFFICIENTS

CROSS REFERENCES TO RELATED APPLICATIONS

The present invention contains subject matter related to Japanese Patent Application JP 2006-073558 filed in the Japanese Patent Office on Mar. 16, 2006, the entire contents of which are incorporated herein by reference.

BACKGROUND OF THE INVENTION

1. Field of the Invention

The present invention relates to image processing apparatuses and methods, and programs, and more particularly, to an image processing apparatus and method, and a program that allow accurate conversion of an input image into a high-quality image having the number of pixels different from that of the input image.

2. Description of the Related Art

The assignee of this application previously proposed conversion processing for converting a standard definition (SD) image into a high definition (HD) image in, for example, Japanese Unexamined Patent Application Publication No. 7-79418. In this conversion processing, an HD image is predicted from an input SD image. More specifically, features of a plurality of pixels in a predetermined area in the input SD image are determined by performing adaptive dynamic range coding (ADRC) processing. Then, in accordance with the determined features, subject pixels of the HD image to be determined from the SD image are allocated into classes, and then, a linear expression of predictive coefficients which have been determined for the individual classes by learning processing, and the pixel values of the plurality of pixels in the predetermined area of the input SD image are calculated, so that the HD image can be predicted from the input SD image.

FIG. 1 is a block diagram illustrating a typical example of a conversion device 1 that performs known conversion processing.

The conversion device 1 shown in FIG. 1 includes a class tap extracting unit 11, an ADRC processor 12, a prediction coefficient memory 13, a prediction tap extracting unit 14, and a prediction computation unit 15.

An interlace SD image is input into the conversion device 1, and is then supplied to the class tap extracting unit 11 and the predictive tap extracting unit 14.

The class tap extracting unit 11 sequentially selects the pixels forming an interlace HD image to be determined from the input interlace SD image as subject pixels, and extracts some of the pixels forming the SD image as class taps, which are used for classifying the subject pixels. The class tap extracting unit 11 then supplies the extracted class taps to the ADRC processor 12.

The ADRC processor 12 performs ADRC processing on the pixel values of the pixels forming the class taps supplied from the class tap extracting unit 11 to detect the ADRC code as the feature of the waveform of the class taps.

In K-bit ADRC processing, the maximum value MAX and the minimum value MIN of the pixel values of the pixels forming the class taps are detected, and DR=MAX−MIN is set as the local dynamic range of a set, and then, the pixel values of the pixels forming the class taps are re-quantized into K bits based on the dynamic range. That is, the minimum value MIN is subtracted from the pixel value of each pixel forming the class taps and the resulting value is divided by $DR/2^K$.

Then, the K-bit pixel values of the pixels forming the class taps are arranged in a predetermined order, resulting in a bit string, which is then output as the ADRC code. Accordingly, if one-bit ADRC processing is performed on the class taps, the pixel value of each pixel forming the class taps is divided by the average of the maximum value MAX and the minimum value MIN so that it is re-quantized into one bit with the decimal fractions omitted. That is, the pixel value of each pixel is binarized. Then, a bit string of the one-bit pixel values arranged in a predetermined order is output as the ADRC code.

The ADRC processor 12 determines the class based on the detected ADRC code to classify each subject pixel, and then supplies the determined class to the prediction coefficient memory 13. For example, the ADRC processor 12 directly supplies the ADRC code to the prediction coefficient memory 13 as the class.

The prediction coefficient memory 13 stores a prediction coefficient for each class obtained by learning discussed below with reference to FIG. 7. The prediction coefficient memory 13 reads out the prediction coefficient according to the class supplied from ADRC processor 12, and supplies the read prediction coefficient to the prediction computation unit 15.

The prediction tap extracting unit 14 extracts, from the input interlace SD image, as prediction taps, some of the pixels forming the SD image used for predicting the pixel value of a subject pixel. More specifically, the prediction tap extracting unit 14 extracts, from the SD image, as prediction taps, pixels corresponding to the subject pixel, for example, a plurality of pixels of the SD image spatially closer to the subject pixel. The prediction tap extracting unit 14 then supplies the extracted prediction taps to the prediction computation unit 15.

The prediction taps and the class taps may have the same tap structure or different tap structures.

The prediction computation unit 15 performs prediction computation, such as linear expression computation, for determining the prediction value of the true value of the subject pixel by using the prediction taps supplied from the prediction tap extracting unit 14 and the prediction coefficient supplied from the prediction coefficient memory 13. Then, the prediction computation unit 15 predicts the pixel value of the subject pixel, i.e., the pixel value of a pixel forming the interlace HD image, and outputs the predicted pixel value.

FIG. 2 illustrates an example of the tap structure of the class taps extracted by the class tap extracting unit 11 shown in FIG. 1. In FIG. 2, the white circles indicate the pixels of the SD image, and the rhomboids designate the pixels of the HD image. The same applies to FIG. 3.

In FIG. 2, the class taps are formed of nine pixels, and more specifically, pixels in the m-th (m=1, 2, . . . ,) field of the SD image, such as a pixel 23 corresponding to a subject pixel 27, pixels 20 and 26 that are adjacent to the pixel 23 in the upward direction and the downward direction, respectively, pixels 21 and 22 adjacent to the pixel 23 in the leftward direction, and pixels 24 and 25 adjacent to the pixel 23 in the rightward direction, and pixels in the (m−1)-th field of the SD image, such as pixels 29 and 30 adjacent to a position 28 corresponding to the pixel 23 in the upward direction and the downward direction, respectively.

FIG. 3 illustrates an example of the tap structure of the prediction taps extracted by the prediction tap extracting unit 14 shown in FIG. 1.

In FIG. 3, the prediction taps are formed of 13 pixels, and more specifically, pixels in the m-th (m=1, 2, ...,) field of the SD image, such as a pixel 43 corresponding to a subject pixel 47, pixels 40 and 46 that are adjacent to the pixel 43 in the upward direction and the downward direction, respectively, pixels 41 and 42 adjacent to the pixel 43 in the leftward direction, and pixels 44 and 45 adjacent to the pixel 43 in the rightward direction, and pixels in the (m−1)-th field of the SD image, such as pixels 50 and 53 adjacent to a position 48 corresponding to the pixel 43 in the upward direction and the downward direction, respectively, pixels 49 and 51 adjacent to the pixel 50 in the leftward direction and the rightward direction, respectively, and pixels 52 and 54 adjacent to the pixel 53 in the leftward direction and the rightward direction, respectively.

FIGS. 4 and 5 illustrate positional relationships between the pixels of the interlace SD image input into the conversion device 1 and the pixels of the interlace HD image output from the conversion device 1.

In FIGS. 4 and 5, the white circles indicate the pixels of odd-numbered fields of the SD image, while the black circles designate the pixels of even-numbered fields of the SD image. The white rhomboids indicate the pixels of the odd-numbered fields forming a predetermined frame of the HD image, while the black rhomboids designate the pixels of the even-numbered fields of the HD image. The interval between the pixels of the HD image in the vertical and horizontal directions is 1.

FIG. 4 illustrates the positional relationship between the pixels of the HD image and the pixels of the SD image in the vertical direction. In FIG. 4, the horizontal axis represents the time, and the vertical axis designates the vertical position of the pixels.

A pixel 71 of the odd-numbered field of the SD image is vertically located, as shown in FIG. 4, at a position away from a pixel 61 of the HD image, which is positioned vertically closest to the pixel 71, by ½, i.e., a position away from a pixel 62 immediately under the pixel 61 by 3/2.

A pixel 72 of the even-numbered field of the SD image is vertically located, as shown in FIG. 4, at a position away from a pixel 64 of the HD image, which is positioned vertically closest to the pixel 72, by ½, i.e., a position away from a pixel 63 immediately above the pixel 64 by 3/2.

FIG. 5 illustrates the positional relationship between the pixels of the HD image and the pixels of the SD image in the horizontal direction. For the convenience of representation, the image in which odd-numbered fields and even-numbered fields are combined is shown in FIG. 5.

The pixel 71 of an odd-numbered filed and the pixel 72 of an even-numbered field of the SD image are horizontally positioned between the pixel 61 of the HD image positioned horizontally closest to the pixels 71 and 72 and a pixel 81 positioned right-adjacent to the pixel 61. That is, the pixels 71 and 72 are horizontally located at a position away from the pixel 61 by ½ in the rightward direction and away from the pixel 81 by ½ in the leftward direction.

Accordingly, since there is a difference in the number of pixels between the SD image before conversion and the HD image after conversion, i.e., there is a difference in the sampling frequency therebetween, the positions of the pixels of the HD image are displaced from that of the SD image.

Prediction processing performed by the conversion device 1 shown in FIG. 1 for predicting an interlace HD image is described below with reference to the flowchart in FIG. 6. This prediction processing is started when, for example, an interlace SD image is input into the conversion device 1.

In step S1, the class tap extracting unit 11 selects, as a subject pixel, one of the pixels forming the interlace HD image to be determined from the input interlace SD image.

In step S2, the class tap extracting unit 11 then extracts, as class taps, some of the pixels forming the input SD image, such as those shown in FIG. 2, used for classifying the subject pixel selected in step S1, and supplies the extracted class taps to the ADRC processor 12.

In step S3, the ADRC processor 12 performs ADRC processing on the pixel values of the pixels forming the class taps supplied from the class tap extracting unit 11, and sets the resulting ADRC code as the feature of the class taps.

In step S4, the ADRC processor 12 determines the class based on the ADRC code to classify the subject pixel, and then supplies the determined class to the prediction coefficient memory 13.

In step S5, the prediction tap extracting unit 14 extracts, as prediction taps, some of the pixels forming the input SD image, such as those shown in FIG. 3, used for predicting the pixel value of the subject pixel. The prediction tap extracting unit 14 then supplies the extracted prediction taps to the prediction computation unit 15.

In step S6, based on the class supplied from the ADRC processor 12, the prediction coefficient memory 13 reads out the prediction coefficient corresponding to the class and supplies the prediction coefficient to the prediction computation unit 15.

In step S7, the prediction computation unit 15 performs prediction computation, for example, linear expression computation, for determining the prediction value of the true value of the subject pixel by using the prediction taps supplied from the prediction tap extracting unit 14 and the prediction coefficient supplied from the prediction coefficient memory 13.

In step S8, the prediction computation unit 15 outputs the predicted pixel value of the subject pixel as a result of the prediction computation, i.e., the pixel value of the corresponding pixel forming the interlace HD image.

In step S9, the class tap extracting unit 11 determines whether all the pixels forming the interlace HD image determined from the input interlace SD image have been selected as the subject pixels.

If it is determined in step S9 that not all the pixels forming the HD image have been selected as the subject pixels, the process proceeds to step S10. In step S10, the class tap extracting unit 11 selects a pixel which has not been selected as the subject pixel, and returns to step S2. Steps S2 and the subsequent steps are then repeated. If it is determined in step S9 that all the pixels forming the HD image have been selected as the subject pixels, the prediction processing is completed.

As discussed above, the conversion device 1 predicts an HD image from an input SD image and outputs the predicted HD image. That is, the conversion device 1 converts an SD image into an HD image and outputs the converted HD image.

FIG. 7 is a block diagram illustrating the configuration of a learning device 90 that conducts learning for determining a prediction coefficient for each class to be stored in the prediction coefficient memory 13 shown in FIG. 1.

The learning device 90 shown in FIG. 7 includes a two-dimensional decimation filter 91, a class tap extracting unit 92, an ADRC processor 93, a prediction tap extracting unit 94, a normal equation generator 95, a prediction coefficient generator 96, and a prediction coefficient memory 97.

A target interlace HD image obtained after prediction read from a database (not shown) is input into the learning device 90, and is then supplied to the two-dimensional decimation filter 91 and the normal equation generator 95.

The two-dimensional decimation filter 91 decimates the pixels of the input interlace HD image in the horizontal and vertical directions to reduce the number of pixels by ½. That is, the two-dimensional decimation filter 91 generates a learner image, which is an interlace SD image corresponding to the original image before prediction, from the input interlace HD image. The two-dimensional decimation filter 91 then supplies the learner image to the class tap extracting unit 92 and the prediction tap extracting unit 94.

The class tap extracting unit 92, which is similarly configured to the class tap extracting unit 11 shown in FIG. 1, sequentially selects the pixels forming the supervisor image as subject supervisor pixels, and extracts class taps, such as those shown in FIG. 2. The class tap extracting unit 92 then supplies the class taps to the ADRC processor 93.

The ADRC processor 93, which is similarly configured to the ADRC processor 12 shown in FIG. 1, performs ADRC processing on the pixel values of the pixels forming the class taps supplied from the class tap extracting unit 92, and sets the resulting ADRC code as the feature of the class taps. The ADRC processor 93 determines the class based on the ADRC code and supplies the determined class to the normal equation generator 95.

The prediction tap extracting unit 94, which is similarly configured to the prediction tap extracting unit 14 shown in FIG. 1, extracts, from the learner image supplied from the two-dimensional decimation filter 91, as prediction taps, such as those shown in FIG. 3, some of the pixels forming the learner image used for predicting the pixel value of the subject supervisor pixel. The prediction tap extracting unit 94 then supplies the prediction taps to the normal equation generator 95.

The normal equation generator 95 establishes normal equations for each class supplied from the ADRC processor 93 by using the input supervisor image and a prediction tap supplied from the prediction tap extracting unit 94 as a learning pair used for learning the prediction coefficient. The normal equation generator 95 then supplies the normal equations to the prediction coefficient generator 96.

The prediction coefficient generator 96 solves the normal equations for each class supplied from the normal equation generator 95 to determine the prediction coefficient that statistically minimizes a prediction error for each class. The prediction coefficient generator 96 then supplies the prediction coefficient to the prediction coefficient memory 97 and stores it. The prediction coefficient stored in the prediction coefficient memory 97 is to be stored in the prediction coefficient memory 13 shown in FIG. 1.

In this manner, the conversion device 1 converts an SD image into an HD image by using the prediction coefficient that minimizes the prediction error, which is obtained by the learning device 90, thereby achieving high-precision conversion processing.

SUMMARY OF THE INVENTION

As stated above, however, there is a positional displacement between the pixels of an SD image and the pixels of an HD image. Inevitably, therefore, the conversion device 1 should use prediction taps, which are pixels of the SD image horizontally and vertically out of phase with a subject pixel of an HD image, to predict the pixel value of the subject pixel of the HD image.

As a result, the conversion device 1 sometimes fails to accurately predict the HD image. In particular, if the difference in the number of pixels between an SD image and an HD image is large, the spatial waveform continuity of the HD image may be lost.

It is thus desirable to accurately convert an input image into a high-quality image having the number of pixels different from the input image.

According to an embodiment of the present invention, there is provided an image processing apparatus including conversion means for converting an interlace image including a first number of pixels into a first progressive image, interpolation means for interpolating the first progressive image to generate a second progressive image including a second number of pixels which are equal to the number of pixels of a target image, classification means for classifying, in accordance with a feature of the second progressive image, into classes, subject pixels forming a third progressive image, which serves as the target image, including the second number of pixels and having a quality higher than the second progressive image, the third progressive image being determined from the second progressive image, storage means for storing a prediction coefficient for each of the classes, the prediction coefficient being obtained by conducting learning using a plurality of progressive images, each including the second number of pixels, and computation means for performing computation using the second progressive image and the prediction coefficient for each of the classes into which the subject pixels are classified to determine the third progressive image, which serves as the target image, from the second progressive image.

The conversion means may include interlace-progressive conversion means for converting the interlace image into a progressive intermediate image, motion-vector detection means for detecting motion vectors of the interlace image by using, as a minimum unit, a distance shorter than an interval between pixels forming the intermediate image, cyclic-coefficient setting means for setting, based on a vertical motion, which is a vertical component of each of the motion vectors, a first cyclic coefficient for a first type of pixel that is located at a position where a pixel forming the interlace image exists, and a second cyclic coefficient for a second type of pixel, which is located at a position where a pixel forming the interlace image does not exist, motion compensation means for motion-compensating, on the basis of the motion vectors, a past first progressive image to generate a motion-compensated image, and output image generating means for generating the first progressive image by adding pixel values of the first type of pixels located at corresponding positions of the intermediate image and the motion-compensated image by using the first cyclic coefficients as weights and by adding pixel values of the second type of pixels located at corresponding positions of the intermediate image and the motion-compensated image by using the second cyclic coefficients as weights.

According to another embodiment of the present invention, there is provided an image processing method including the steps of converting an interlace image including a first number of pixels into a first progressive image, generating a second progressive image including a second number of pixels which are equal to the number of pixels of a target image by interpolating the first progressive image, classifying, in accordance with a feature of the second progressive image, into classes, subject pixels forming a third progressive image, which serves as the target image, including the second number of pixels and having a quality higher than the second progressive image, the third progressive image being determined from the second progressive image, and determining the third progressive image, which serves as the target image, from the second progressive image by performing computation using the second progressive image and a prediction coefficient for each of the classes into which the subject pixels are classified among prediction coefficients obtained by conducting learning using a plurality of progressive images, each including the second number of pixels.

According to another embodiment of the present invention, there is provided a program including the steps of converting an interlace image including a first number of pixels into a first progressive image, generating a second progressive image including a second number of pixels which are equal to the number of pixels of a target image by interpolating the first progressive image, classifying, in accordance with a feature of the second progressive image, into classes, subject pixels forming a third progressive image, which serves as the target image, including the second number of pixels and having a quality higher than the second progressive image, the third progressive image being determined from the second progressive image, and determining the third progressive image, which serves as the target image, from the second progressive image by performing computation using the second progressive image and a prediction coefficient for each of the classes into which the subject pixels are classified among prediction coefficients obtained by conducting learning using a plurality of progressive images, each including the second number of pixels.

According to the image processing apparatus and method and a program, an interlace image including a first number of pixels is converted into a first progressive image. Then, by interpolating the first progressive image, a second progressive image including a second number of pixels which are equal to the number of pixels of a target image, is generated. In accordance with a feature of the second progressive image, subject pixels forming a third progressive image, which serves as the target image, including the second number of pixels and having a quality higher than the second progressive image are classified into classes, the third progressive image being determined from the second progressive image. Then, by performing computation using the second progressive image and a prediction coefficient for each of the classes into which the subject pixels are classified among prediction coefficients obtained by conducting learning using a plurality of progressive images, each including the second number of pixels, the third progressive image, which serves as the target image, is determined from the second progressive image.

According to an embodiment of the present invention, an input image can be accurately converted into a high-quality image having a number of pixels different from that of the input image.

DESCRIPTION OF THE PREFERRED EMBODIMENTS

Figure 1:
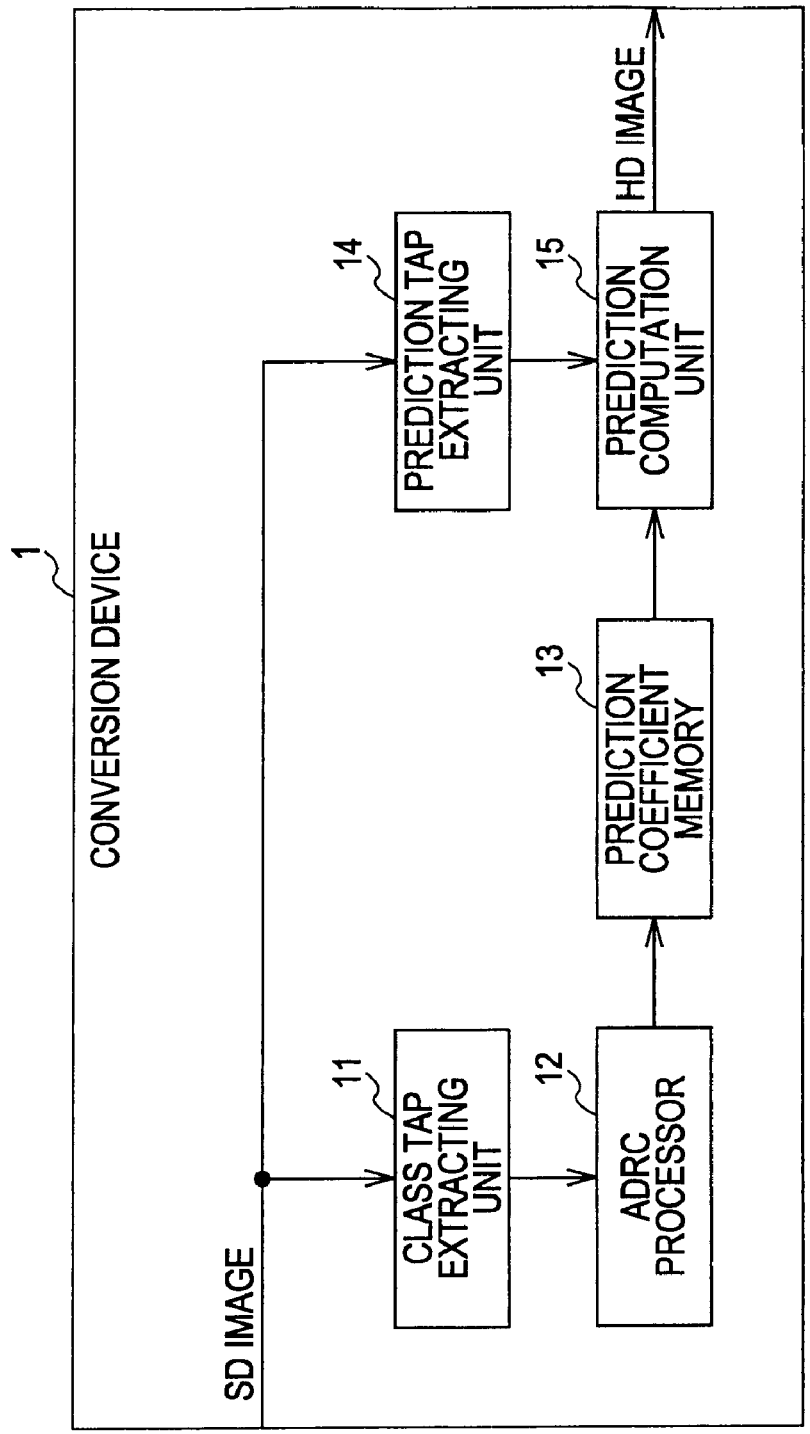
FIG. 1 is a block diagram illustrating a typical example of a conversion device that performs known conversion processing.
Figure 2:
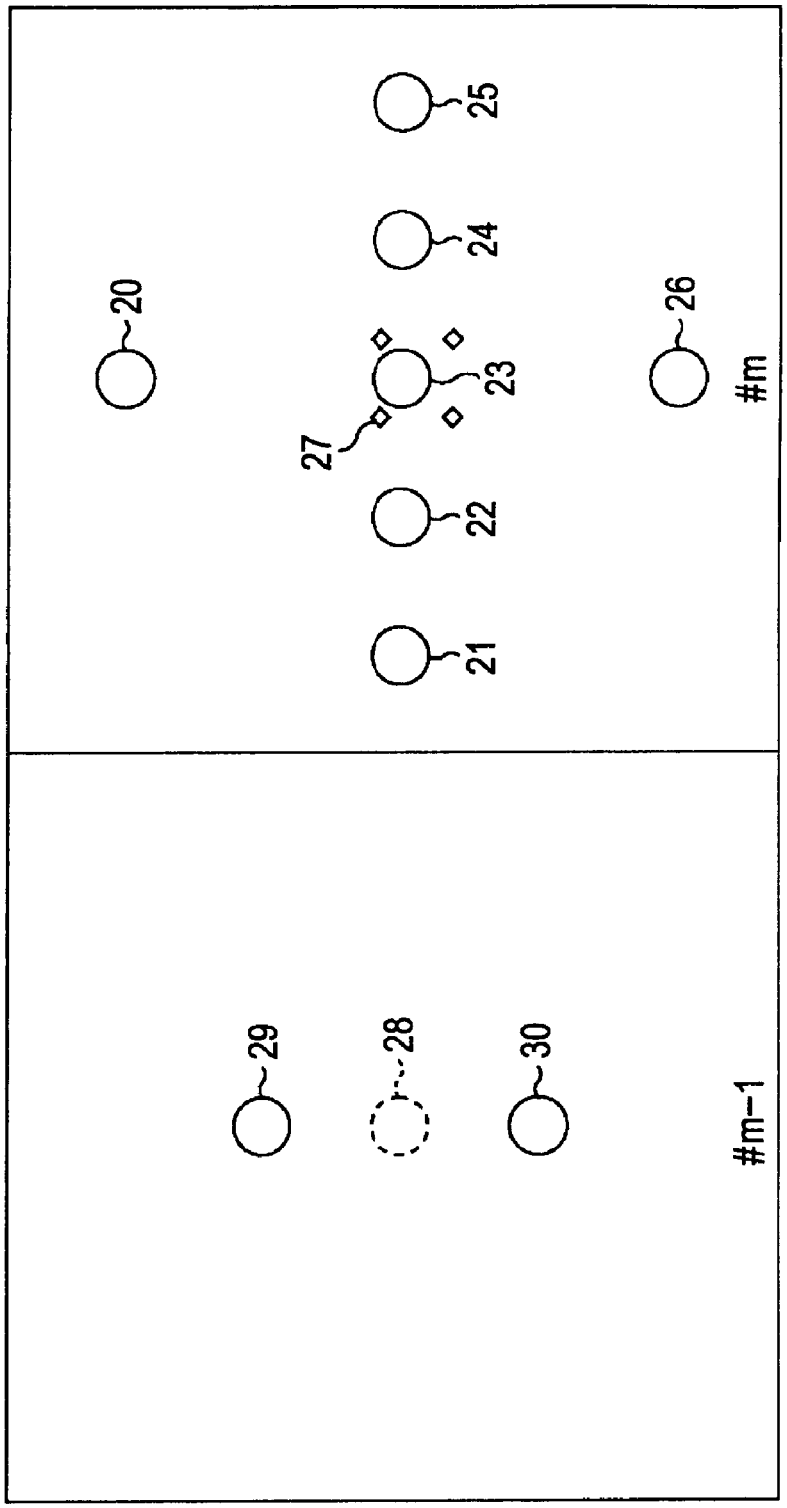
FIG. 2 illustrates an example of the tap structure of class taps.
Figure 3:
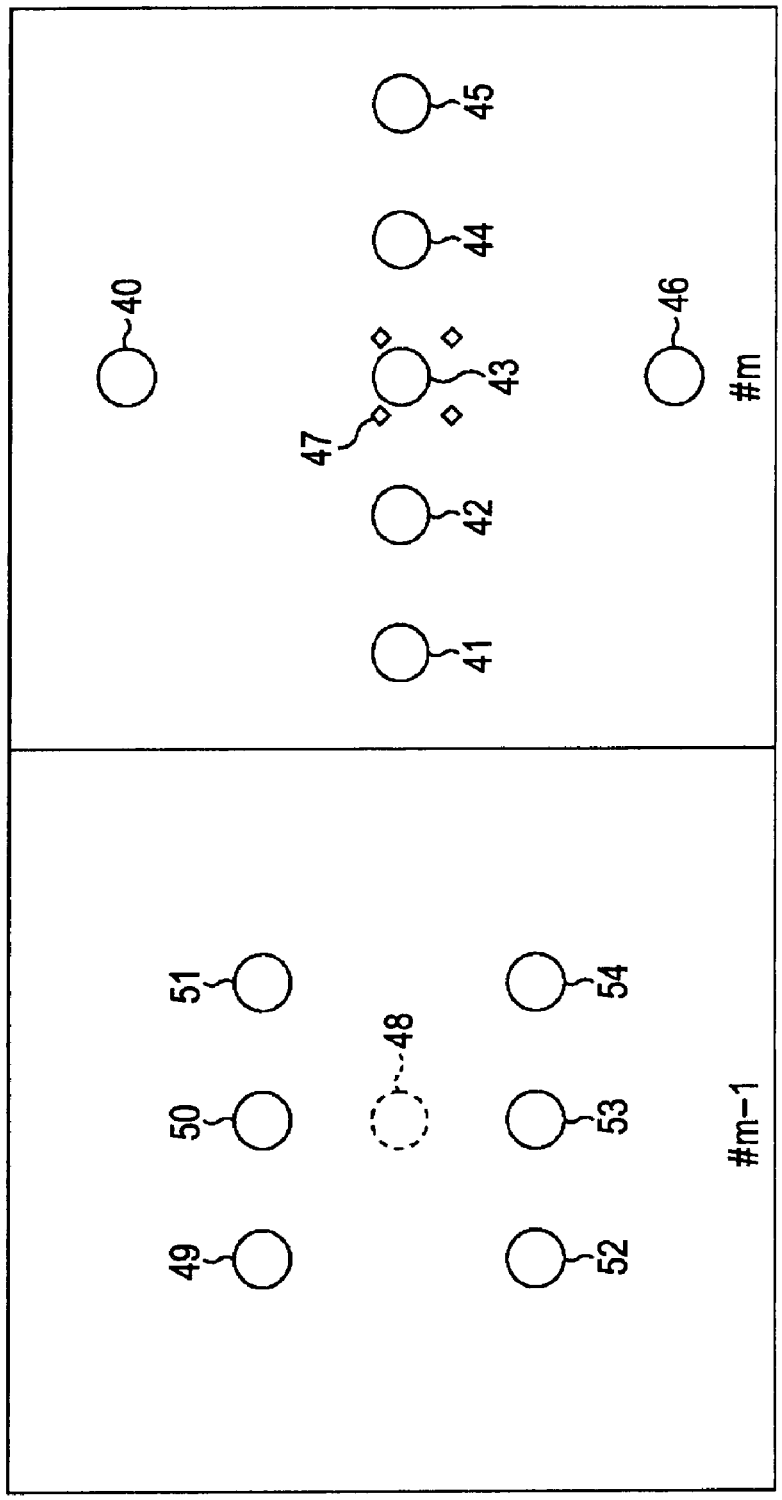
FIG. 3 illustrates an example of the tap structure of prediction taps.
Figure 4:
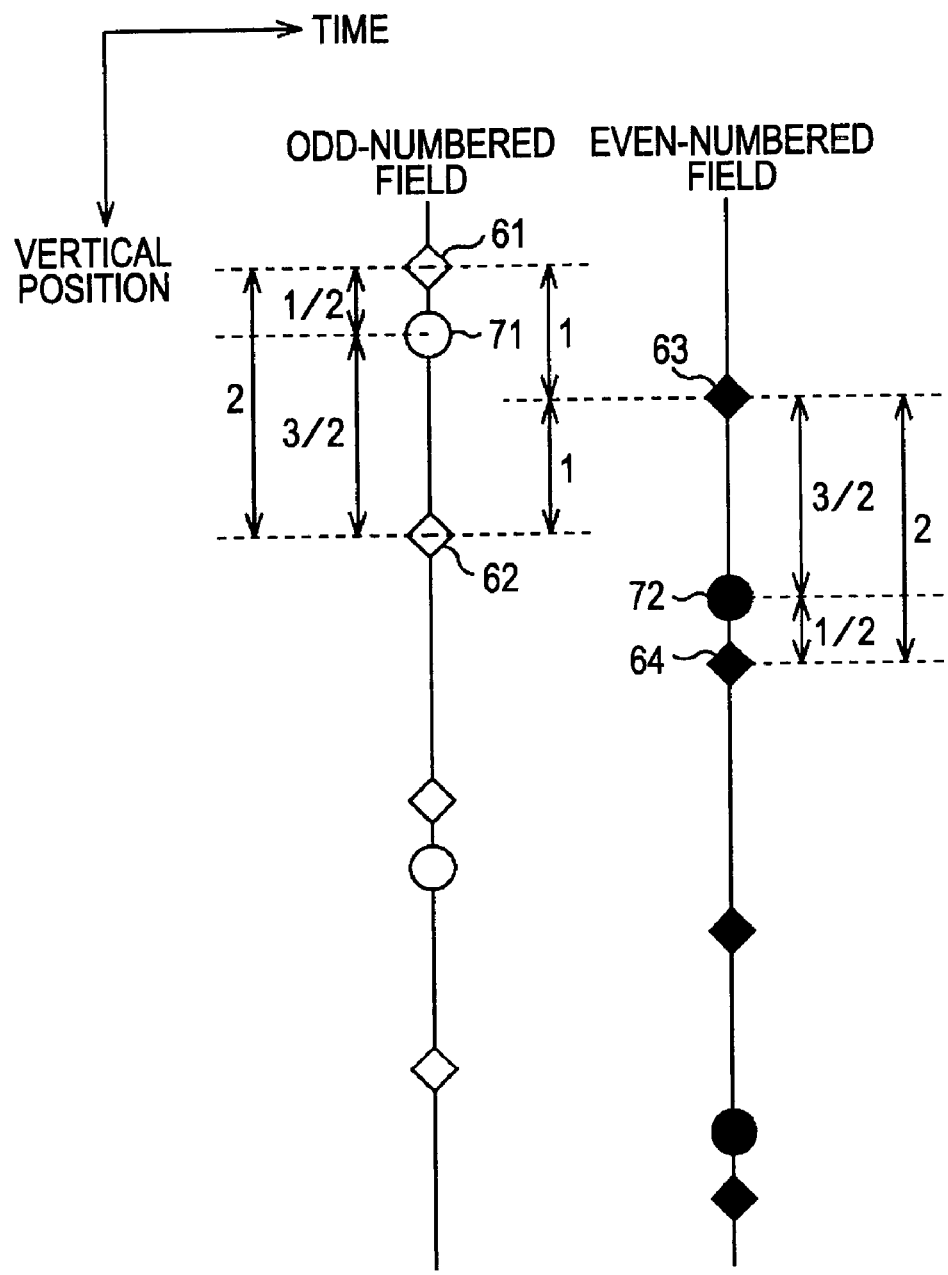
FIG. 4 illustrates the positional relationship between pixels of an HD image and pixels of an SD image in the vertical direction.
Figure 5:
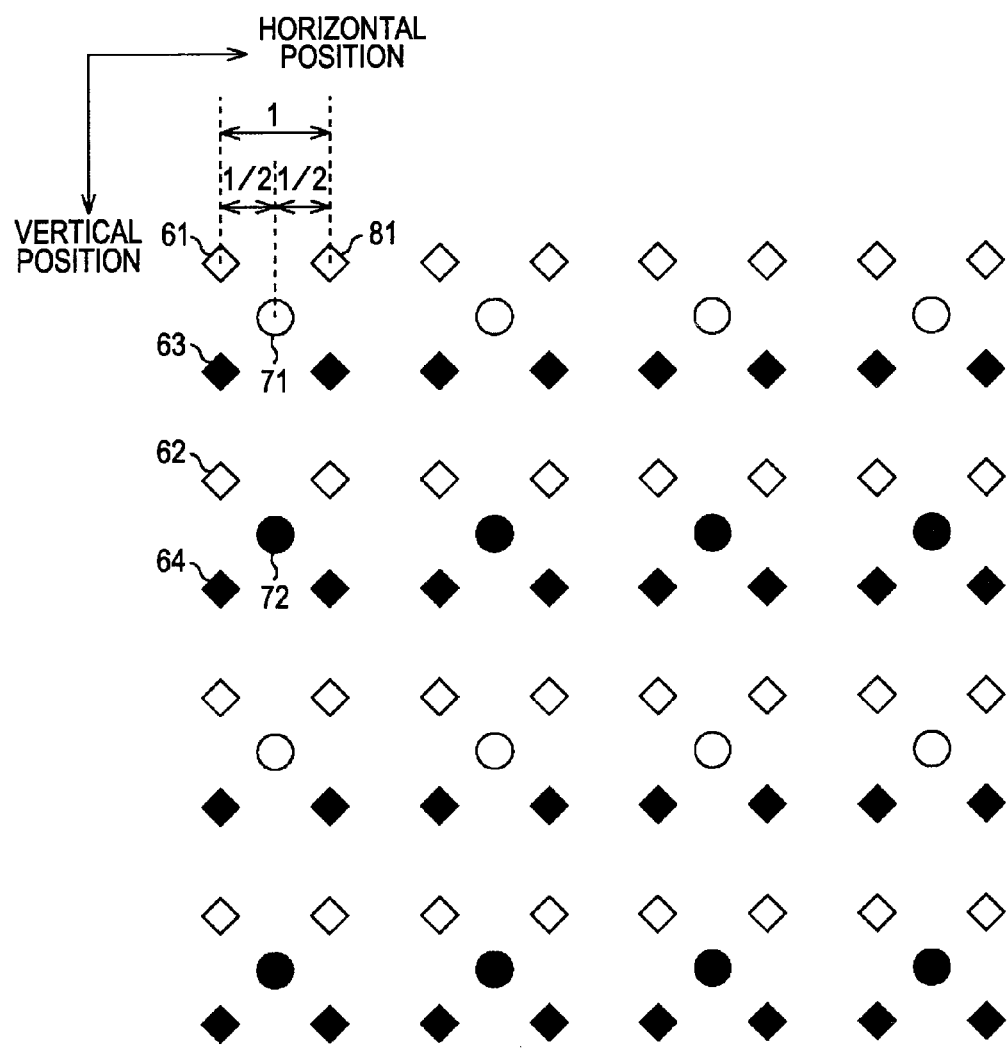
FIG. 5 illustrates the positional relationship between pixels of an HD image and pixels of an SD image in the horizontal direction.
Figure 6:
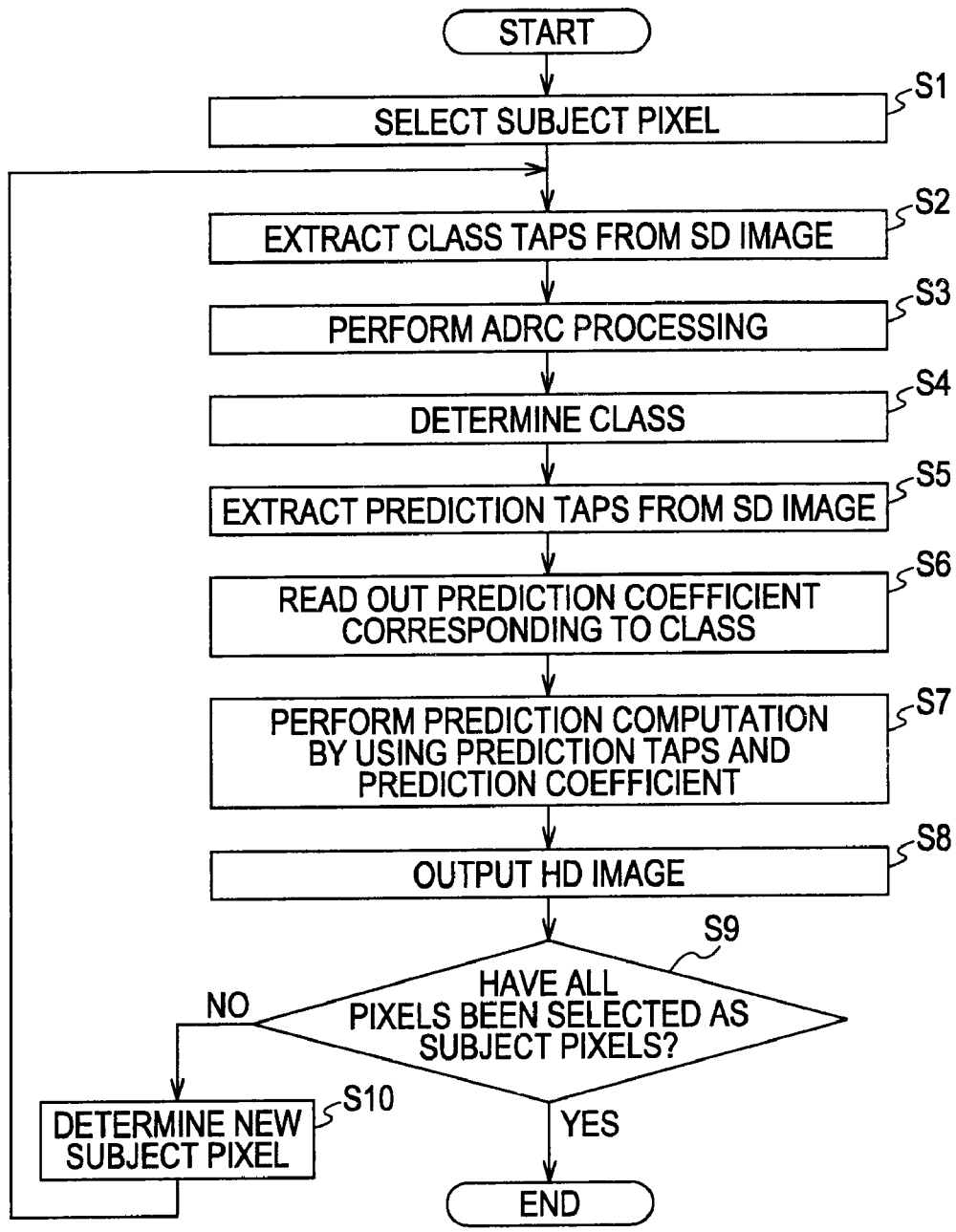
FIG. 6 is a flowchart illustrating prediction processing performed by the conversion device shown in FIG. 1 for predicting an HD image.
Figure 7:
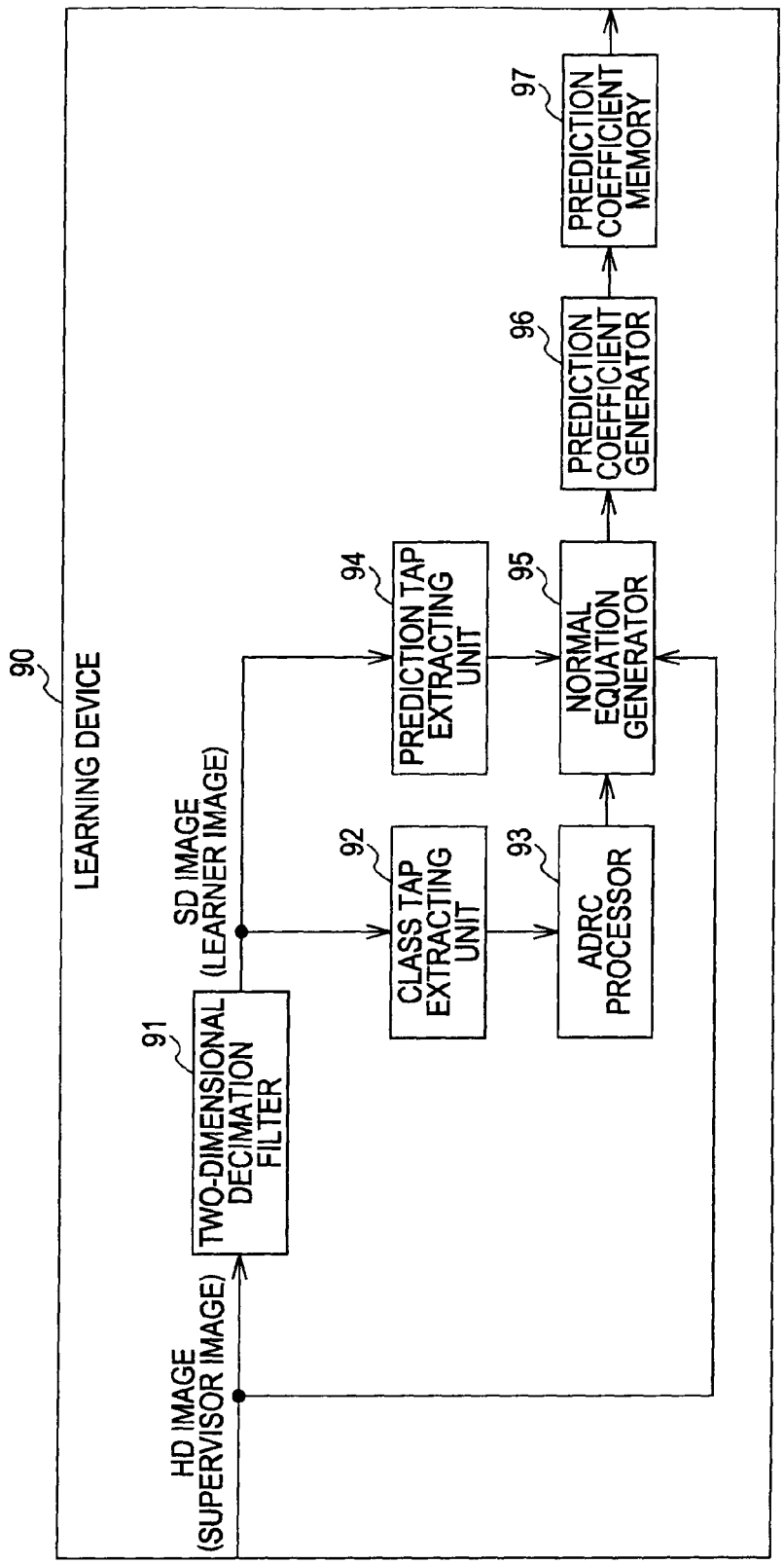
FIG. 7 is a block diagram illustrating an example of the configuration of a learning device for conducting learning for a prediction coefficient to be stored in a prediction coefficient memory shown in FIG. 1.

Before describing an embodiment of the present invention, the correspondence between the features of the claims and the embodiment disclosed in the present invention is discussed below. This description is intended to assure that the embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiment are described in the claims. That is, the description does not deny the existence of aspects of the present invention that are described in the embodiment but not claimed in the invention of this application, i.e., the existence of aspects of the present invention that in future may be claimed by a divisional application, or that may be additionally claimed through amendments.

An image processing apparatus (e.g., an image conversion device 101 shown in FIG. 8) according to an embodiment of the present invention includes conversion means (e.g., cyclic IP converter 111 shown in FIG. 8) for converting an interlace image (e.g., an image I1) including a first number of pixels into a first progressive image (e.g., an image P2), interpolation means (e.g., an output phase converter 112 shown in FIG. 8) for interpolating the first progressive image to generate a second progressive image (e.g., an HD image) including a second number of pixels which are equal to the number of pixels of a target image, classification means (e.g., an ADRC processor 552 shown in FIG. 33) for classifying, in accordance with a feature of the second progressive image, into classes, subject pixels forming a third progressive image, which serves as the target image, including the second number of pixels and having a quality higher than the second progressive image, the third progressive image being determined from the second progressive image, storage means (e.g., a prediction coefficient memory 555 shown in FIG. 33) for storing a prediction coefficient for each of the classes, the prediction coefficient being obtained by conducting learning using a plurality of progressive images, each including the second number of pixels, and computation means (e.g., a prediction computation portion 557 shown in FIG. 33) for performing computation using the second progressive image and the prediction coefficient for each of the classes into which the subject pixels are classified to determine the third progressive image, which serves as the target image, from the second progressive image.

The conversion means includes interlace-progressive conversion means (e.g., an IP converter 121 shown in FIG. 9) for converting the interlace image into a progressive intermediate image, motion-vector detection means (e.g., a motion vector detector 131 shown in FIG. 9) for detecting motion vectors (e.g., motion vectors V) of the interlace image by using, as a minimum unit, a distance shorter than an interval between pixels forming the intermediate image, cyclic-coefficient setting means (e.g., a cyclic-coefficient setting unit 133 shown in FIG. 9) for setting, based on a vertical motion (e.g., a vertical motion VY), which is a vertical component of each of the motion vectors, a first cyclic coefficient (e.g., a cyclic coefficient KA) for a first type of pixel (e.g., an A type pixel) that is located at a position where a pixel forming the interlace image exists, and a second cyclic coefficient (e.g., a cyclic coefficient KB) for a second type of pixel (e.g., a B type pixel), which is located at a position where a pixel forming the interlace image does not exist, motion compensation means (e.g., a motion compensator 134 shown in FIG. 9) for motion-compensating, on the basis of the motion vectors, a past first progressive image (e.g., an image P3) to generate a motion-compensated image (e.g., an image P4), and output image generating means (e.g., a product sum computation unit 135 shown in FIG. 9) for generating the first progressive image by adding pixel values of the first type of pixels located at corresponding positions of the intermediate image and the motion-compensated image by using the first cyclic coefficients as weights and by adding pixel values of the second type of pixels located at corresponding positions of the intermediate image and the motion-compensated image by using the second cyclic coefficients as weights.

Figure 36:
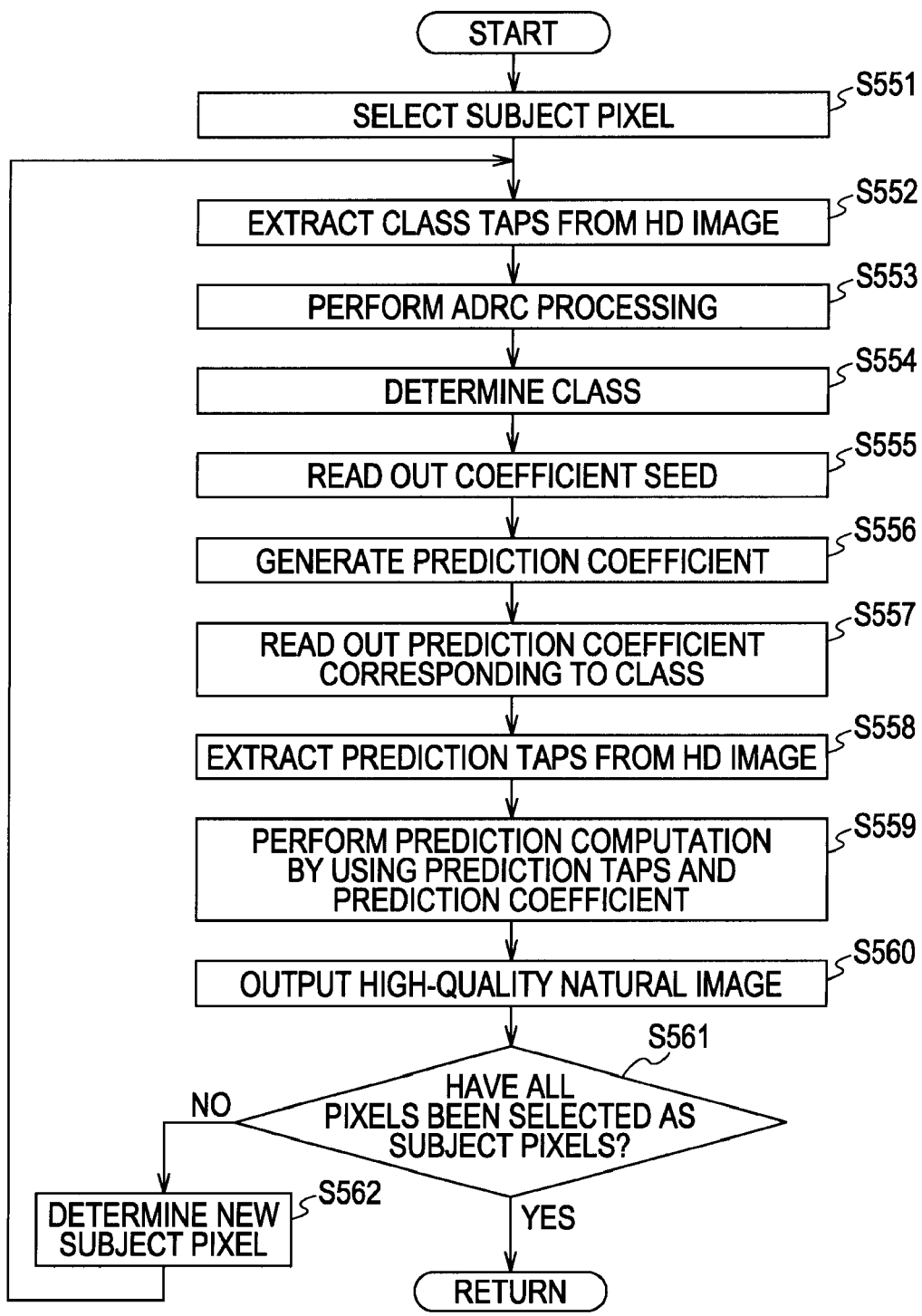
FIG. 36 is a flowchart illustrating details of natural-image prediction processing.

An image processing method and a program according to another embodiment of the present invention includes the steps of converting an interlace image (e.g., an image I1) including a first number of pixels into a first progressive image (e.g., an image P2) (e.g., step S11 in FIG. 13), generating a second progressive image (for example, an HD image) including a second number of pixels which are equal to the number of pixels of a target image by interpolating the first progressive image (e.g., the image P2) (e.g., step S13 in FIG. 13), classifying, in accordance with a feature of the second progressive image, into classes, subject pixels forming a third progressive image, which serves as the target image, including the second number of pixels and having a quality higher than the second progressive image, the third progressive image being determined from the second progressive image (e.g., step S554 in FIG. 36), and determining the third progressive image, which serves as the target image, from the second progressive image by performing computation using the second progressive image and a prediction coefficient for each of the classes into which the subject pixels are classified among prediction coefficients obtained by conducting learning using a plurality of progressive images, each including the second number of pixels (e.g., step S559 in FIG. 36).

Embodiments of the present invention are described in detail below with reference to the accompanying drawings.

Figure 8:
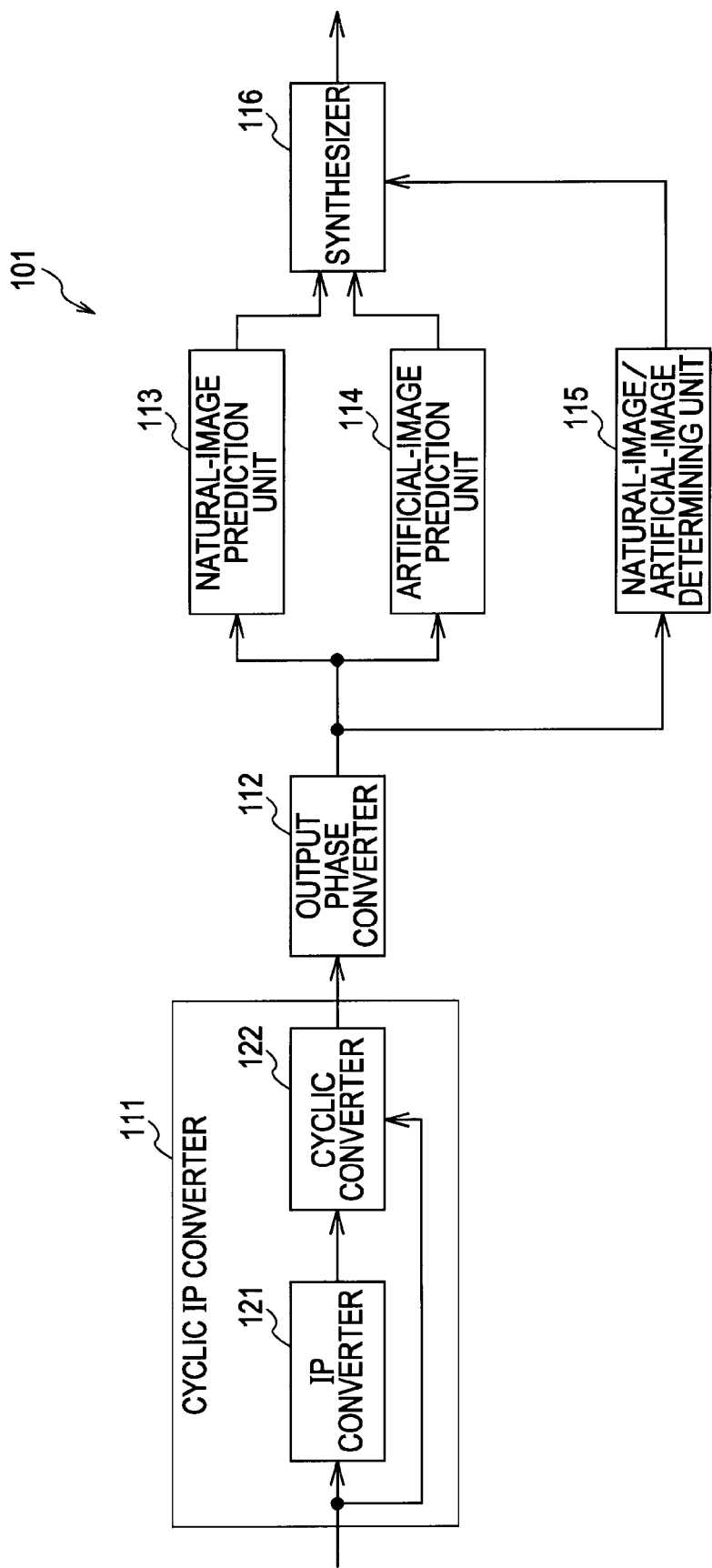
FIG. 8 is a block diagram illustrating the configuration of an image conversion device according to an embodiment of the present invention.

FIG. 8 is a block diagram illustrating an image conversion device 101 according to an embodiment of the present invention. The image conversion device 101 includes a cyclic interlace/progressive (IP) converter 111, an output phase converter 112, a natural-image prediction unit 113, an artificial-image prediction unit 114, a natural-image/artificial-image determining unit 115, and a synthesizer 116. The cyclic IP converter 111 includes an IP converter 121 and a cyclic converter 122.

An interlace SD image to be processed is input into the IP converter 121 and the cyclic converter 122 of the cyclic IP converter 111.

The IP converter 121 converts the input interlace SD image (hereinafter also referred to as an "input image") into a progressive SD image (hereinafter also referred to as an "intermediate image") according to a predetermined method, and supplies the converted progressive SD image to the cyclic converter 122.

The cyclic converter 122 determines motion vectors between the input image and the progressive SD image of the previous frame (one frame before) output from the cyclic converter 122 (such an image is also referred to as an "output image"). The cyclic converter 122 then adds the pixel values of the output image motion-compensated based on the determined motion vectors to the pixel values of the input image by using cyclic coefficients as weights, thereby improving the intermediate image. That is, the cyclic converter 122 converts the intermediate image into an output image, which is a progressive SD image of a quality higher than the intermediate image, and supplies the resulting output image to the output phase converter 112. The cyclic coefficients are set based on whether each pixel of the intermediate image exists in the original input image and also based on the magnitudes of the motion vectors in the vertical direction and the reliabilities indicating the probabilities of the motion vectors.

The output phase converter 112 interpolates the SD image having a first pixel number supplied from the cyclic converter 122 in the horizontal and vertical directions to generate an HD image having a second pixel number. The second pixel number is greater than the first pixel number. The output phase converter 112 then supplies the HD image to the natural-image prediction unit 113, the artificial-image prediction unit 114, and the natural-image/artificial-image determining unit 115.

The natural-image prediction unit 113 predicts, from the HD image supplied from the output phase converter 112, a high-quality HD image which can be obtained by increasing the quality of natural image components contained in the input HD image (such a high-quality HD image is hereafter referred to as a "high-quality natural image"). More specifically, in accordance with the features of the input HD image, the natural-image prediction unit 113 allocates the subject pixels into classes optimal for the features of the natural image. Then, the natural-image prediction unit 113 performs computation by using the input HD image and prediction coefficients corresponding to the classes, which are used for predicting the high-quality natural image, to predict the high-quality natural image from the input HD image. The natural-image prediction unit 113 supplies the computed high-quality natural image to the synthesizer 116.

Natural images are images which are not artificial images, which are discussed below, and are images obtained by directly imaging subjects in nature.

As in the natural-image prediction unit 113, the artificial-image prediction unit 114 predicts, from the HD image supplied from the output phase converter 112, a high-quality HD image which can be obtained by increasing the quality of artificial image components contained in the input HD image (such a high-quality HD image is hereafter referred to as a "high-quality artificial image"). More specifically, in accordance with the features of the input HD image, the artificial-image prediction unit 114 allocates the pixels forming the high-quality artificial image to be determined from the input HD image into classes optimal for the features of the artificial image. Then, the artificial-image prediction unit 132 performs computation by using the input HD image and prediction coefficients corresponding to the classes, which are used for predicting the high-quality artificial image, to predict the high-quality artificial image from the input HD image. The artificial-image prediction unit 114 supplies the computed high-quality artificial image to the synthesizer 116.

Artificial images are images, for example, text or simple graphics, exhibiting a small number of grayscale levels and distinct phase information concerning the positions of edges (outlines), i.e., including many flat portions.

The natural-image/artificial-image determining unit 115 determines for each pixel of the HD image supplied from the output phase converter 112 whether it belongs to an artificial image area or a natural image area, and outputs determination results to the synthesizer 116 as the degrees of artificiality. That is, the degree of artificiality represents the ratio of artificial image components to natural image components in an intermediate area, which is between the artificial image area and the natural image area, by a value from 0 to 1.

The synthesizer 116 combines, based on the determination results supplied from the natural-image/artificial-image determining unit 115, the pixel values of the pixels forming the high-quality natural image supplied from the natural-image prediction unit 113 with the pixel values of the pixels forming the high-quality artificial image supplied from the artificial-image prediction unit 114 in accordance with the degrees of artificiality of the individual pixels. The synthesizer 116 then outputs the synthesized HD image.

Figure 9:
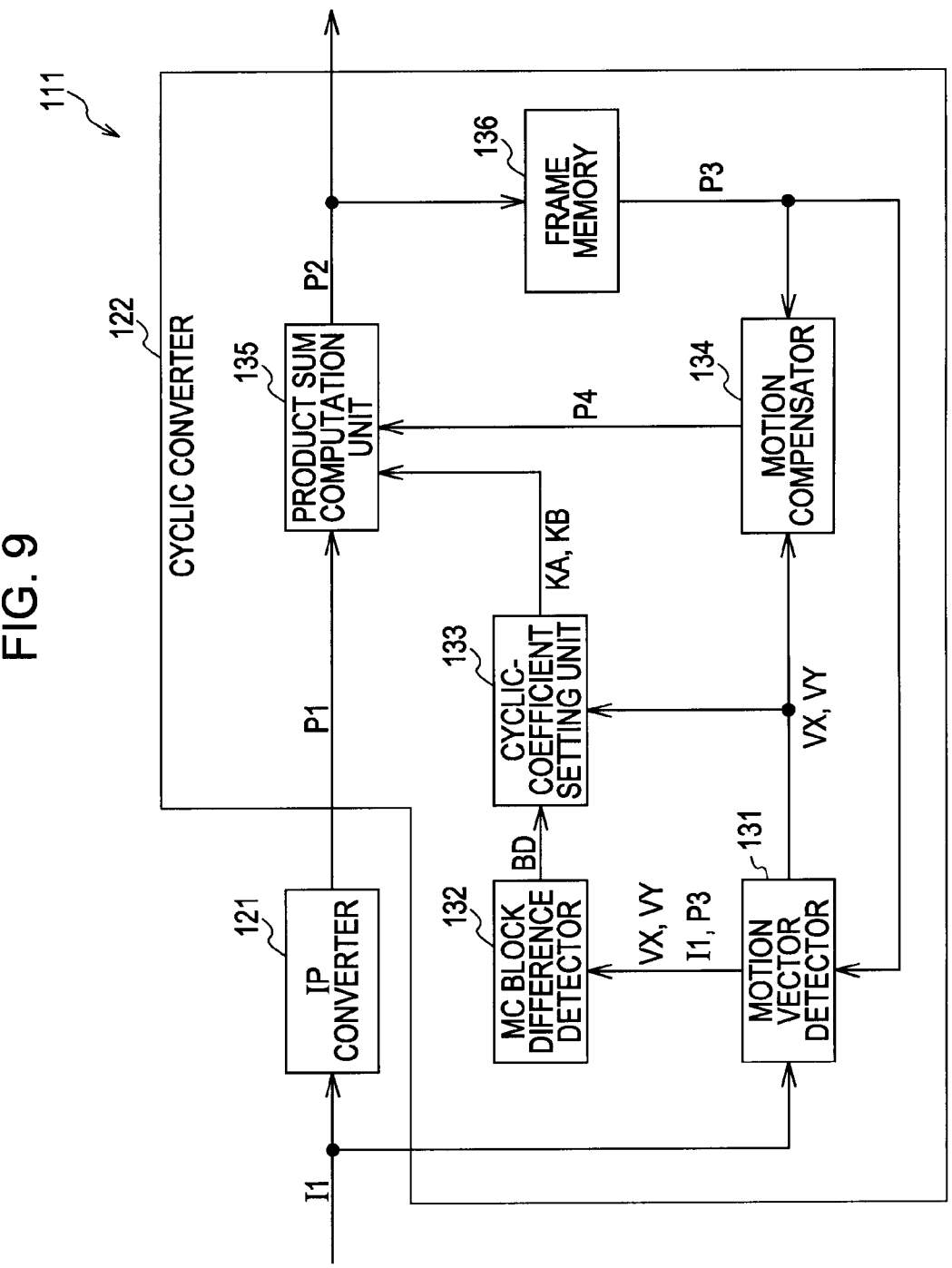
FIG. 9 is a block diagram illustrating the functional configuration of a cyclic interlace/progressive (IP) converter shown in FIG. 8.

FIG. 9 illustrates details of the functional configuration of the cyclic converter 122 of the cyclic IP converter 111 shown in FIG. 8. The cyclic converter 122 includes a motion vector detector 131, a motion compensation (MC) difference detector 132, a cyclic-coefficient setting unit 133, a motion compensator 134, a product sum computation unit 135, and a frame memory 136.

In the coordinate system representing the positions of the pixels of each image to be processed by the cyclic IP converter 111, the x axis indicates the horizontal direction and the y axis represents the vertical direction. That is, the coordinates of each pixel are represented by (x, y). An input image, which is an interlace SD image input into the IP converter 121, from an external source is also referred to as an "image I1", and an intermediate image, which is a progressive SD image output from the IP converter 121, is also referred to as an "image P1".

Generally, a progressive image includes two types of pixels, i.e., pixels that exist in an interlace image before conducting IP conversion and pixels that do not exist in the interlace image. If the two types of pixels are distinguished from each other, the former type is referred to as "A type pixels" and the latter type is referred to as "B type pixels".

Figure 10:
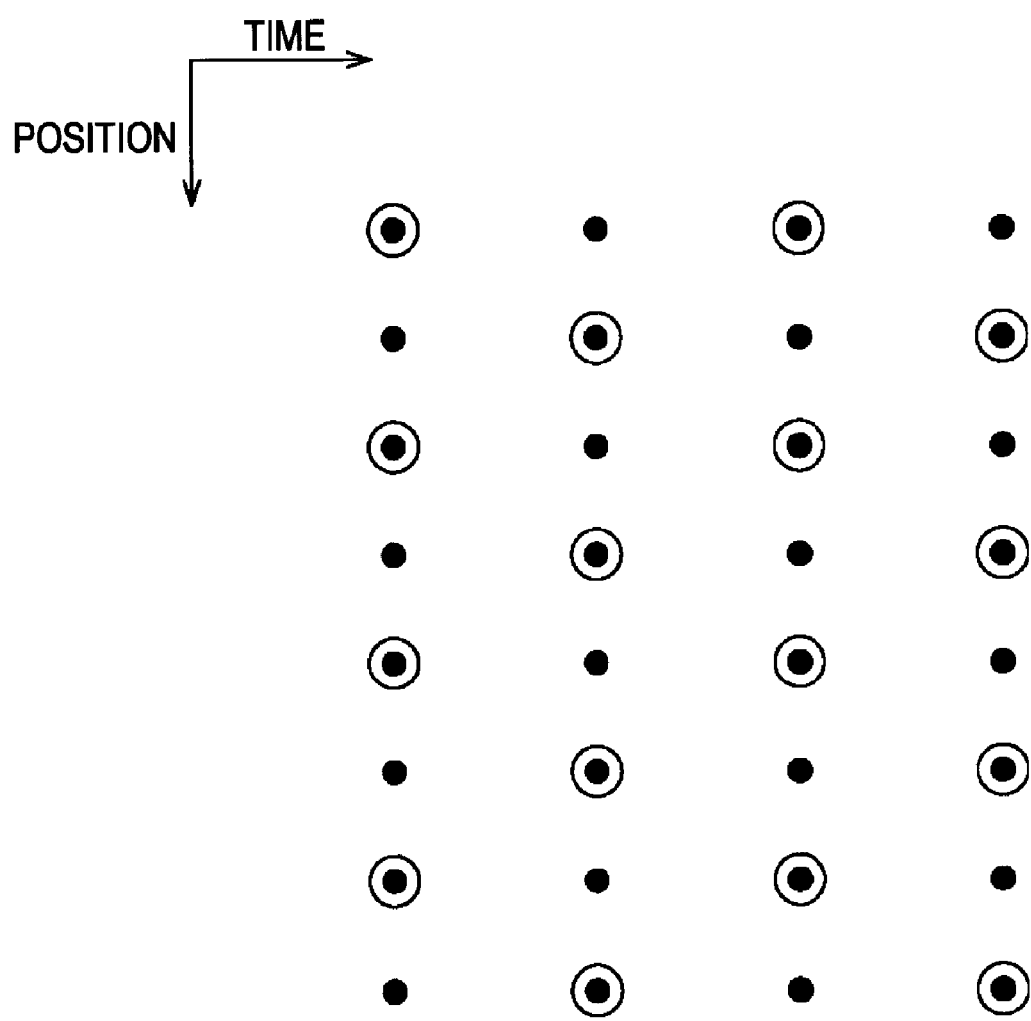
FIG. 10 illustrates pixel types of a progressive image.

FIG. 10 illustrates the positional relationship between an interlace image before conducting IP conversion and a progressive image after conducting IP conversion. In FIG. 10, the horizontal axis indicates the time, and the vertical axis designates the position of the pixels. In FIG. 10, the pixels indicated by the black circles surrounded by the white circles represent A type pixels, and the pixels indicated only by the black circles represent B type pixels.

The motion vector detector 131 detects a motion vector of each pixel forming an image I1. More specifically, the motion vector detector 131 reads out, from the frame memory 136, an output image (which is also referred to as the "image P3"), which is a progressive SD image, of the previous frame output from the cyclic converter 122 and stored in the frame memory 136. The motion vector detector 131 divides the image I1, as discussed below with reference to FIG. 25, into a predetermined size of blocks, i.e., N-row×M-column pixel blocks, and then, detects motion vectors with sub-pixel precision, i.e., by using, as the minimum unit, an interval smaller than the interval between pixels of the progressive image. For B type pixels that do not exist in the image I1, the motion vector of a B type pixel cannot be detected, and thus, the motion vector of a block containing that B type pixel is used.

To distinguish the coordinate system representing the positions of a predetermined block of each image from the coordinate system representing the position of the pixels, the horizontal direction is designated by the X axis, and the vertical direction is represented by the Y axis. That is, the coordinates of each block are represented by (X, Y). The motion vector of a block at the coordinates (X, Y) is indicated by V(X, Y), and the horizontal motion, which is a horizontal component, of the motion vector V(X, Y) is represented by VX(X, Y), while the vertical motion, which is a vertical component, of the motion vector V(X, Y) is designated by VY(X, Y). The amounts of horizontal motion and vertical motion are represented based on the pixel interval in the progressive image. The pixel at the top left of each block is referred to as the "reference pixel", and the coordinates of the reference pixel are referred to as the "reference coordinates".

The motion vector detector 131 supplies information indicating the detected motion vector V (including the horizontal motion VX and the vertical motion VY) to the MC block difference detector 132, the cyclic-coefficient setting unit 133, and the motion compensator 134. The motion vector detector 131 also supplies the image I1 and the image P3 used for detecting the motion vector to the MC block difference detector 132.

The MC block difference detector 132 detects, as discussed below with reference to FIGS. 16 and 17, MC block differences, which are the differences between the pixel values of the pixels of each block of the image I1 and the pixel values of the pixels of the corresponding block of the image P3, which is shifted from the block of the image I1 by the direction and distance indicated by the motion vector V. The MC block difference detector 132 supplies information indicating the detected MC block differences to the cyclic-coefficient setting unit 133.

The MC block difference of the block positioned at the coordinates (X, Y) is hereinafter indicated by BD(X, Y).

The cyclic-coefficient setting unit 133 sets, as discussed below with reference to FIG. 15, cyclic coefficients KA for the A type pixels and cyclic coefficients KB for the B type pixels on the basis of the motion vector V and the MC block difference BD. The cyclic coefficient KA for the A type pixel positioned at the coordinates (x, y) is indicated by KA(x, y), and the cyclic coefficient KB for the B type pixel positioned at the coordinates (x, y) is designated by KB (x, y). The cyclic-coefficient setting unit 133 supplies information indicating the set cyclic coefficients KA and KB to the product sum computation unit 135.

The motion compensator 134 reads out the image P3 from the frame memory 136. The motion compensator 134, as discussed below with reference to FIG. 15, performs motion compensation on the image P3 based on the motion vector V to generate an image P4. The motion compensator 134 then supplies the generated image P4 to the product sum computation unit 135.

The product sum computation unit 135 generates, as discussed below with reference to FIG. 17, an output image (hereinafter also referred to as the "image P2), which is a progressive SD image, by adding the pixel values of the A type pixels located at corresponding positions of the image P1 and the image P4 by using the cyclic coefficients KA as weights, and also by adding the pixel values of the B type pixels located at corresponding positions of the image P1 and the image P4 by using the cyclic coefficients KB as weights. The product sum computation unit 135 supplies the image P2 to the output phase converter 112 and also stores the image P2 in the frame memory 136.

The pixel values of the pixels positioned at the coordinates (x, y) of the image I1 and the images P1 through P4 are represented by I1(x, y) and P1(x, y) through P4(*x, y*), respectively.

Figure 11:
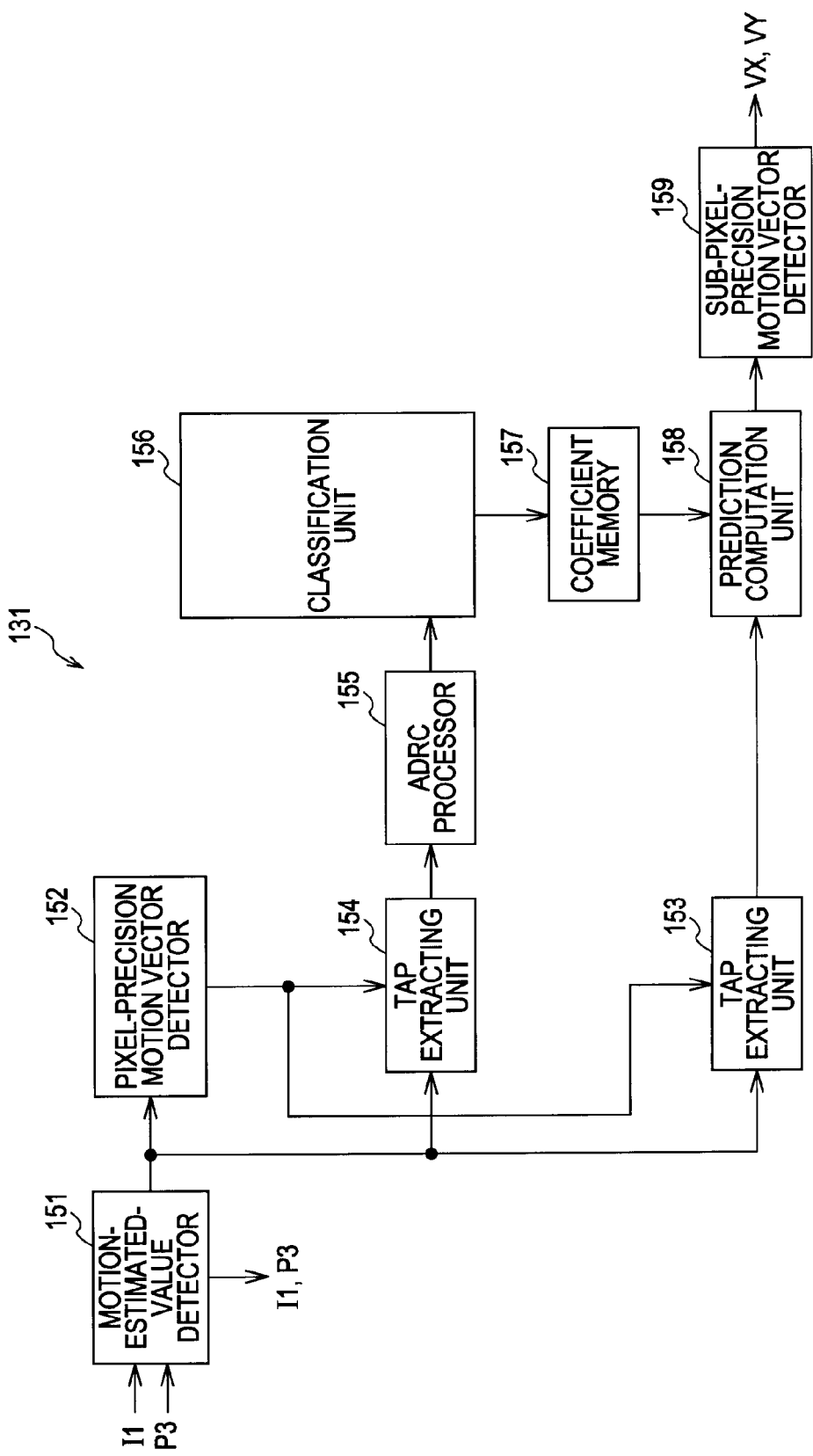
FIG. 11 is a block diagram illustrating the functional configuration of a motion vector detector shown in FIG. 9.

FIG. 11 is a block diagram illustrating the functional configuration of the motion vector detector 131. The motion vector detector 131 includes a motion-estimated-value detector 151, a pixel-precision motion vector detector 152, tap extracting units 153 and 154, an ADRC processor 155, a classification unit 156, a coefficient memory 157, a prediction computation unit 158, and a sub-pixel-precision motion vector detector 159.

The motion-estimated-value detector 151 obtains the image I1 input from an external source and also obtains the image P3 from the frame memory 136. The motion-estimated-value detector 151 then divides the image I1 into a predetermined size of blocks, and sequentially sets the divided blocks as subject blocks. The motion-estimated-value detector 151 then sequentially sets, as discussed below with reference to FIG. 25, pixels in a predetermined area of the image P3 as subject pixels, and determines differences of the pixel values of the pixels of a block (hereinafter referred to as a "comparative block") having the same size as the subject block and including the subject pixel as the reference pixel and the pixel values of the pixels of the subject block located at the corresponding positions. The motion-estimated-value detector 151 then adds the absolute values of the determined differences, and sets the added result as the motion estimated value for the subject pixel. The motion-estimated-value detector 151 supplies information indicating the detected motion estimated value to the pixel-precision motion vector detector 152 and the tap extracting units 153 and 154. The motion-estimated-value detector 151 also supplies the image I1 and the image P3 used for detecting the motion vector to the MC block difference detector 132.

The motion estimated value for the subject pixel positioned at the coordinates (x, y) is hereinafter indicated by M(x, y).

Figure 25:
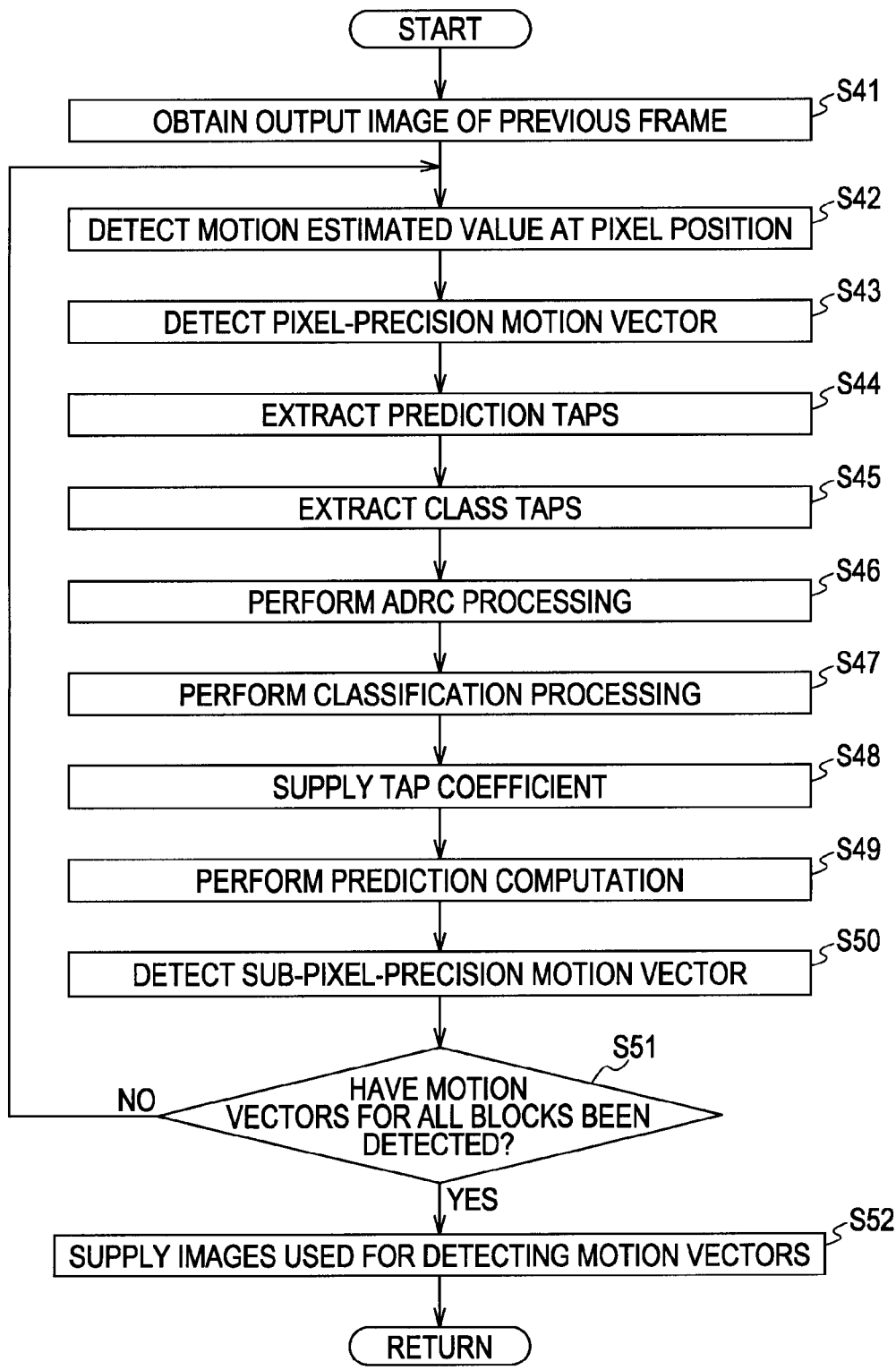
FIG. 25 is a flowchart illustrating details of motion vector detection processing in step S21 in FIG. 15.

The pixel-precision motion vector detector 152 detects, as discussed below with reference to FIG. 25, the vector that connects the coordinates of the pixel having the smallest motion estimated value (hereinafter such a pixel is referred to as the "minimum estimated value pixel") M with the coordinates of the reference pixel of the subject block, as the motion vector using an interval equal to the pixel interval of the progressive image, i.e., the pixel precision for the subject block, as the minimum unit. The pixel-precision motion vector detector 152 supplies information indicating the detected pixel-precision motion vector to the tap extracting units 153 and 154.

The tap extracting unit 153 extracts, as discussed below with reference to FIG. 25, as prediction taps, the motion estimated values M for pixels near the minimum estimated value pixel (including the minimum estimated value pixel itself) of the image P3. Such pixels are used for predicting the motion estimated values M at the positions between the minimum-estimated pixel and the adjacent pixels, i.e., at the sub-pixel precision positions (hereinafter also referred to as the "prediction positions"). The tap extracting unit 153 supplies the extracted prediction taps to the prediction computation unit 158.

The tap extracting unit 154 extracts, as discussed below with reference to FIG. 25, as class taps, the motion estimation values M for several pixels of the image P3 used for classifying the minimum estimated value pixel into one of the classes. The tap extracting unit 154 supplies the extracted class taps to the ADRC processor 155.

The ADRC processor 155 performs ADRC processing on the motion estimated values M forming the class taps and supplies information indicating the resulting ADRC code to the classification unit 156.

In K-bit ADRC processing, the maximum value MAX and the minimum value MIN of the motion estimated values M of the pixels forming the class taps are detected, and DR=MAX−MIN is set as the local dynamic range of a set, and then, the motion estimated values M forming the class taps are re-quantized into K bits based on the dynamic range. That is, the minimum value MIN is subtracted from each motion estimated value M and the resulting value is divided by $DR/2^K$. Then, the motion estimated values M of the K-bit pixel values of the pixels forming the class taps are arranged in a predetermined order, resulting in a bit string, which is then output as the ADRC code.

The classification unit 156 classifies the minimum estimated value pixel based on the ADRC code supplied from the ADRC processor 155, and then supplies information indicating the class code corresponding to the resulting class to the coefficient memory 157.

The coefficient memory 157 stores a set of tap coefficients for the individual classes, which are predetermined by learning discussed below. The coefficient memory 157 extracts, from the stored set of tap coefficients, the tap coefficient stored at the address associated with the class code supplied from the classification unit 156, i.e., the tap coefficient for the class represented by the class code supplied from the classification unit 156, and then supplies the extracted tap coefficient to the prediction computation unit 158.

The prediction computation unit 158 obtains, as discussed below with reference to FIG. 25, the prediction taps output from the tap extracting unit 153 and the tap coefficient output from the coefficient memory 157, and then performs predetermined prediction computation for determining the prediction values of the true values of the motion estimated values M at the prediction positions by using the prediction taps and the tap coefficient. As a result, the prediction computation unit 158 determines the prediction values of the motion estimation values M' at the prediction positions and supplies the prediction values to the sub-pixel-precision motion vector detector 159.

The sub-pixel-precision motion vector 159 detects the pixel or the position having the minimum motion estimated value from the minimum estimated value pixels and the prediction positions, and then, determines, as the sub-pixel-precision motion vector V, the vector that connects the coordinates of the detected pixel or position with the coordinates of the reference pixel of the subject block. The sub-pixel-precision motion vector 159 then supplies information indicating the detected motion vector V to the MC block difference detector 132, the cyclic-coefficient setting unit 133, and the motion compensator 134.

Figure 12:
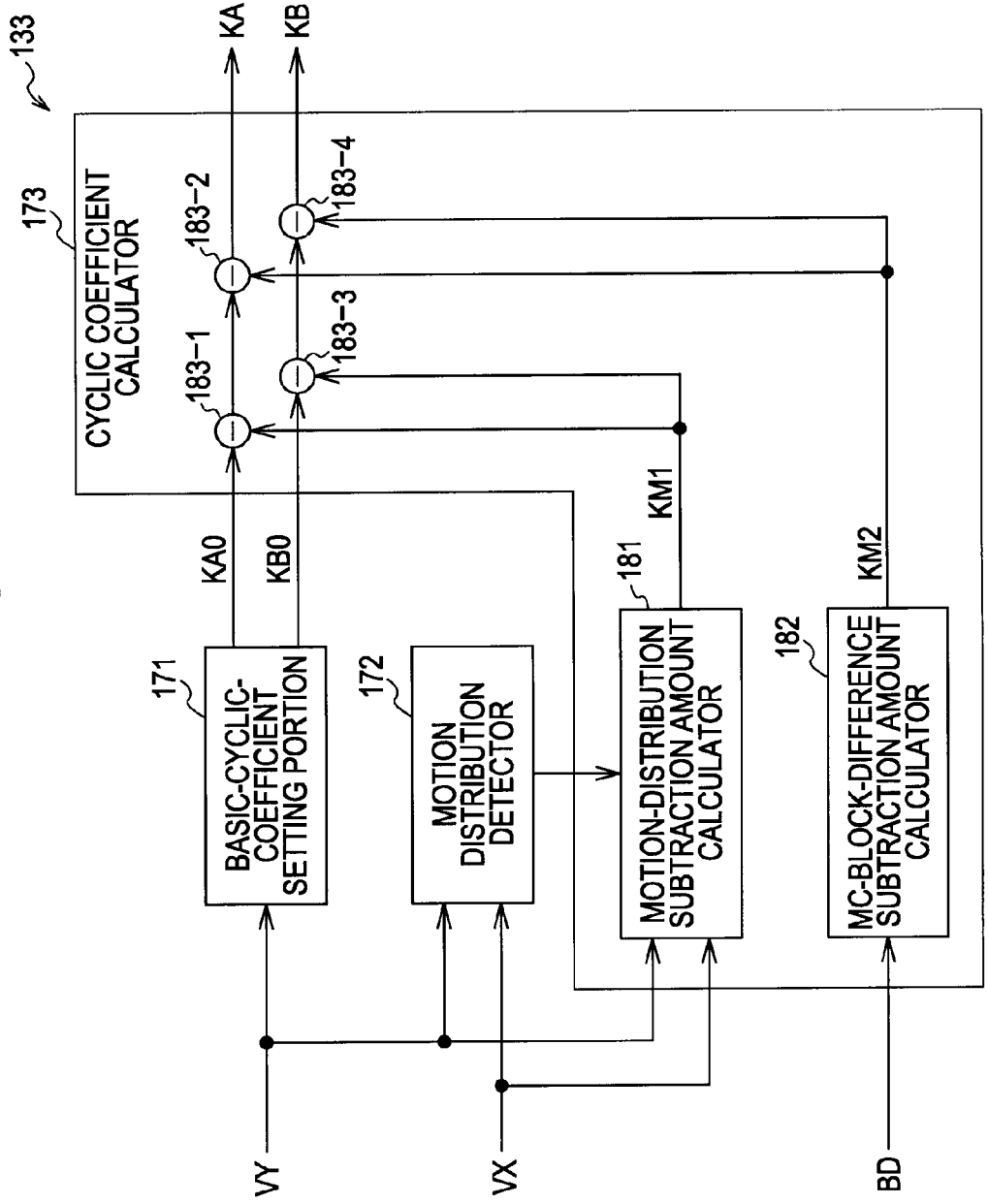
FIG. 12 is a block diagram illustrating the functional configuration of a cyclic-coefficient setting unit shown in FIG. 9.

FIG. 12 is a block diagram illustrating the functional configuration of the cyclic-coefficient setting unit 133. The cyclic-coefficient setting unit 133 includes a basic-cyclic-coefficient setting unit 171, a motion distribution detector 172, and a cyclic coefficient calculator 173. The cyclic coefficient calculator 173 includes a motion-distribution subtraction amount calculator 181, an MC-block-difference subtraction amount calculator 182, and subtractors 183-1 through 183-4.

The basic-cyclic-coefficient setting unit 171 sets, as discussed below with reference to FIGS. 18 and 19, basic cyclic coefficients KA0 for A type pixels of the image P1 and basic cyclic coefficients KB0 for B type pixels of the image P1 on the basis of the vertical motion VY. The basic cyclic coefficient KA0 for the pixel positioned at the coordinates (x, y) is represented by KA0(x, y), and the basic cyclic coefficient KB0 for the pixel positioned at the coordinates (x, y) is designated by KB0(x, y). The basic-cyclic-coefficient setting unit 171 supplies information indicating the basic cyclic coefficients KA0 and information indicating the basic cyclic coefficients KB0 to the subtractor 183-1 and the subtractor 183-3, respectively.

The motion distribution detector 172 detects, as discussed below with reference to FIGS. 21 and 24, as the reliability of the motion vector V detected by the motion vector detector 131, the motion distribution MD representing the degree of distribution of the motion vector V in relation to the surrounding motion vectors V. The motion distribution MD for the motion vector V(X, Y) is indicated by MD(X, Y). The motion distribution detector 172 supplies information indicating the motion distribution MD to the motion-distribution subtraction amount calculator 181.

The motion-distribution subtraction amount calculator 181 calculates, as discussed below with reference to FIG. 15, motion-distribution subtraction amounts KM1, which are correction values for correcting for the basic cyclic coefficients KA0 and KB0, on the basis of the motion distributions MD. The motion-distribution subtraction amount KM1 for the pixel positioned at the coordinates (x, y) of the image P1 is designated by KM1(x, y). The motion-distribution subtraction amount calculator 181 supplies information indicating the motion-distribution subtraction amounts KM1 to the subtractors 183-1 and 183-3.

The MC-block-difference subtraction amount calculator 182 calculates, as discussed below with reference to FIG. 15, MC-block-difference subtraction amounts KM2, which are correction values for correcting for the basic cyclic coefficients KA0 and KB0, on the basis of the MC block differences BD. The motion-distribution subtraction amount KM2 for the pixel positioned at the coordinates (x, y) of the image P1 is designated by KM2(x, y). The MC-block-difference subtraction amount calculator 182 supplies information indicating the MC-block-difference subtraction amounts KM2 to the subtractors 183-2 and 183-4.

The subtractor 183-1 subtracts the motion-distribution subtraction amount KM1 from the basic cyclic coefficient KA0, and the subtractor 183-2 subtracts the MC-block-difference subtraction amount KM2 from the value output from the subtractor 183-1, resulting in the cyclic coefficient KA. The cyclic coefficient KA for the pixel positioned at the coordinates (x, y) of the image P1 is represented by KA(x, y). The subtractor 183-2 supplies information indicating the cyclic coefficient KA to the product sum computation unit 135.

The subtractor 183-3 subtracts the motion-distribution subtraction amount KM1 from the basic cyclic coefficient KB0, and the subtractor 183-4 subtracts the MC-block-difference subtraction amount KM2 from the value output from the subtractor 183-3, resulting in the cyclic coefficient KB. The cyclic coefficient KB for the pixel positioned at the coordinates (x, y) of the image P1 is represented by KB(x, y). The subtractor 183-4 supplies information indicating the cyclic coefficient KB to the product sum computation unit 135.

The image conversion processing performed by the image conversion device 101 is described below with reference to the flowchart in FIG. 13. This processing is started, for example, when the input of an image I1 from an external source is started.

In step S11, the IP converter 121 performs IP conversion processing. More specifically, the IP converter 121 converts an interlace image I1 input from an external source into a progressive image P1. Motion-adaptation IP conversion processing, which is one type of IP conversion processing, performed by the IP converter 121 is described below with reference to FIG. 14.

Figure 14:
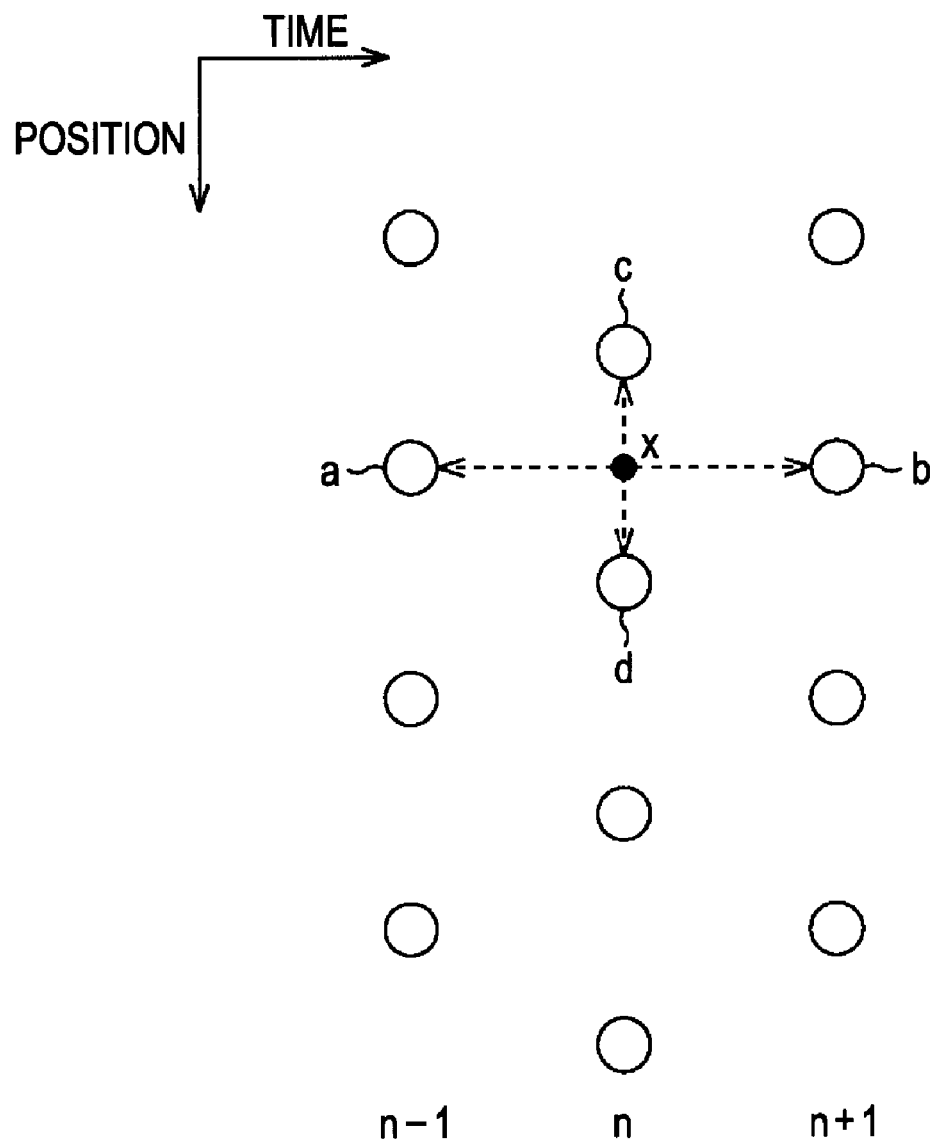
FIG. 14 illustrates IP conversion processing using a motion adaptation technique.

FIG. 14 illustrates the vertical arrangement of pixels of an interlace image. In FIG. 14, the horizontal axis designates the time, and the vertical axis represents the position of the pixels. In FIG. 14, the white circles indicate pixels. The pixel column at the left side belongs to the (n−1)-th field, the pixel column in the middle belongs to the n-th field, and the pixel column at the right side belongs to the (n+1)-th field.

The calculation of the pixel value of a pixel (B type pixel) to be interpolated at position x when the n-th field interlace image is converted into a progressive image is discussed below by way of example. It is now assumed that in the (n−1)-th field, the pixel value of the pixel located at a position corresponding to the position x is a, and in the (n+1)-th field, the pixel value of the pixel located at a position corresponding to the position x is b. It is also assumed that in the n-th field, the pixel values of the pixels immediately above and below the position x are c and d, respectively.

For example, if $|a-b| \leq |c-d|$, it is considered that the position x is contained in a still image area having small motion, and then, the pixel value at the position x is calculated to be $(a+b)/2$, which is the average of the pixel values of the pixels located at the positions corresponding to the position x in the previous and subsequent fields. Conversely, if $|a-b| > |c-d|$, it is considered that the position x is contained in a moving image area having large motion, and then, the pixel value at the position x is calculated to be $(c+d)/2$, which is the average of the pixel values of the pixels vertically and horizontally adjacent to the position x. For other B type pixels, the pixel values may be determined in a manner similar to that described above.

The IP conversion processing performed by the IP converter 121 is not restricted to a particular technique, and may be performed according to another technique, for example, a technique using classification adaptation processing. Details of IP conversion using classification adaptation processing are disclosed in Japanese Unexamined Patent Application Publication No. 2000-50213, which was previously filed by the assignee of this application.

Additionally, image processing, for example, noise suppression, may be performed for improving the quality of an image I1 before performing IP conversion.

The IP conversion processing performed in step S11 is restricted to conversion for increasing the number of pixels by generating pixels in even-numbered fields located at corresponding positions in odd-numbered fields or by generating pixels in odd-numbered fields located at corresponding positions in even-numbered fields, as shown in FIG. 10 or 14. The number of pixels is increased in this sense, but not more than that.

The IP converter 121 sequentially supplies the generated images P1 to the product sum computation unit 135.

In step S12, the cyclic converter 122 performs cyclic conversion processing. According to this processing, the image P1 is converted into a higher-quality image P2, which is then supplied to the output phase converter 112. Details of the cyclic conversion processing are discussed below with reference to FIG. 15.

In step S13, the output phase converter 112 performs output phase conversion processing. According to this processing, the image P2, which is an SD image, is converted into an HD image. That is, in this processing, the number of pixels is increased to that of the target HD image. The resulting HD image is then supplied to the natural-image prediction unit 113, the artificial-image prediction unit 114, and the natural-image/artificial-image determining unit 115. Details of the output phase conversion processing are discussed below with reference to FIG. 29 or 32.

In step S14, the natural-image prediction unit 113 performs natural-image prediction processing. According to this processing, a high-quality natural image is predicted from the HD image and is supplied to the synthesizer 116. Details of the natural-image prediction processing are discussed below with reference to FIG. 36.

In step S15, the artificial-image prediction unit 114 performs artificial-image prediction processing. According to this processing, a high-quality artificial image is predicted from the HD image and is supplied to the synthesizer 116. Details of the artificial-image prediction processing are discussed below with reference to FIG. 45.

In step S16, the natural-image/artificial-image determining unit 115 performs natural-image/artificial-image determination processing. According to this processing, the natural-image/artificial-image determining unit 115 determines whether each pixel of the HD image supplied from the output phase converter 112 belongs to an artificial image area or a natural image area, and outputs determination results to the synthesizer 116 as the degrees of artificiality.

In step S17, the synthesizer 116 synthesizes an image. More specifically, the synthesizer 116 combines, based on determination results supplied from the natural-image/artificial-image determining unit 115, the pixel values of the pixels forming the high-quality natural image supplied from the natural-image prediction unit 113 with the pixel values of the pixels forming the high-quality artificial image supplied from the artificial-image prediction unit 114 in accordance with the degrees of artificiality of the individual pixels. The synthesizer 116 outputs the synthesized HD image to a subsequent device.

If the image conversion processing is continuously performed on a plurality of images, steps S11 through S17 are repeated.

Figure 13:
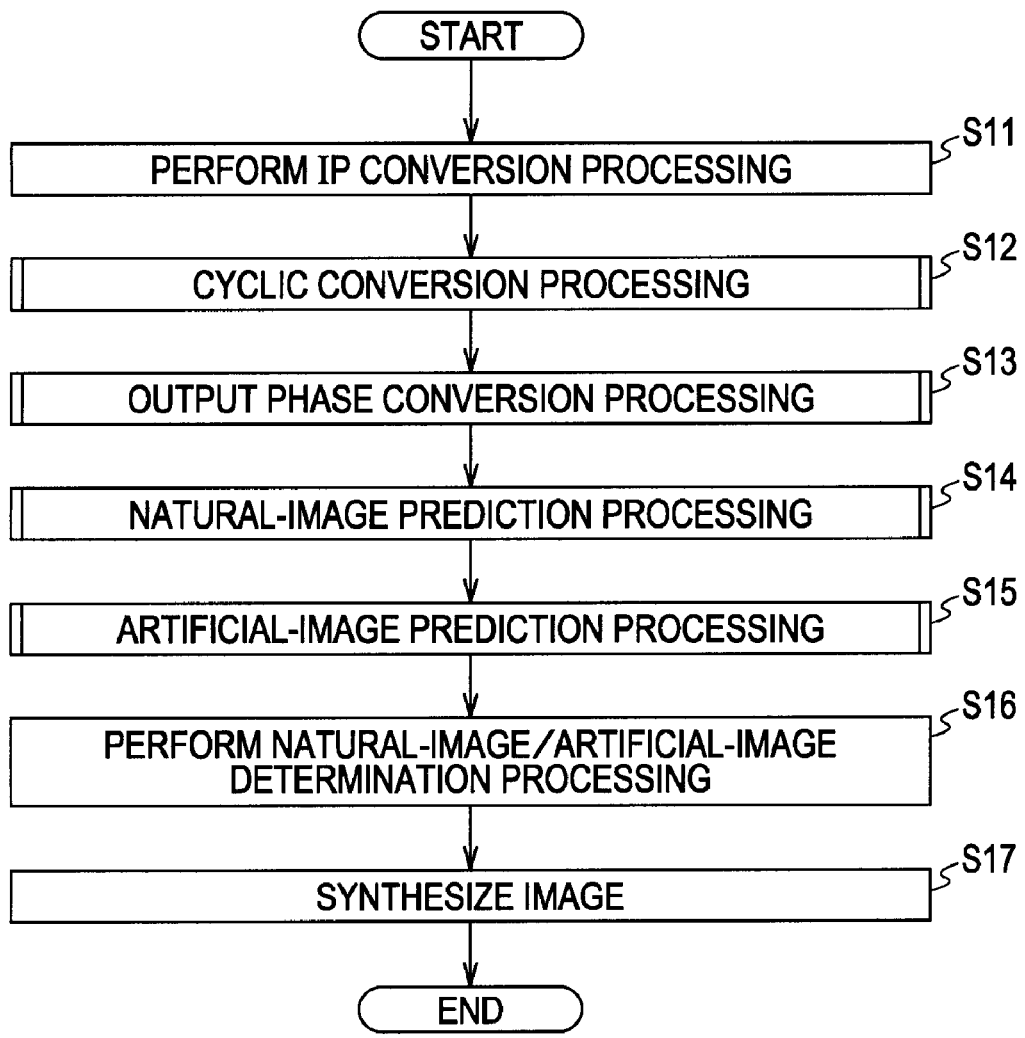
FIG. 13 is a flowchart illustrating image conversion processing performed by the image conversion device shown in FIG. 8.

Details of the cyclic conversion processing in step S12 in FIG. 13 are discussed below with reference to the flowchart in FIG. 15.

In step S21, the motion vector detector 131 performs motion vector detection processing. According to this processing, the sub-pixel-precision motion vector V of each pixel of the image I1 is detected. The motion vector detector 131 also supplies information indicating the horizontal motion VX and the vertical motion VY of the detected motion vector V to the MC block difference detector 132, the cyclic-coefficient setting unit 133, and the motion compensator 134. The image I1 and the image P3 used for detecting the motion vector V are also supplied to the MC block difference detector 132 from the motion vector detector 131. Details of the motion vector detection processing are discussed below with reference to FIG. 25.

In step S22, the MC block difference detector 132 detects MC block differences. A technique for detecting MC block differences is discussed below with reference to FIGS. 16 and 17.

Figure 16:
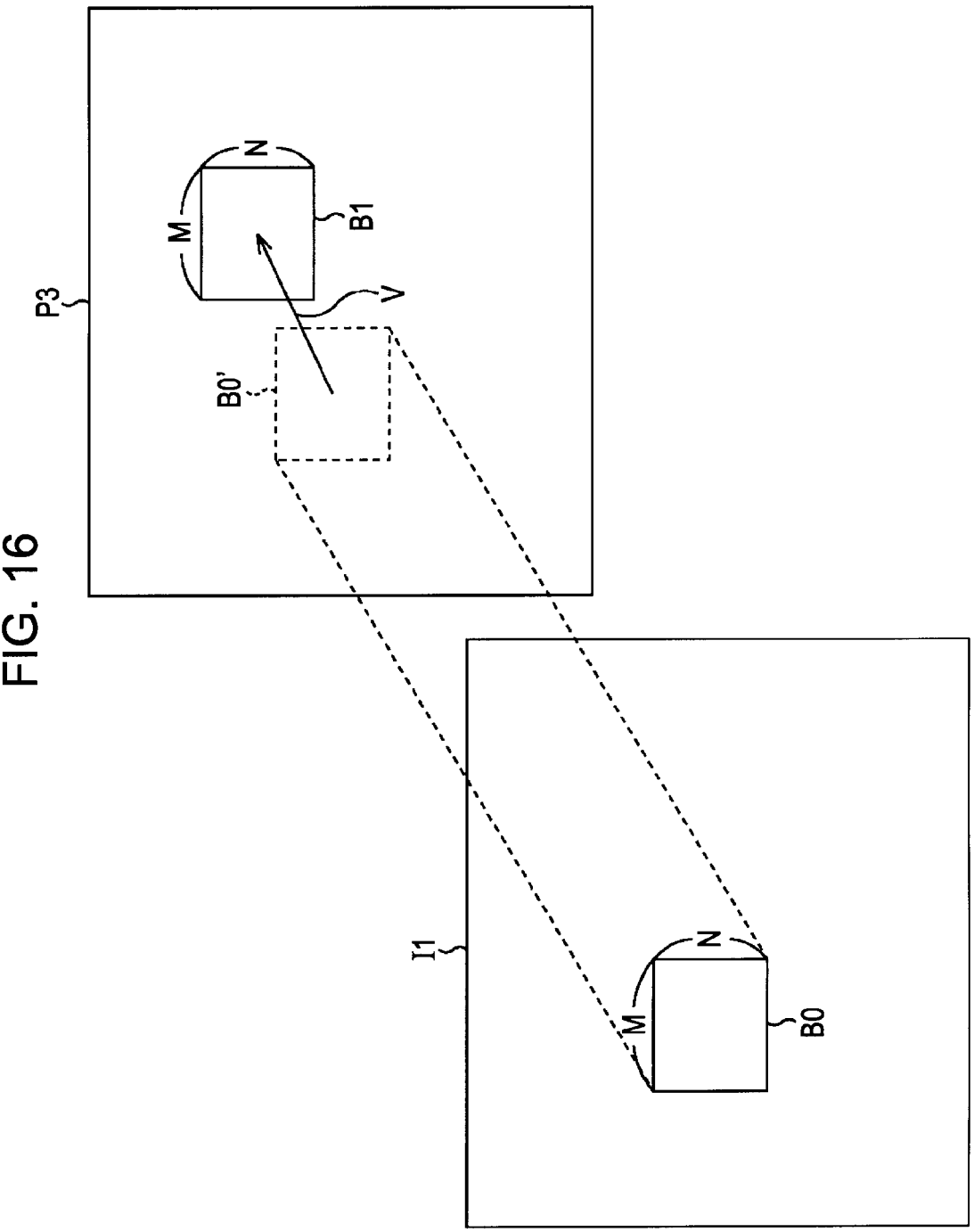
FIG. 16 illustrates an approach to detecting a motion compensation (MC) block difference BD.

The block of the image P3 located at a position corresponding to the position of the block B0 of the image I1 is set to be B0', as shown in FIG. 16. The block shifted from the block B0' by the direction and distance indicated by the motion vector V of the block B0 is set to be B1.

The horizontal motion VX and the vertical motion VY may contain decimal fractions since the motion vector V is a sub-pixel precision vector. In this case, the positions of the pixels forming the block B1 do not coincide with the actual positions of the pixels in the image P3. A technique for calculating the correct pixel values of the pixels forming the block B1 is discussed below with reference to FIG. 17.

Figure 17:
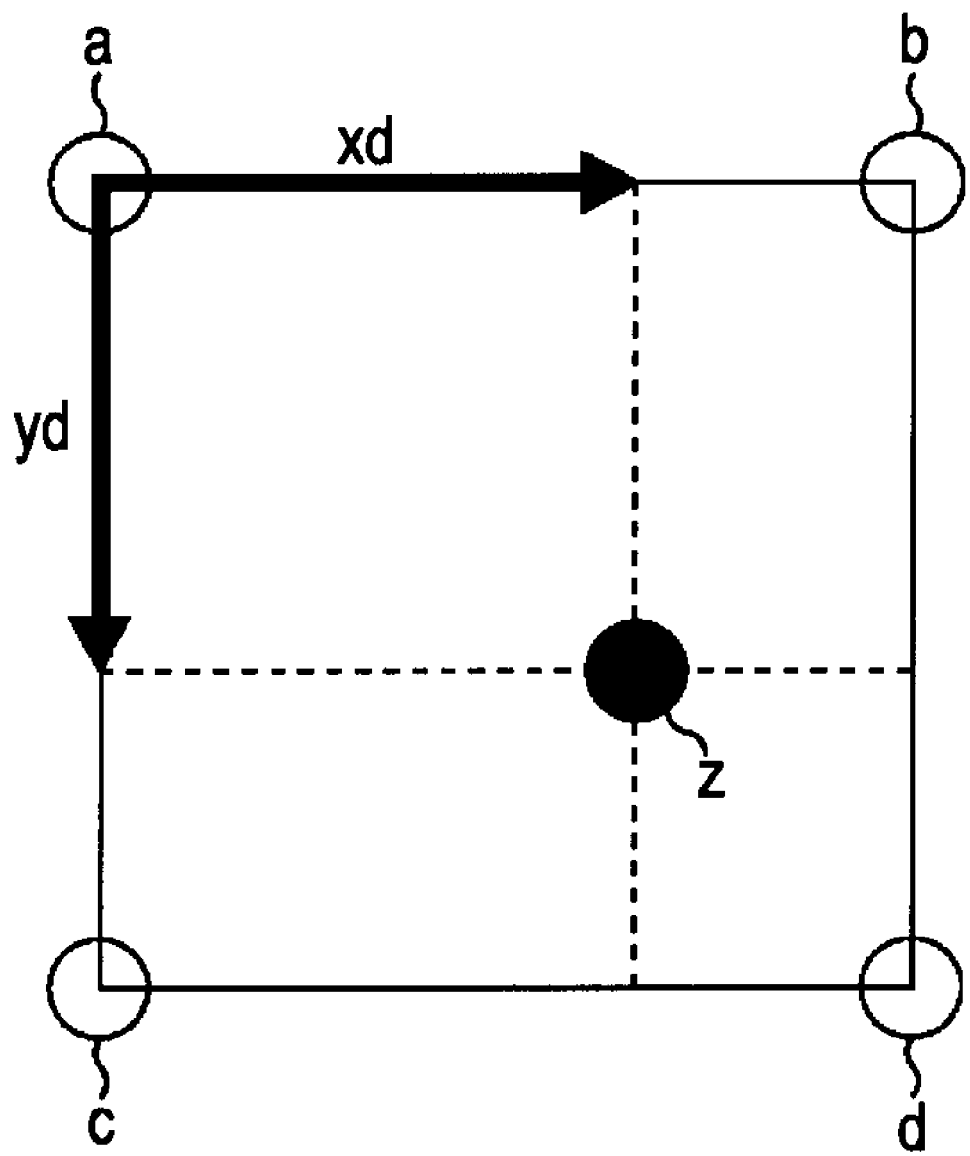
FIG. 17 illustrates an approach to detecting an MC block difference BD.

The pixel z indicated by the black circle in FIG. 17 is one pixel in the block B1 and does not exist in the image P3. The pixels a through d indicated by the white circles are pixels which exist in the image P3 and are located most adjacent to the pixel z. It is now assumed that the pixel values of the pixels a through d and the pixel z are represented by $a_v$ through $d_v$ and $z_v$, respectively, and that the distance in the x axis direction and the distance in the y axis direction between the pixel z and the pixel a positioned obliquely toward the top left are indicated by xd and yd, respectively. In this case, the pixel value $z_v$ of the pixel z can be calculated according to the following equation (1).

$$z_v = (1-yd) \times ((1-xd) \times a_v + xd \times b_v) + yd \times ((1-xd) \times c_v + xd \times d_v) \quad (1)$$

If the positions of the pixels in the block B1 coincide with those of the actual pixels of the image P3, the pixel values of the image P3 can be directly used as those of the block B1.

After calculating the pixel value of each pixel in the block B1, the MC block difference detector 132 calculates the MC block difference BD according to the following equation (2):

$$BD = \sum_{i=0}^{M-1} \sum_{j=0}^{N-1} |B0(i, j) - B1(i, j)| \quad (2)$$

where B0($i$, j) designates the pixel value of the pixel in the block B0 located at the position (i, j) when the reference pixel, which is located at the top left corner of the block B0, is positioned at the origin (0, 0), and B1(i, j) indicates the pixel value of the pixel in the block B1 located at the position (i, j) when the reference pixel, which is located at the top left corner of the block B1, is positioned at the origin (0, 0). That is, the MC block difference BD is the sum of the absolute values of the differences of the pixel values of the corresponding pixels between the block B0 and the block B1.

As the difference between the block image of the current frame and that of the previous frame is greater, the MC block difference BD becomes larger. Accordingly, it is highly likely that a block having a larger MC block difference BD is a block located in an image area with a complicated motion because of the deformation or complicated motion of a subject, the existence of edges in the subject, or the existence of a plurality of small subjects. It is thus highly likely that the motion vector V detected for that block is not correct, and the reliability of the motion vector V is low.

The MC block difference detector 132 detects the MC block difference BD for each block of the image I1, and supplies information indicating the detected MC block difference BD to the MC-block-difference subtraction amount calculator 182.

In step S23, the basic-cyclic-coefficient setting unit 171 sets basic cyclic coefficients. More specifically, the basic-cyclic-coefficient setting unit 171 sets the basic cyclic coefficient KA0 for an A type pixel of the image P1 on the basis of the vertical motion VY of the block which contains that A type pixel and the graph shown in FIG. 18. The basic-cyclic-coefficient setting unit 171 also sets the basic cyclic coefficient KB0 for a B type pixel of the image P1 on the basis of the vertical motion VY of the block which contains that B type pixel and the graph shown in FIG. 19.

Figure 18:
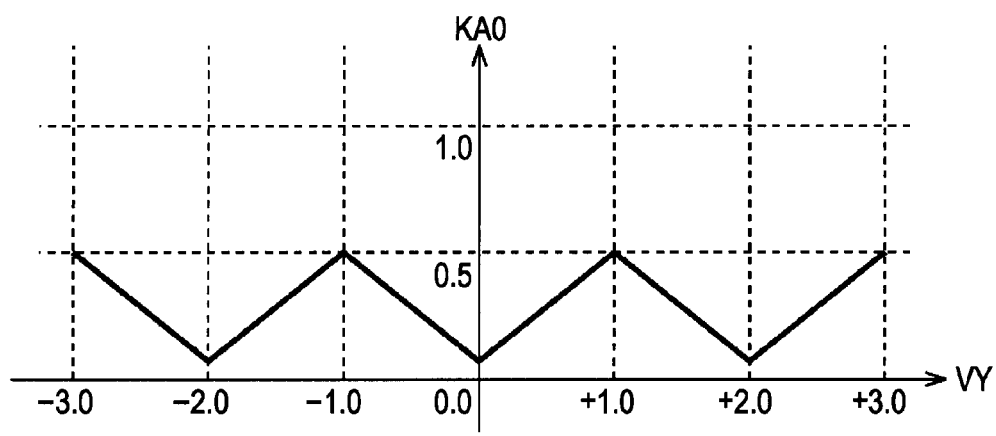
FIG. 18 is a graph illustrating the relationship between the vertical motion VY and the basic cyclic coefficient KA0.
Figure 19:
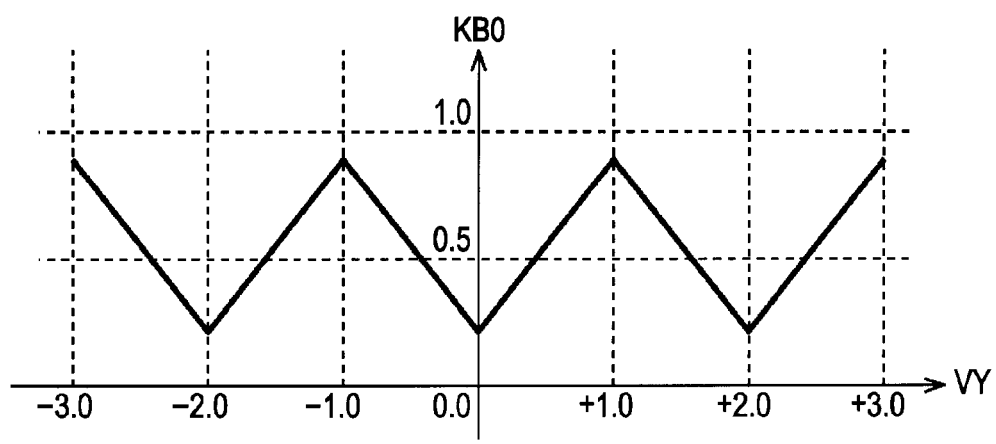
FIG. 19 is a graph illustrating the relationship between the vertical motion VY and the basic cyclic coefficient KB0.

The graph shown in FIG. 18 indicates the relationship between the vertical motion VY and the basic cyclic coefficient KA0, while the graph shown in FIG. 19 indicates the relationship between the vertical motion VY and the basic cyclic coefficient KB0.

Figure 20:
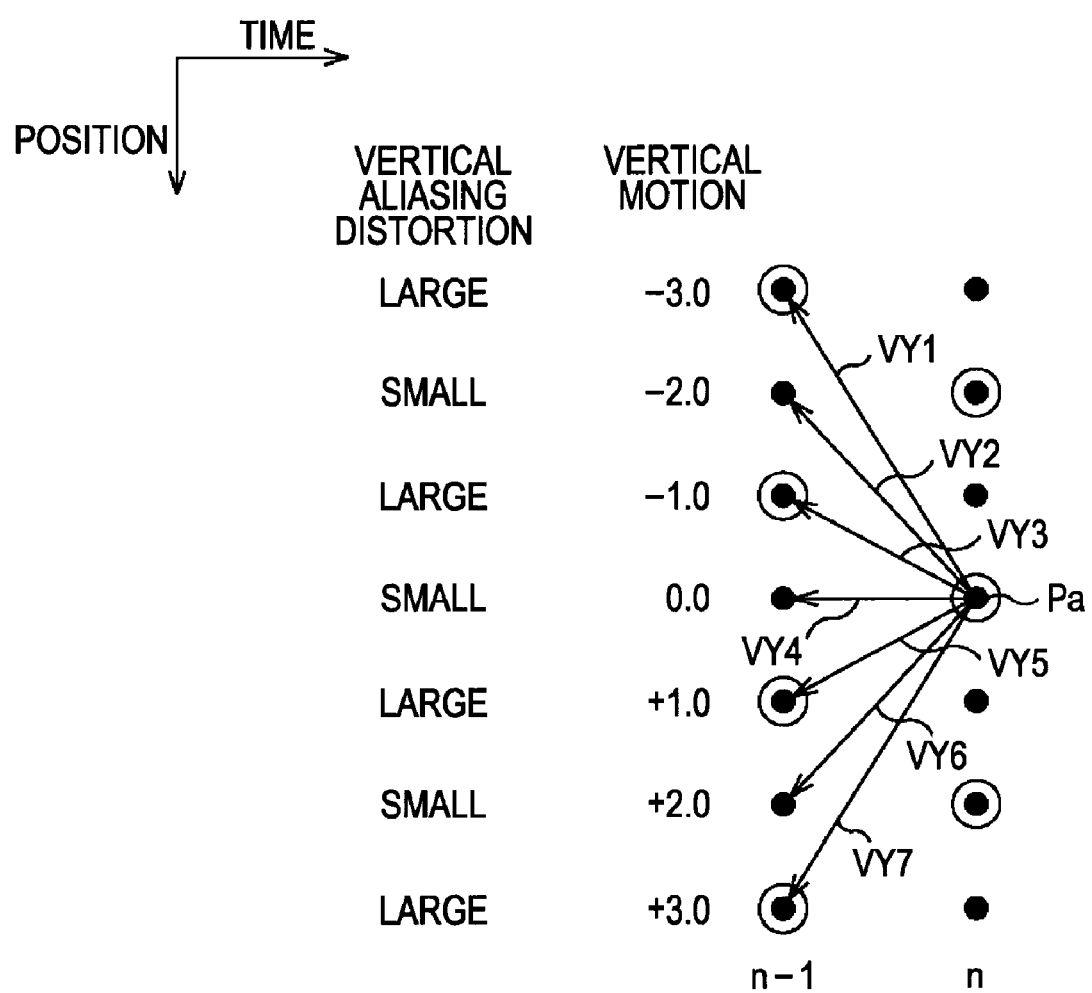
FIG. 20 illustrates the relationship between the vertical motion VY and the level of vertical aliasing distortion.

In images, the vertical aliasing distortion tends to be changed in accordance with the sub-pixel precision vertical motion. More specifically, the vertical aliasing distortion becomes greater as the absolute value of the vertical motion of each pixel is closer to an odd-number multiple of the pixel interval, and conversely, the vertical aliasing distortion becomes smaller when the absolute value of the vertical motion of each pixel is 0 or as it is closer to an even-number multiple of the pixel interval. As shown in FIG. 20, for example, as the vertical motion VY of the pixel Pa of the n-th frame is closer to an odd-number multiple of the pixel interval, the vertical aliasing distortion becomes greater, such as VY1, VY3, VY5, and VY7. Conversely, when the vertical motion VY of the pixel Pa is 0.0 or as it is closer to an even-number multiple of the pixel interval, the vertical aliasing distortion becomes smaller, such as VY2, VY4, and VY6.

As described below, as the cyclic coefficient is larger, the effect of suppressing the vertical aliasing distortion becomes higher, but on the other hand, the occurrence of image blur becomes higher. As the cyclic coefficient is smaller, the effect of suppressing the vertical aliasing distortion becomes lower, but on the other hand, the occurrence of image blur becomes lower. Accordingly, as shown in FIGS. 18 and 19, as the absolute value of the vertical motion VY is 0 or closer to an even number, i.e., as it is closer to an even-number multiple of the vertical pixel interval, the basic cyclic coefficients KA0 and KB0 are set to be smaller in order to suppress image blur. Conversely, as the absolute value of the vertical motion VY is closer to an odd number, i.e., as it is closer to an odd-number multiple of the vertical pixel interval, the basic cyclic coefficients KA0 and KB0 are set to be larger in order to suppress the vertical aliasing distortion.

When the absolute value of the vertical motion VY is 0 or an even number, the vertical aliasing distortion does not occur. To eliminate elements other than the vertical aliasing distortion, such as random noise, however, the basic cyclic coefficients KA0 and KB0 may be set to be suitable values other than 0, as shown in FIGS. 18 and 19.

Since B type pixels are not contained in the original image I1 before conversion, the influence of slight image blur on the image quality can be ignored. To further suppress aliasing distortion and random noise, therefore, the basic cyclic coefficient KB0 is set to be greater than the basic cyclic coefficient KA0 for the same vertical motion VY.

In this manner, by setting the basic cyclic coefficients KA0 and KB0 in accordance with the pixel type and the vertical motion, vertical aliasing distortion and random noise can be suppressed while maintaining high resolution of image P1, i.e., without the occurrence of image blur.

The basic-cyclic-coefficient setting unit 171 supplies information indicating the basic cyclic coefficients KA0 and KB0 to the subtractors 183-1 and 183-3, respectively.

In step S24, the motion distribution detector 172 detects the motion distribution. The motion distribution is discussed below with reference to FIGS. 21 and 22.

Figure 21:
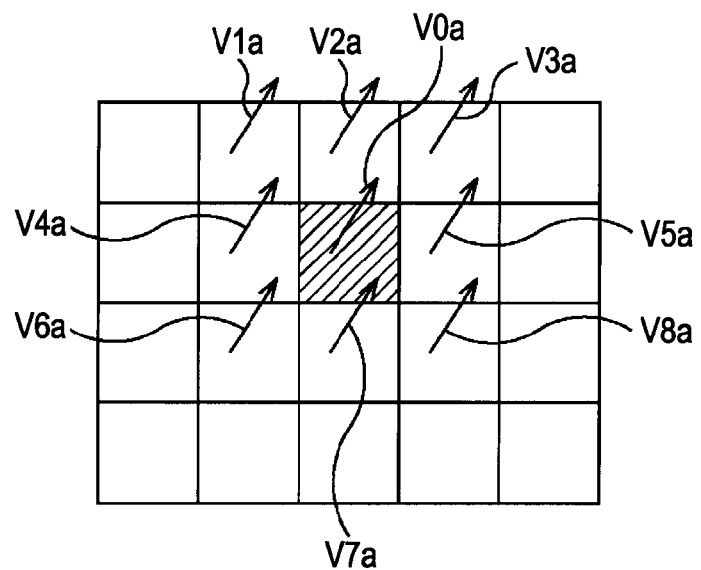
FIG. 21 illustrates an example of the distribution of motion vectors.
Figure 22:
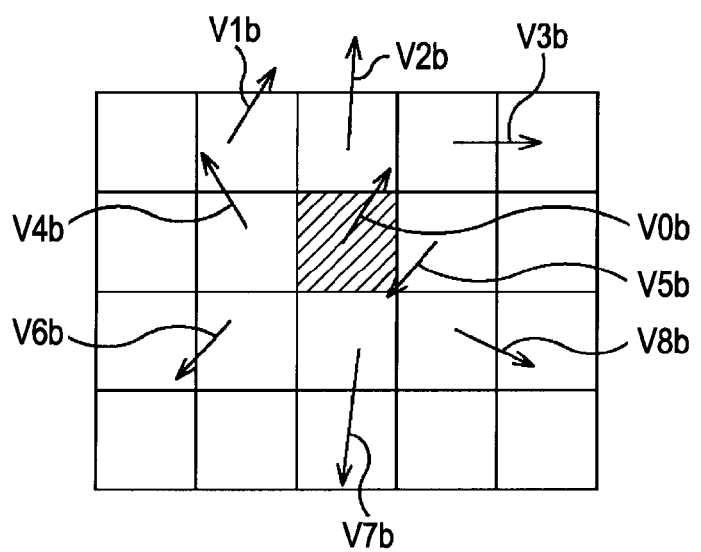
FIG. 22 illustrates another example of the distribution of motion vectors.

FIGS. 21 and 22 illustrate examples of motion distributions. When the motion vector V0a of the block indicated by the hatched portion is, as shown in FIG. 21, substantially similar to the motion vectors V1a through V8a of the surrounding blocks, i.e., when the similarity between the motion vector V0a and the motion vectors V1a through V8a of the surrounding blocks is high, it is likely that the motion vector V0a has been correctly determined. That is, the reliability of the motion vector V0a is high.

On the other hand, as shown in FIG. 22, when the magnitude and the orientation of the motion vector V0b of the block indicated by the hatched portion greatly differ from those of the motion vectors V1b through V8b of the surrounding blocks, i.e., when the similarity between the motion vector V0b and the motion vectors V1b through V8b of the surrounding blocks is low, it is likely that the motion vector V0b has not been correctly determined. That is, the reliability of the motion vector V0b is low.

Accordingly, as the reliability of the motion vector V detected by the motion vector detector 131, the motion distribution detector 172 detects the motion distribution MD0 representing the degree of distribution of the motion vector V in relation to the surrounding motion vectors V.

Figure 23:
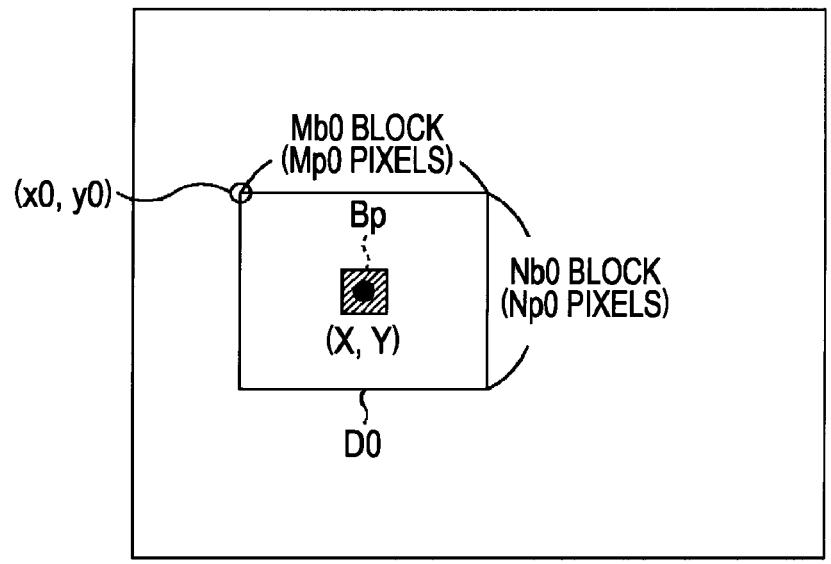
FIG. 23 illustrates a technique for calculating the motion distribution MD0.

More specifically, the motion distribution MD0(X, Y) of the motion vector V(X, Y) of the block Bp, indicated by the hatched portion in FIG. 23, which is located at the coordinates (X, Y) is calculated according to the following equation (3) for an Nb0-row×Mb0-column block (Np0-row×Mp0-column pixel) area D0:

$$MD0 = \frac{\sum_{y=y0}^{y0+Np0-1} \sum_{x=x0}^{x0+Np0-1} \left( \begin{array}{c} (vx0(x, y) - VX(X, Y))^2 + \\ (vy0(x, y) - VY(X, Y))^2 \end{array} \right)}{Mp0 \times Np0} \quad (3)$$

where vx0(x, y) indicates the horizontal motion of the block that contains the pixel at the coordinates (x, y), and vy0(x, y) represents the vertical motion of the block that contains the pixel at the coordinates (x, y). The coordinates of the pixel at the top left corner of the area D0 are (x0, y0).

That is, the motion distribution MD0 is represented by the average of the squares of the distances between the motion vector V of the block Bp and the motion vectors V of the individual pixels of the area D0.

The motion distribution detector 172 also detects, for each motion vector V as the reliability of the motion vector V, the motion distribution MD1 representing the distribution of the motion vector V in relation to the motion vectors V of the surrounding pixels (or blocks) of the previous frame that are shifted from the previous frame corresponding to the current frame by the direction and the distance indicated by the motion vector V.

Figure 24:
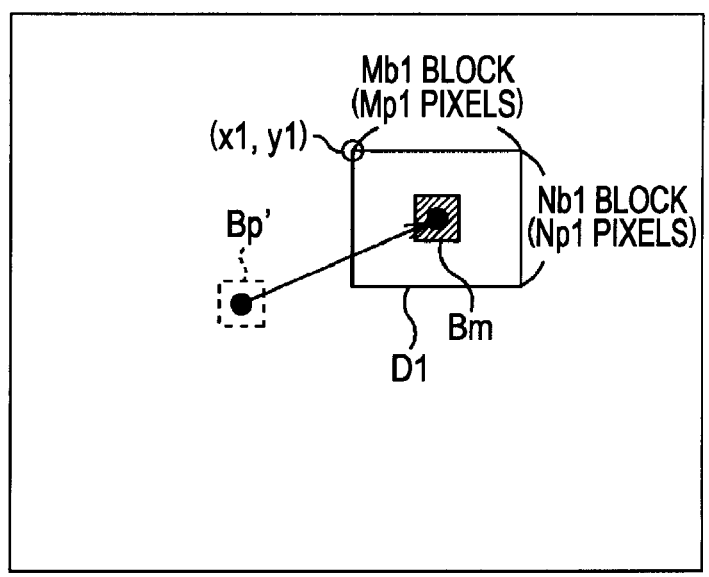
FIG. 24 illustrates a technique for calculating the motion distribution MD1.

More specifically, the block of the previous frame located at the corresponding position of the block Bp shown in FIG. 23 is set to be the block Bp' shown in FIG. 24. The block shifted from the block Bp' by the direction and the distance indicated by the value with the rounded decimal fractions of the horizontal motion VX(X, Y) and the vertical motion VY(X, Y) of the motion vector V(X, Y) of the block Bp is set to be Bm. The motion distribution detector 172 calculates the motion distribution MD1(X, Y) for the motion vector V(X, Y) of the block Bp for an Nb1-row×Mp1-column (Np1-row× Mp1-column pixel) block area D1 around the block Bm according to the following equation (4):

$$MD1 = \frac{\sum_{y=y1}^{y1+Np1-1} \sum_{x=x1}^{x1+Mp1-1} \left( \begin{array}{c} (vx1(x, y) - VX(X, Y))^2 + \\ (vy1(x, y) - VY(X, Y))^2 \end{array} \right)}{Mp1 \times Np1} \quad (4)$$

where vx1(x, y) indicates the horizontal motion of the block that contains the pixel of the previous frame at the coordinates (x, y), and vy1(x, y) represents the vertical motion of the block of the previous frame that contains the pixel at the coordinates (x, y). The coordinates of the pixel at the top left corner of the area D1 are (x1, y1).

That is, the motion distribution MD1 is represented by the average of the squares of the distances between the motion vector V of the block Bp and the motion vectors V of the individual pixels of the area D1.

The motion distribution detector 172 further calculates the motion distribution MD(X, Y) according to the following equation (5).

$$MD(X,Y)=MD1(X,Y)+MD2(X,Y) \quad (5)$$

Accordingly, as the distribution of the subject motion vector V in relation to the surrounding motion vectors V is larger, the motion distribution MD(X, Y) becomes larger. That is, it is highly likely that the pixel and the adjacent pixels corresponding to the motion vector V(X, Y) are contained in an image area with a complicated motion because of the deformation or complicated motion of a subject or the existence of a plurality of small subjects. It is thus highly likely that the motion vector V has not been correctly determined and the reliability of the motion vector V is low.

The motion distribution detector 172 calculates the motion distribution MD for each motion vector V according to the above-described technique, and supplies information indicating the detected motion distribution MD to the motion-distribution subtraction amount calculator 181.

In step S25, the motion-distribution subtraction amount calculator 181 calculates the motion-distribution subtraction amount. More specifically, the motion-distribution subtraction amount calculator 181 calculates the motion-distribution subtraction amount KM1 for each pixel of the image P1 by using the motion distribution MD of the block containing that pixel according to the following equation (6):

$$KM1(x,y)=a1 \times MD(X,Y)+b1 \quad (6)$$

where a1 and b1 are predetermined constants (a1 is a positive constant). If the value of the right side in equation (6) is smaller than 0, KM1(x, y) is adjusted to be 0.

The motion-distribution subtraction amount calculator 181 supplies information indicating the calculated motion-distribution subtraction amounts KM1 to the subtractors 183-1 and 183-3.

In step S26, the MC-block-difference subtraction amount calculator 182 determines the MC-block-difference subtraction amount. More specifically, the MC-block-difference subtraction amount calculator 182 calculates the MC-block-difference subtraction amount KM2 for each pixel of the image P1 by using the MC block difference BD of the block containing that pixel according to the following equation (7):

$$KM2(x,y)=a2 \times BD(X,Y)+b2 \quad (7)$$

where a2 and b2 are predetermined constants (a2 is a positive constant). If the value of the right side in equation (7) is smaller than 0, KM2(x, y) is adjusted to be 0.

In step S27, the subtractors 183-1 through 183-4 calculate cyclic coefficients. More specifically, the subtractor 183-1 subtracts the motion-distribution subtraction amount KM1 from the basic cyclic coefficient KA0 and supplies the resulting value to the subtractor 183-2. The subtractor 183-2 subtracts the MC-block-difference subtraction amount KM2 from the value supplied from the subtractor 183-1 and supplies the resulting value to the product sum computation unit 135 as the cyclic coefficient KA. That is, the cyclic coefficient KA(x, y) for an A type pixel located at the coordinates (x, y) of the image P1 is calculated according to the following equation (8).

$$KA(x,y)=KA0(x,y)-KM1(x,y)-KM2(x,y) \quad (8)$$

The subtractor 183-3 subtracts the motion-distribution subtraction amount KM1 from the basic cyclic coefficient KB0 and supplies the resulting value to the subtractor 183-4. The subtractor 183-4 subtracts the MC-block-difference subtraction amount KM2 from the value supplied from the subtractor 183-3 and supplies the resulting value to the product sum computation unit 135 as the cyclic coefficient KB. That is, the cyclic coefficient KB(x, y) for a B type pixel located at the coordinates (x, y) of the image P1 is calculated according to the following equation (9).

$$KB(x,y)=KB0(x,y)-KM1(x,y)-KM2(x,y) \quad (9)$$

That is, the cyclic coefficients KA(x, y) and KB(x, y) are corrected to be smaller as the motion-distribution subtraction amount KM1(x, y) or the MC-block-difference subtraction amount KM2(x, y), i.e., the motion distribution MD(x, y) or the MC block difference BD(x, y), becomes larger.

In step S28, the motion compensator 134 performs motion compensation on the output image of the previous frame. More specifically, the motion compensator 134 reads out the image P3 of the previous frame from the frame memory 136 and performs motion compensation on the image P3 by using the motion vector V to generate the motion-compensated image P4.

The pixel values of the pixels of the image P4 are equal to the pixel values of the pixels of the image P3 located at the corresponding positions shifted from the image P1 by the directions and the distances indicated by the motion vectors V. If pixels do not exist at the positions of the image P3 shifted from the image P1 since the horizontal motion VX or the vertical motion VY of the motion vector V contains decimal fractions, the pixel values of the image P4 are calculated by a technique similar to that discussed with reference to FIG. 17.

The motion compensator 134 sequentially supplies the pixel values P4(x, y) of the image P4 to the product sum computation unit 135.

In step S29, the product sum computation unit 135 synthesizes an image and completes the cyclic conversion processing. More specifically, the product sum computation unit 135 adds the pixel values of the pixels located at corresponding positions of the image P1 and the image P4 by using the cyclic coefficients KA0 and KB0 as weights. That is, the product sum computation unit 135 calculates, for A type pixels, the pixel values P2(x, y) of the image P2 by using the cyclic coefficients KA according to the following equation (10), and calculates, for B type pixels, the pixel values P2(x, y) of the image P2 by using the cyclic coefficients KB according to the following equation (11).

$$P2(x,y)=(1-KA(x,y))\times P1(x,y)+KA(x,y)\times P4(x,y) \quad (10)$$

$$P2(x,y)=(1-KB(x,y))\times P1(x,y)+KB(x,y)\times P4(x,y) \quad (11)$$

Generally, as the cyclic coefficients KA(x, y) and KB(x, y) become larger, the ratio of the components of the image P4 that make up the image P2 becomes greater. Accordingly, the effect of suppressing vertical aliasing distortion becomes greater, but on the other hand, the occurrence of image blur becomes higher. In contrast, as the cyclic coefficients KA(x, y) and KB(x, y) become smaller, the ratio of the components of the image P4 that make up the image P2 becomes smaller. Accordingly, the effect of suppressing vertical aliasing distortion becomes smaller, but on the other hand, the occurrence of image blur becomes lower.

In this embodiment, as stated above, the cyclic coefficients KA(x, y) and KB(x, y) become smaller as the motion-distribution subtraction amount KM1(x, y) or the MC-block-difference subtraction amount KM2(x, y), i.e., the motion distribution MD(x, y) or the MC block difference BD(x, y), is greater.

More specifically, if the reliability of the motion vector V(X, Y) of the pixel positioned at the coordinates (x, y) is low, i.e., if the correlation between the pixel of the image P1 and the pixel of the image P4, which are to be added by using weights, is low, or if the possibility of the pixel being contained in an area having a complicated image motion with unnoticeable aliasing distortion or random noise is high, the ratio of the components of the pixel values P1(x, y) that make up the pixel values P2(x, y) is large. Conversely, if the reliability of the motion vector V(X, Y) of the pixel positioned at the coordinates (x, y) is high, i.e., if the correlation between the pixel of the image P1 and the pixel of the image P4, which are to be added by using weights, is high, or if the possibility of the pixel being contained in an area having a small motion over a wide range with noticeable aliasing distortion or random noise is high, the ratio of the components of the pixel values P1(x, y) that make up the pixel values P2(x, y) is small.

As the absolute value of the vertical motion VY(X, Y) is closer to an odd number, i.e., as vertical aliasing distortion is greater, the cyclic coefficients KA(x, y) and KB(x, y) become larger, and the components of the pixel values P4(x, y) that make up the pixel values P2(x, y) become greater. Conversely, as the absolute value of the vertical motion VY(X, Y) is 0 or closer to an even number, i.e., as vertical aliasing distortion is smaller, the cyclic coefficients KA(x, y) and KB(x, y) become smaller, and the components of the pixel values P1(x, y) that make up the pixel values P2(x, y) become greater.

Additionally, for the same vertical motion VY, the basic cyclic coefficient KB0 for a B type pixel is set to be larger than the basic cyclic coefficient KA0 for an A type pixel, and the motion-distribution subtraction amount KM1 and the MC-block subtraction amount KM2 do not change depending on the type of pixel. Accordingly, in the same image area, the cyclic coefficient KB(x, y) becomes greater than the cyclic coefficient KA(x, y), and thus, the ratio of the components of the pixel values P4(x, y) that make up the image pixels P2(x, y) becomes greater for the B type pixels than for the A type pixels.

Thus, in the resulting image P2, the high-resolution image quality can be obtained while suppressing vertical aliasing distortion and random noise and inhibiting the occurrence of image blur.

The product sum computation unit 135 supplies the generated image P2 to the output phase converter 112 and also stores the image P2 in the frame memory 136.

Figure 15:
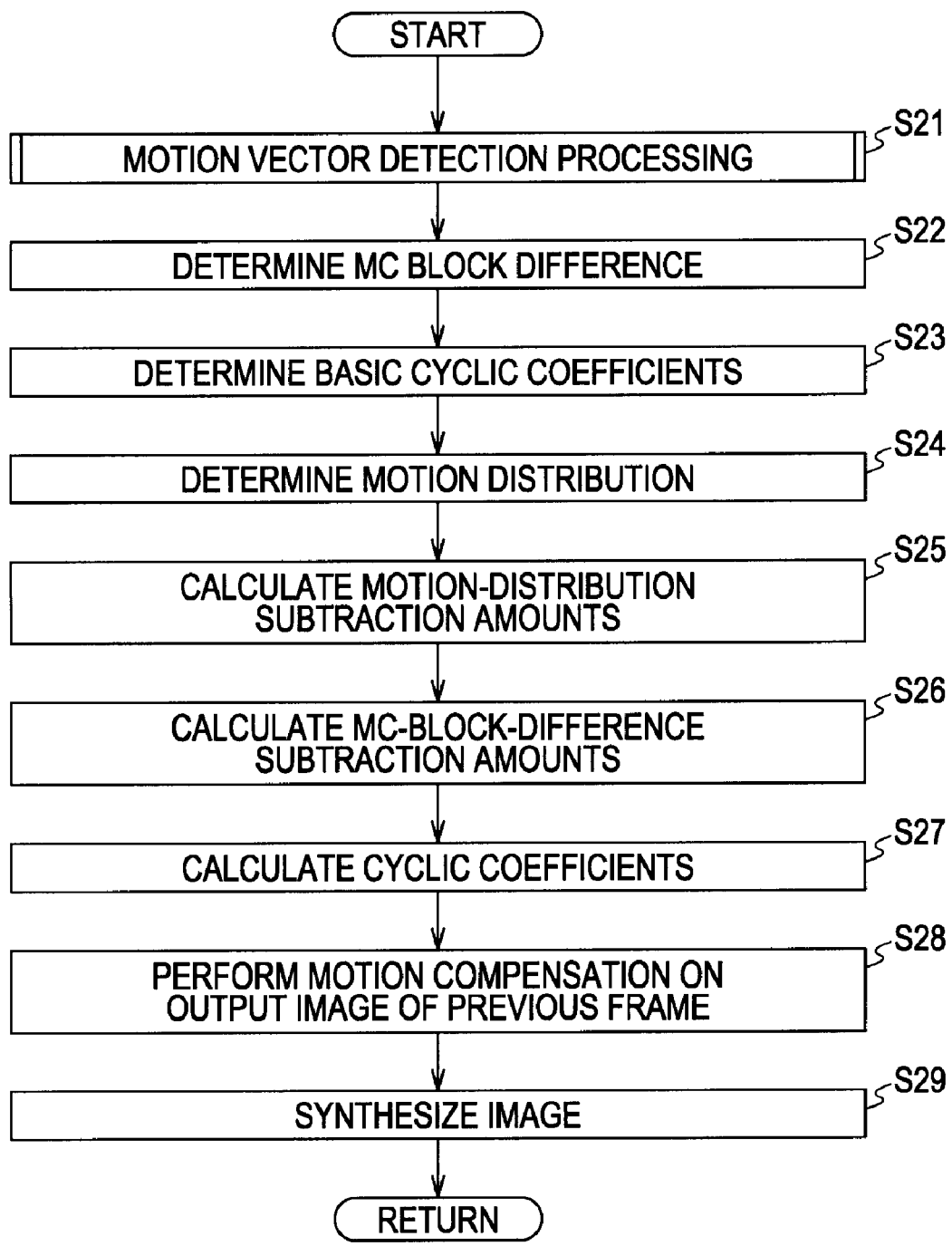
FIG. 15 is a flowchart illustrating details of cyclic conversion processing in step S12 in FIG. 13.

Details of the motion vector detection processing in step S21 in FIG. 15 are described below with reference to the flowchart in FIG. 25.

In step S41, the motion-estimated-value detector 151 obtains the image of the previous frame. More specifically, the motion-estimated-value detector 151 reads out the image P3, which is the output image of the previous frame, from the frame memory 136.

In step S42, the motion-estimated-value detector 151 calculates the motion estimated values at the pixel positions. More specifically, the motion-estimated-value detector 151 selects one block of the image I1 for which a motion vector has not been detected and sets the block as the subject block. The motion-estimated-value detector 151 sequentially selects the pixels in a predetermined area of the image P3 as subject pixels and determines the motion estimated value M(x, y) of each subject pixel according to the following equation (12):

$$M(x, y) = \sum_{i=0}^{M-1} \sum_{j=0}^{\frac{N-1}{2}} |I1(xb+i, yb+2j) - P3(x+i, y+2j)| \quad (12)$$

where (x, y) designates the coordinates of the subject pixel and (xb, yb) indicates the coordinates of the reference pixel at the top left corner of the subject block.

That is, the motion estimated value M is the sum of the absolute values of the differences of the pixel values at corresponding positions between a comparative block using the subject pixel as the reference pixel and the subject block. As the motion estimated value M is smaller, the image in the comparative block is closer to the image in the subject block.

The motion-estimated-value detector 151 supplies information indicating the detected motion estimated value M of each pixel to the pixel-precision motion vector detector 152 and the tap extracting units 153 and 154.

In step S43, the pixel-precision motion vector detector 152 detects a pixel-precision motion vector. More specifically, the pixel-precision motion vector detector 152 detects the pixel having the smallest motion estimated value M, i.e., the minimum estimated value pixel. The pixel-precision motion vector detector 152 detects the vector that connects the coordinates of the minimum estimated value pixel with the coordinates of the reference pixel of the subject block as the pixel-precision motion vector of the subject block. The pixel-precision motion vector detector 152 supplies information indicating the detected pixel-precision motion vector to the tap extracting units 153 and 154.

In step S44, the tap extracting unit 153 extracts prediction taps. More specifically, the tap extracting unit 153 extracts, as prediction taps, the motion estimated values M corresponding to the minimum estimated value pixel and the pixels of the image P3 near the minimum estimated value pixel.

Figure 26:
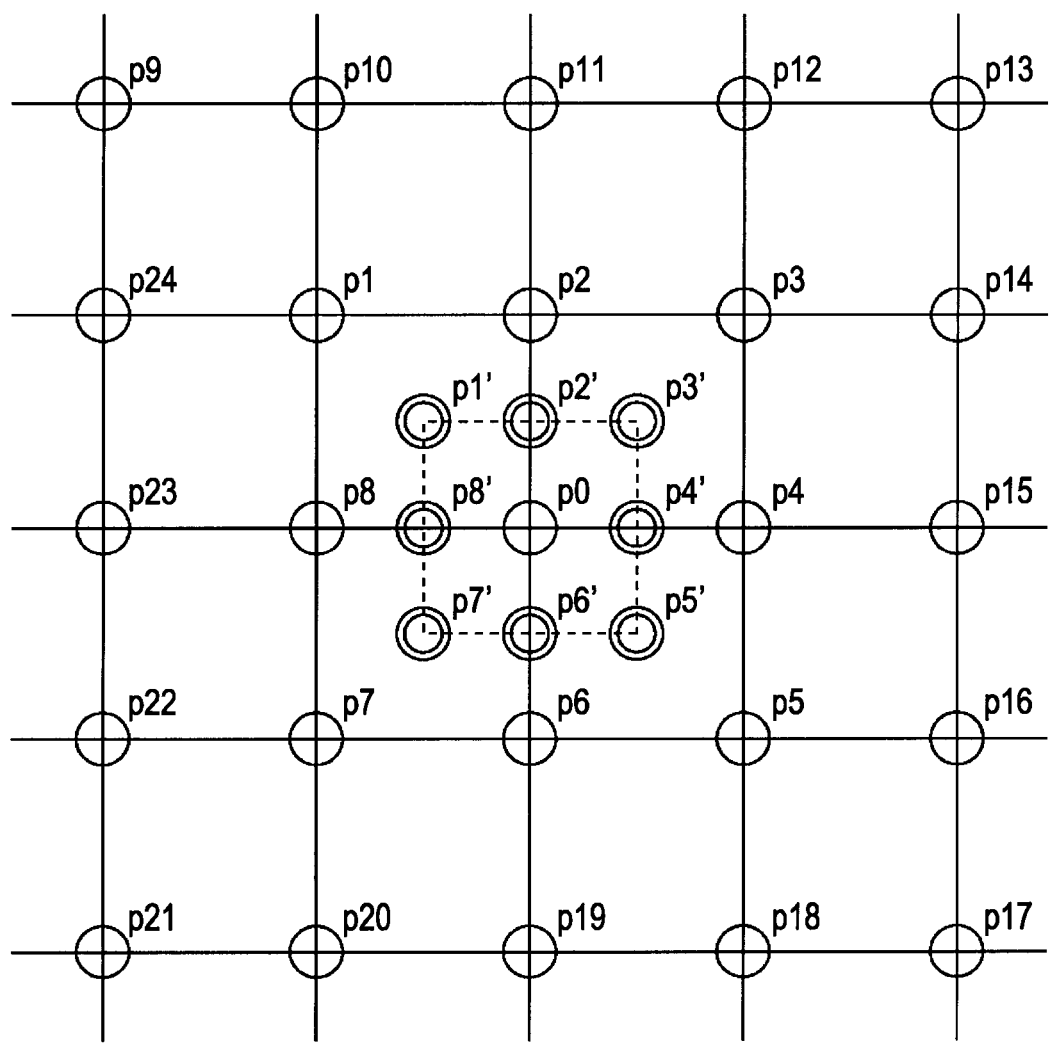
FIG. 26 is a technique for detecting sub-pixel-precision motion vectors.

FIG. 26 illustrates part of the image P3. In FIG. 26, the minimum estimated value pixel is set to be pixel p0, and the motion estimated values associated with the pixels p0 through p24 are set to be motion estimated values M0 through M24, respectively. The tap extracting unit 153 extracts, as prediction taps, for example, the motion estimated values M0 through M24 associated with the pixel p0, which is the minimum estimated value pixel, the pixels p1 through p8 around the pixel p0, and the pixels p9 through p24 around the pixels p1 through p8. The tap extracting unit 153 supplies the extracted prediction taps to the prediction computation unit 158.

In step S45, the tap extracting unit 154 extracts class taps. More specifically, in the example shown in FIG. 26, the tap extracting unit 154 extracts, as class taps, for example, the motion estimated values M0 through M8 associated with the pixel 0, which is the minimum estimated value pixel, and the pixels p1 through p8 adjacent to the pixel p0. The tap extracting unit 154 supplies the extracted class taps to the ADRC processor 155.

In step S46, the ADRC processor 155 performs ADRC processing. More specifically, the ADRC processor 155 performs ADRC processing on the motion estimated values M of the pixels forming the class taps and supplies information indicating the resulting ADRC code to the classification unit 156.

In step S47, the classification unit 156 performs classification processing. More specifically, the classification unit 156 classifies the minimum estimated value pixel based on the ADRC code supplied from the ADRC processor 155, and supplies information indicating the class code associated with the resulting class to the coefficient memory 157.

In step S48, the coefficient memory 157 supplies the tap coefficient. More specifically, the coefficient memory 157 obtains the tap coefficient associated with the class code of the minimum estimated value pixel from a set of tap coefficients stored in the coefficient memory 157. The coefficient memory 157 supplies the obtained tap coefficient to the prediction computation unit 158.

In step S49, the prediction computation unit 158 performs prediction computation processing. More specifically, in the example shown in FIG. 26, the positions p1' through p8' in the middle of the straight lines connecting the pixel p0 with the pixels p1 through p8 are set to be prediction positions. In this case, the prediction computation unit 158 calculates the motion estimated values M1' through M8' at the positions p1' through p8', respectively, according to the following equation (13):

$$Mm' = \sum_{n=0}^{24} W_{mn} \times M_n = W_{m0} \times M_0 + \ldots + W_{m24} \times M_{24} \quad (13)$$

where m is 1 to 8, and $W_{mn}$ (n=0 through 24) represents tap coefficients used for calculating the motion estimated values Mm' (m=1 through 8) at the positions Pm' (m=1 through 8), respectively.

The prediction computation unit 158 supplies the motion estimated value Mm' at each prediction position to the sub-pixel-precision motion vector detector 159.

In step S50, the sub-pixel-precision motion vector detector 159 detects a sub-pixel-precision motion vector. More specifically, in the example shown in FIG. 26, the sub-pixel-precision motion vector detector 159 detects the minimum motion estimated value from among the motion estimated values of the pixel p0 and the positions p1' through p8'. The sub-pixel-precision motion vector detector 159 detects, as the sub-pixel-precision motion vector V, the vector that connects the coordinates of the minimum motion-estimated-value pixel or position with the coordinates of the reference pixel of the subject block. That is, in this example, the motion vector is detected with a precision of ½ the pixel interval.

By increasing the number of prediction positions between pixels, motion vectors can be detected with higher precision, i.e., in smaller units.

The sub-pixel-precision motion vector detector 159 supplies information indicating the detected motion vector V to the MC block difference detector 132, the cyclic-coefficient setting unit 133, and the motion compensator 134.

In step S51, the motion-estimated-value detector 151 determines whether motion vectors have been detected for all the blocks. If there is any block for which a motion vector has not been detected, the process returns to step S42. Steps S42 through S51 are repeated until it is determined in step S51 that motion vectors have been detected for all the blocks.

If it is determined in step S51 that motion vectors have been detected for all the blocks, the process proceeds to step S52.

In step S52, the motion-estimated-value detector 151 supplies the images used for detecting the motion vectors, and then completes the sub-pixel-precision motion vector detection processing. More specifically, the motion-estimated-value detector 151 supplies the images I1 and P3 used for detecting the motion vectors to the MC block difference detector 132.

Learning for tap coefficients to be stored in the coefficient memory 157 is as follows.

Learning for tap coefficients in classification adaptation processing is first discussed on the basis of a generalized example. More specifically, learning for tap coefficients based on a linear coupling model is discussed below. In the linear coupling model, the pixel value y of a pixel forming an HD image (hereinafter sometimes referred to as an "HD pixel") is determined from pixels forming an SD image (hereinafter sometimes referred to as "SD pixels") by using a tap coefficient and a plurality of SD pixels, which are extracted as prediction taps used for predicting the HD pixel, according to linear coupling expressed by the following linear expression (14):

$$y = \sum_{n=1}^{N} W_n x_n \quad (14)$$

where $x_n$ represents the pixel value of the n-th pixel of the SD image forming the prediction taps for the HD pixel y, and $W_n$ designates the n-th tap coefficient to be multiplied by the n-th pixel value of the SD image. It should be noted that the prediction taps are formed of N SD image pixels $x_1, x_2, \ldots,$ and $x_N$ in equation (14).

If the true value of the pixel value of the k-sample HD pixel is represented by $y_k$ and the prediction value of the true value $y_k$ obtained by equation (14) is represented by $y_k'$, the prediction error $e_k$ can be expressed by the following equation (15).

$$e_k = y_k - y_k' \quad (15)$$

The prediction value $y_k'$ in equation (15) can be obtained by equation (14). Accordingly, if equation (14) is substituted into equation (15), the following equation can be found:

$$e_k = y_k - \left( \sum_{n=1}^{N} W_n x_{n,k} \right) \quad (16)$$

where $x_{n,k}$ designates the n-th SD pixel forming the prediction taps for the k-sample HD pixel.

The tap coefficient $W_n$ that reduces the prediction error $e_k$ in equation (16) to 0 is the optimal tap coefficient $W_n$ for predicting the HD pixel. Generally, however, it is difficult to obtain such a tap coefficient $W_n$ for all HD pixels.

If, for example, the method of least squares, is employed as the standard for representing that the tap coefficient $W_n$ is optimal, the optimal tap coefficient $W_n$ can be obtained by minimizing the statistical error, such as the total error E of square errors expressed by the following equation (17):

$$E = \sum_{k=1}^{K} e_k^2 \quad (17)$$

where K is the number of samples of sets of the HD pixels $y_k$ and the SD pixels $x_{1,k}, x_{2,k}, \ldots, x_{N,k}$ forming the prediction taps for the HD pixels $y_k$.

The minimum value of the total error E of the square errors in equation (17) can be given by the tap coefficient $W_n$ that allows the value obtained by partially differentiating the total error E with respect to the tap coefficient $W_n$ to be 0, as expressed by equation (18).

$$\frac{\partial E}{\partial W_n} = e_1 \frac{\partial e_1}{\partial W_n} + e_2 \frac{\partial e_2}{\partial W_n} + \ldots + e_k \frac{\partial e_{k2}}{\partial W_n} = 0 \quad (18)$$

$$(n = 1, 2, \ldots, N)$$

Then, if equation (18) is partially differentiated with respect to the tap coefficient $W_n$, the following equation can be found.

$$\frac{\partial e_k}{\partial W_1} = -x_{1,k}, \frac{\partial e_k}{\partial W_2} = -x_{2,k}, \ldots, \frac{\partial e_k}{\partial W_N} = -x_{N,k}, \quad (19)$$

$$(k = 1, 2, \ldots, K)$$

The following equation can be found from equations (18) and (19).

$$\sum_{k=1}^{K} e_k x_{1,k} = 0, \sum_{k=1}^{K} e_k x_{2,k} = 0, \ldots \sum_{k=1}^{K} e_k x_{N,k} = 0 \quad (20)$$

By substituting equation (16) into $e_k$ in equation (20), equation (20) can be represented by normal equations, as expressed by equation (21).

$$\begin{bmatrix} \left( \sum_{k=1}^{K} x_{1,k} x_{1,k} \right) & \left( \sum_{k=1}^{K} x_{1,k} x_{2,k} \right) & \cdots & \left( \sum_{k=1}^{K} x_{1,k} x_{N,k} \right) \\ \left( \sum_{k=1}^{K} x_{2,k} x_{1,k} \right) & \left( \sum_{k=1}^{K} x_{2,k} x_{2,k} \right) & \cdots & \left( \sum_{k=1}^{K} x_{2,k} x_{N,k} \right) \\ \vdots & \vdots & \ddots & \vdots \\ \left( \sum_{k=1}^{K} x_{N,k} x_{1,k} \right) & \left( \sum_{k=1}^{K} x_{N,k} x_{2,k} \right) & \cdots & \left( \sum_{k=1}^{K} x_{N,k} x_{N,k} \right) \end{bmatrix} \begin{bmatrix} W_1 \\ W_2 \\ \vdots \\ W_N \end{bmatrix} = \begin{bmatrix} \left( \sum_{k=1}^{K} x_{1,k} y_k \right) \\ \left( \sum_{k=1}^{K} x_{2,k} y_k \right) \\ \vdots \\ \left( \sum_{k=1}^{K} x_{N,k} y_k \right) \end{bmatrix} \quad (21)$$

By preparing a certain number of sets of HD pixels $y_k$ and SD pixels $x_{n,k}$, the same number of normal equations expressed by equation (21) as the number of the tap coefficients $W_n$ to be determined can be established. Accordingly, by solving the normal equations expressed by equation (21), the optimal tap coefficient $W_n$ can be determined. To solve the normal equations expressed by equation (21), for example, a sweeping-out method (Gauss-Jordan elimination method), may be employed. To solve the normal equation expressed by equation (21), the matrix in the left side corresponding to the tap coefficient $W_n$ should be regular.

As discussed above, the optimal tap coefficient $W_n$ can be determined by solving the normal equations expressed by equation (21) by using many HD pixels $y_1, y_2, \ldots, y_k$ as supervisor data for learning tap coefficients and SD pixels $x_{1,k}, x_{2,k}, \ldots, x_{N,k}$ forming the prediction taps for each HD pixel $y_k$ as learner data for learning tap coefficients.

In this case, as supervisor data y, an image including pixels at prediction positions, i.e., having a pixel density higher than the image P3, and more specifically, a high-density image having motion estimated values M (hereinafter referred to as a "motion estimated supervisor image") detected for the individual pixels, is used. As learner data x, an image generated by reducing the number of pixels from the motion estimated supervisor image so that the pixel density of the resulting image becomes equal to that of the image P3 is used. Then, the tap coefficient used in equation (13) can be determined.

Details of a technique for detecting sub-pixel-precision motion vectors using classification adaptation processing are disclosed in, for example, Japanese Unexamined Patent Application Publication No. 9-187013 previously filed by the assignee of this application.

As described above, an interlace image can be converted into a higher-quality progressive image.

Since an image without vertical aliasing distortion or noise is output from the cyclic IP converter 111, a higher quality image can be obtained in a subsequent image processing apparatus. For example, in processing for adjusting the image quality in terms of a plurality of elements by using classification adaptation processing, such as that disclosed in Japanese Unexamined Patent Application Publication No. 2002-218413 previously filed by the assignee of this application, it is possible to adjust the image quality so that the resolution can be increased, resulting in a higher quality image.

In the above-described example, the image associated with the image I1 for which a motion vector V is detected is the image P3, which is the output image of the previous frame (one frame before). Alternatively, instead of the image P3, an image I2, which is the input image of the previous field (one field before), or an image I3, which is the input image of two fields before, may be used.

For the sub-pixel-precision motion vector detection processing, a method other than the above-described method may be employed.

In the above-described example, an SD image is subjected to IP conversion. Alternatively, a higher resolution image, such as an HD image, may be subjected to IP conversion by the cyclic converter 122.

Figure 27:
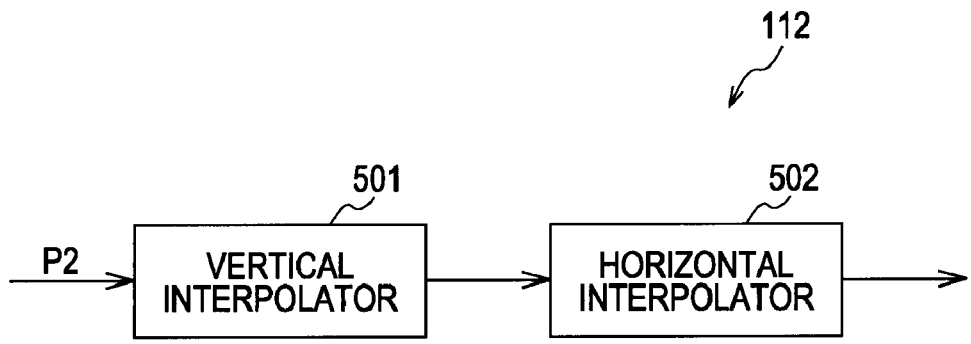
FIG. 27 is a block diagram illustrating an example of the detailed configuration of an output phase converter.

FIG. 27 is a block diagram illustrating the detailed configuration of an example of the output phase converter 112 shown in FIG. 8.

The output phase converter 112 shown in FIG. 27 includes a vertical interpolator 501 and a horizontal interpolator 502, and converts the image P2, which is a progressive SD image supplied from the cyclic converter 122, into a progressive HD image.

The vertical interpolator 501 sequentially selects, as subject conversion pixels, pixels forming the HD image to be converted from the SD image supplied from the cyclic converter 122. The vertical interpolator 501 also extracts, as conversion taps, some pixels forming the SD image for determining the subject conversion pixel. The vertical interpolator 501 performs computation for shifting the vertical phase of the SD image (such computation is hereinafter referred to as the "vertical phase shift computation") by using the conversion taps. The vertical interpolator 501 then supplies the value as a result of the vertical phase shift computation to the horizontal interpolator 502.

The horizontal interpolator 502 performs computation for shifting the horizontal phase of the value supplied from the vertical interpolator 501 (such computation is hereinafter referred to as the "horizontal phase shift computation"). The horizontal interpolator 502 then supplies, as the pixel value of the subject conversion pixel, i.e., the pixel value of the pixel forming the HD image, the value as a result of the horizontal phase shift computation to the natural-image prediction unit 113, the artificial-image prediction unit 114, and the natural-image/artificial-image determining unit 115 shown in FIG. 8.

The vertical phase shift computation and the horizontal phase shift computation performed by the output phase converter 112 are described below with reference to FIG. 28.

Figure 28:
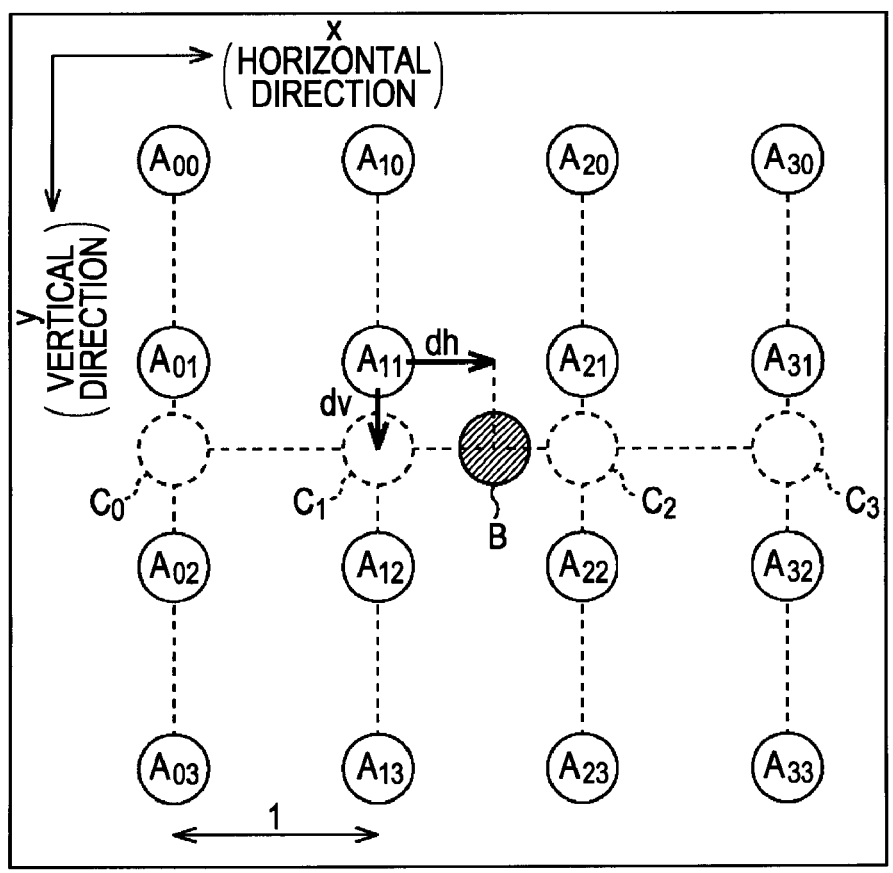
FIG. 28 illustrates vertical phase shirt computation and horizontal phase shift computation.

In FIG. 28, conversion taps are formed of 16 pixels of the SD image before conversion, such as four pixels $A_{11}$, $A_{12}$, $A_{22}$, and $A_{21}$ around the subject conversion pixel B and 12 pixels $A_{00}$, $A_{01}$, $A_{02}$, $A_{03}$, $A_{13}$, $A_{23}$, $A_{33}$, $A_{32}$, $A_{31}$, $A_{30}$, $A_{20}$, and $A_{10}$ around the four pixels $A_{11}$, $A_{12}$, $A_{22}$, and $A_{21}$ in the horizontal and vertical directions.

In the pixel $A_{ij}$ (i and j are one of 0, 1, 2, and 3), i designates the horizontal order of the pixel $A_{ij}$ among the pixels forming the conversion taps, and j represents the vertical order of the pixel $A_{ij}$ among the pixels forming the conversion taps. It is now assumed that the horizontal order is sequentially provided from the left and the vertical order is sequentially provided from the top.

It is also assumed that the subject conversion pixel B is away from the pixel $A_{11}$ by a distance dh in the horizontal direction and by a distance dv in the vertical direction and that the horizontal and vertical distances between adjacent pixels $A_{ij}$ are 1.

When the pixel value of the pixel $A_{ij}$ forming the conversion taps is $a_{ij}$, the vertical interpolator 501 performs vertical phase shift computation by using the pixel value $a_{ij}$ and the distance dv according to the following equation (22):

$$bx_i = \sum_{j=0}^{3} c(j - dv - 1) \cdot a_{ij} \tag{22}$$

where $bx_i$ is the pixel value of the pixel $C_i$ which is assumed that it is vertically located at the same position as the subject conversion pixel B and it is horizontally located at the same position as the pixel $A_{ij}$, and where c(j−dv−1) is the interpolation coefficient and is, for example, a sync function determined based on a sampling constant. The interpolation coefficient c may be a value obtained by multiplying the sinc function by a suitable window function.

Then, the horizontal interpolator 502 performs horizontal phase shift computation according to equation (23) by using the four values $bx_i$ determined in equation (22) and the distance dh to determine the pixel value by of the subject conversion pixel B.

$$by = \sum_{i=0}^{3} c(i - dh - 1) \cdot bx_i \tag{23}$$

Details of the output phase conversion processing in step S13 in FIG. 13 performed by the output phase converter 112 shown in FIG. 27 are discussed below with reference to the flowchart in FIG. 29.

In step S501, the vertical interpolator 501 selects, as the subject conversion pixel B, a pixel forming a progressive HD image to be converted from the image P2, which is a progressive SD image supplied from the cyclic converter 122. The vertical interpolator 501 also extracts some pixels forming the SD image for determining the subject conversion pixel B as conversion taps, such as those shown in FIG. 28.

In step S502, the vertical interpolator 501 performs vertical phase shift computation by using the conversion taps according to equation (22), and supplies the resulting value $bx_i$ to the horizontal interpolator 502.

In step S503, the horizontal interpolator 502 performs horizontal phase shift computation by using the value $bx_i$ supplied from the vertical interpolator 501 according to equation (23) to determine the pixel value by of the subject conversion pixel B, i.e., the pixel value of the pixel forming the HD image. In step S504, the horizontal interpolator 502 outputs the pixel value of the pixel of the HD image determined in step S503 to the natural-image prediction unit 113, the artificial-image prediction unit 114, and the natural-image/artificial-image determining unit 115.

In step S505, the vertical interpolator 501 determines whether all the pixels forming the HD image to be converted from the SD image have been selected as the subject conversion pixels B, i.e., whether all the subject conversion pixels B have been generated. If it is determined in step S505 that not all the pixels forming the HD image has not been selected as the subject conversion pixels B, the process proceeds to step S506 to set a pixel that has not been selected as the subject conversion pixel B. Then, the process returns to step S501 and step S501 and the subsequent steps are repeated.

If it is determined in step S505 that all the pixels forming the HD image have been selected as the subject conversion pixels B, the output phase conversion processing is completed.

In this manner, a progressive HD image, which is an image having a target number of pixels, is generated.

Figure 30:
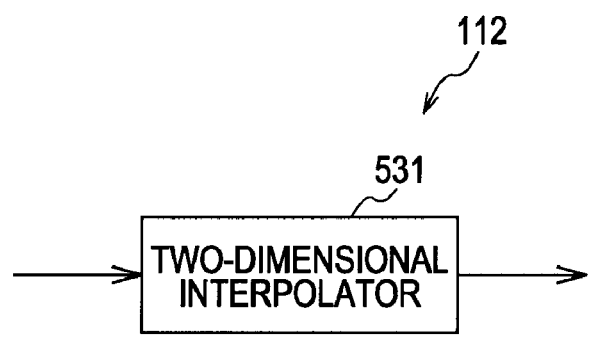
FIG. 30 is a block diagram illustrating another example of the detailed configuration of the output phase converter.

FIG. 30 is a block diagram illustrating another example of the detailed configuration of the output phase converter 112 shown in FIG. 8.

The output phase converter 112 shown in FIG. 30 includes a two-dimensional interpolator 531. Instead of independently performing a phase shift in the horizontal direction and in the vertical direction, which is performed by the output phase converter 112 shown in FIG. 27, the output phase converter 112 shown in FIG. 30 performs a phase shift in the horizontal and vertical directions at one time.

As in the vertical interpolator 501 shown in FIG. 27, the two-dimensional interpolator 531 sequentially selects, as the subject conversion pixels B, the pixels forming the progressive HD image to be converted from the image P2, which is a progressive SD image, supplied from the cyclic converter 122 shown in FIG. 8. The two-dimensional interpolator 531 also extracts, as conversion taps, some pixels forming the SD image used for determining the subject conversion pixel B.

The two-dimensional interpolator 531 then performs computation for shifting the phase of the SD image in the horizontal and vertical directions (such computation is hereinafter referred to as the "two-dimensional phase shift computation") by using the conversion taps. The two-dimensional interpolator 531 then supplies, as the pixel value of the subject conversion pixel B, i.e., the pixel value of the HD image, the value as a result of the two-dimensional phase shift computation, to the natural-image prediction unit 113, the artificial-image prediction unit 114, and the natural-image/artificial-image determining unit 115 shown in FIG. 8.

The two-dimensional phase shift computation performed by the two-dimensional interpolator 531 shown in FIG. 30 is discussed below with reference to FIG. 31.

Figure 31:
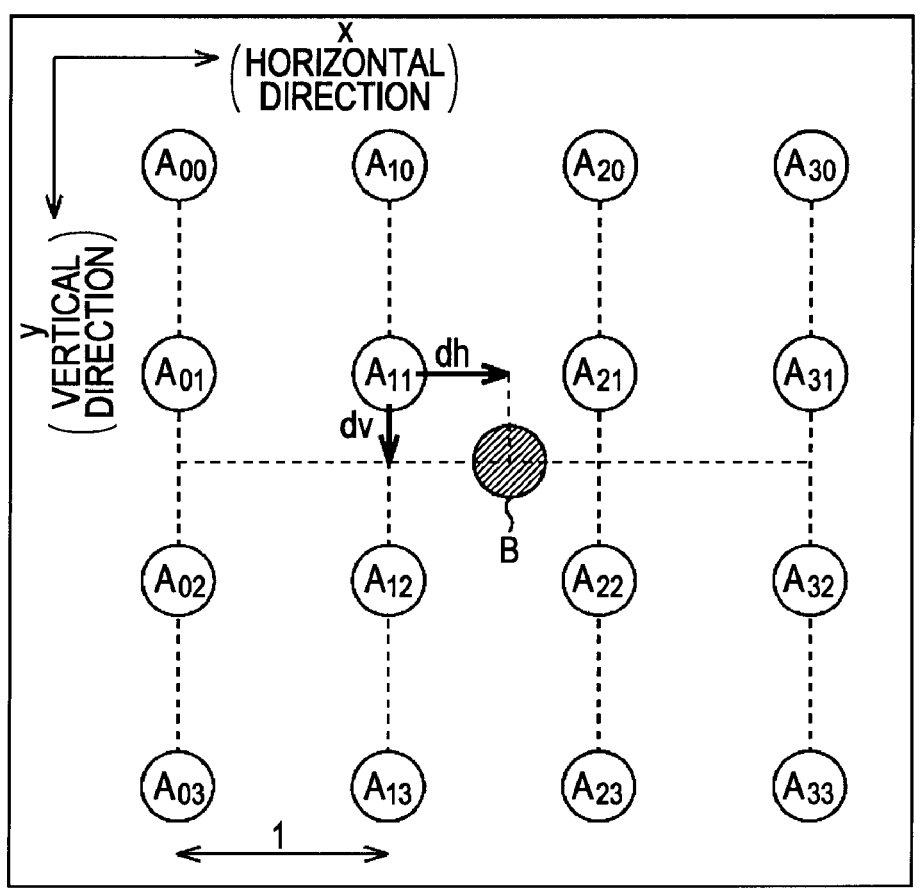
FIG. 31 illustrates two-dimensional phase shift computation.

In FIG. 31, the structures of the subject conversion pixel B and the conversion taps are the same as those shown in FIG. 28, and an explanation thereof is thus omitted here.

When the pixel value of the pixel $A_{ij}$ forming the conversion taps is $a_{ij}$, the two-dimensional interpolator 531 performs two-dimensional phase shift computation by using the pixel value $a_{ij}$ and the distances dv and dh according to the following equation (24) to determine the pixel value by of the subject conversion pixel B:

$$by = \sum_{i=0}^{3} \sum_{j=0}^{3} c_{ij}(dh, dv) \cdot a_{ij} \quad (24)$$

where $c_{ij}(dh, dv)$ is an interpolation coefficient for each pixel $A_{ij}$, and is, for example, a sync function determined based on a sampling constant.

Figure 32:
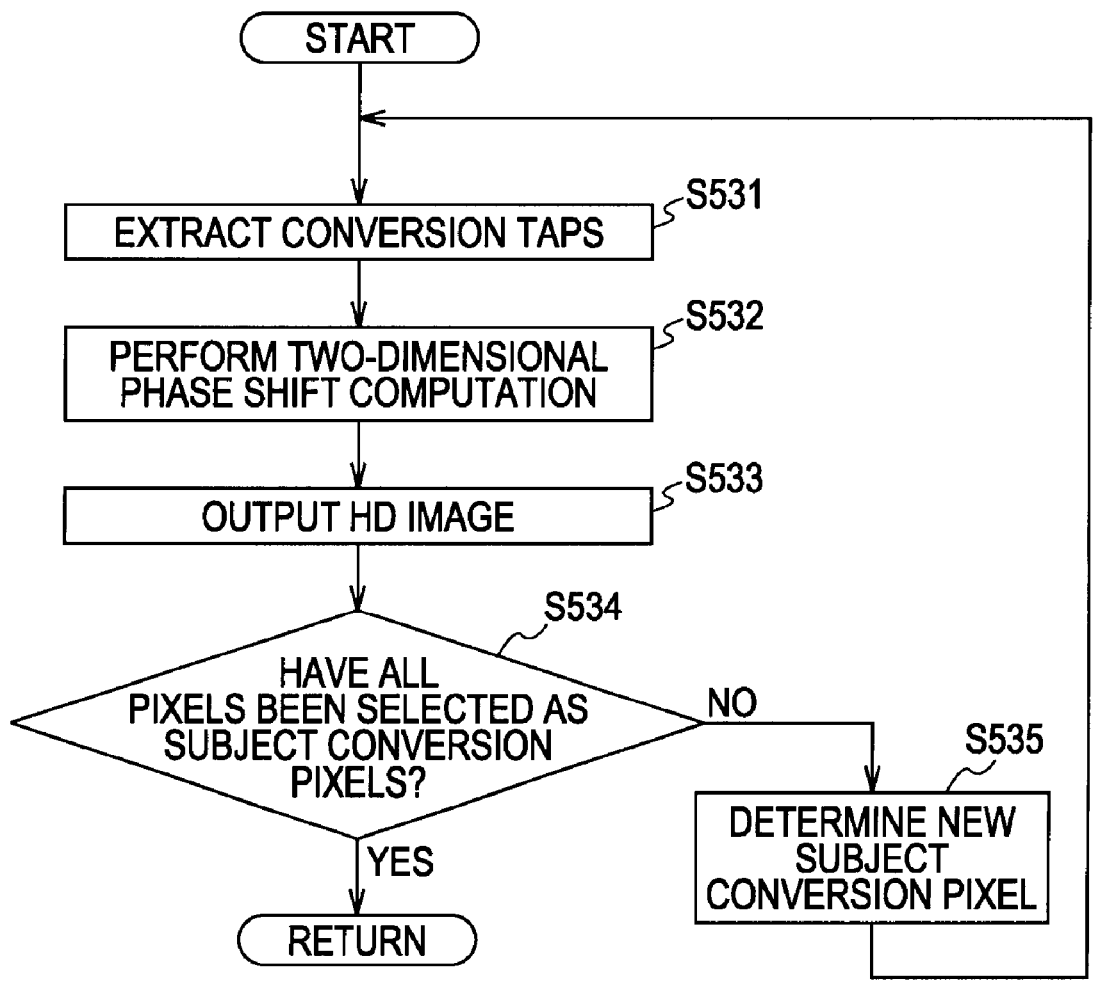
FIG. 32 is a flowchart illustrating details of another example of output phase conversion.

Details of the output phase conversion processing in step S13 in FIG. 13 performed by the two-dimensional interpolator 531 shown in FIG. 30 are discussed below with reference to the flowchart in FIG. 32.

In step S531, as in the vertical interpolator 501 shown in FIG. 27, the two-dimensional interpolator 531 selects, as the subject conversion pixel B, a pixel forming a progressive HD image converted from the image P2, which is a progressive SD image supplied from the cyclic converter 122. The two-dimensional interpolator 531 also extracts some pixels forming the SD image for determining the subject conversion pixel B as conversion taps, such as those shown in FIG. 31.

In step S532, the two-dimensional interpolator 531 performs two-dimensional phase shift computation by using the conversion taps according to equation (24) to determine the pixel value by of the subject conversion pixel B, i.e., the pixel value of the pixel forming the HD image.

In step S533, the two-dimensional interpolator 531 outputs the pixel value of the pixel forming the HD image determined in step S532 to the natural-image prediction unit 113, the artificial-image prediction unit 114, and the natural-image/artificial-image determining unit 115 shown in FIG. 8.

Figure 29:
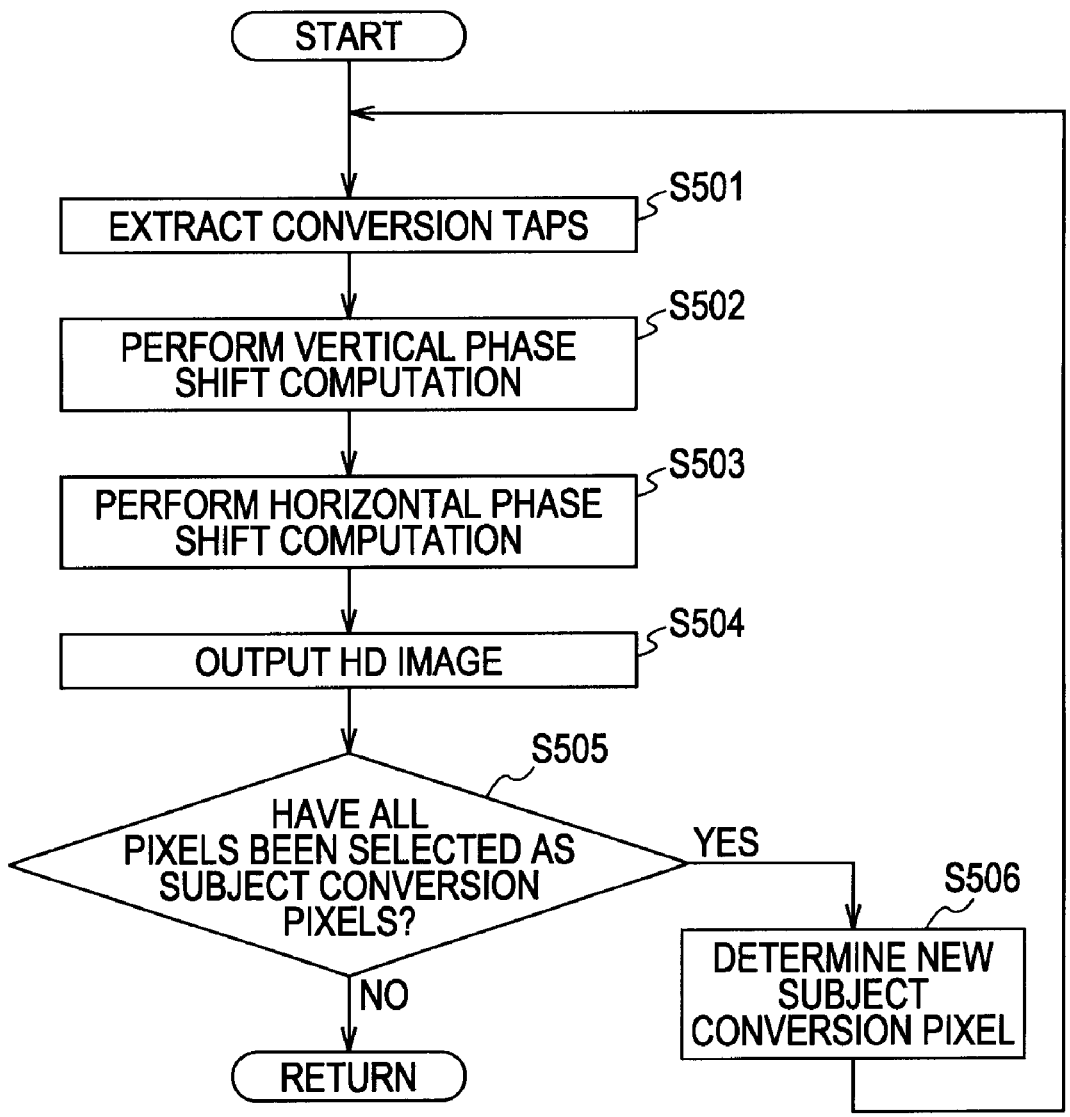
FIG. 29 is a flowchart illustrating details of an example of output phase conversion.

Steps S534 and S535 are similar to steps S505 and S506, respectively, in FIG. 29, and an explanation thereof is thus omitted here.

In the above-described example, assuming that the image input into the image conversion device 101 is an SD image and the image output from the image conversion device 101 is an HD image, the output phase converter 112 converts the SD image into the HD image. However, the images before and after conversion are not restricted to an SD image and an HD image, respectively, and other types of images may be used as long as the output phase converter 112 converts an input image into an image having the same number of pixels as that of an image output from the subsequent stage, i.e., from the natural-image prediction unit 131 or the artificial-image prediction unit 114.

Figure 33:
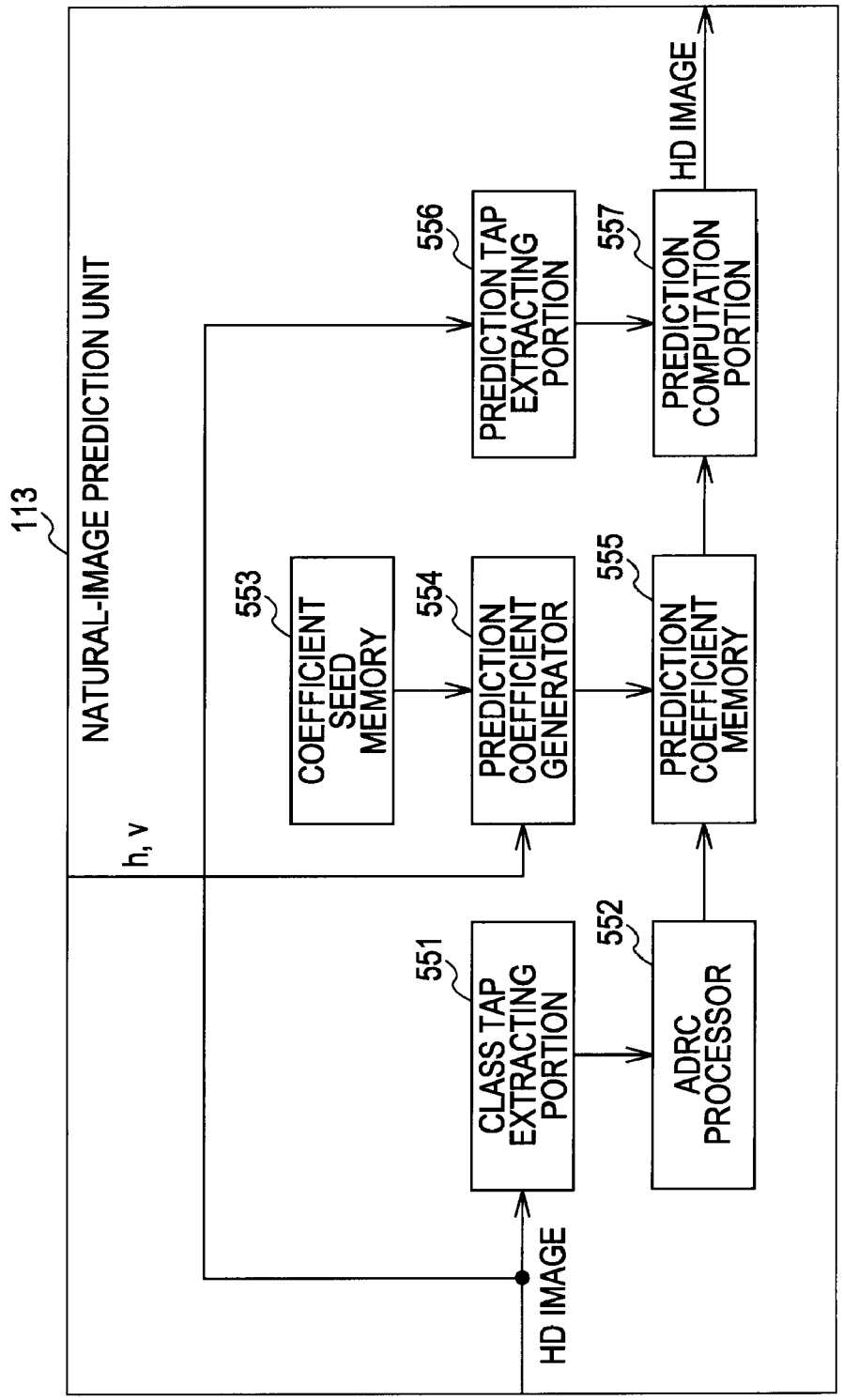
FIG. 33 is a block diagram illustrating the detailed configuration of a natural-image prediction unit.

FIG. 33 is a block diagram illustrating the configuration of the natural-image prediction unit 113 shown in FIG. 8.

The natural-image prediction unit 113 includes a class tap extracting portion 551, an ADRC processor 552, a coefficient seed memory 553, a prediction coefficient generator 554, a prediction coefficient memory 555, a prediction tap extracting portion 556, and a prediction computation portion 557. The natural-image prediction unit 113 predicts a high-quality natural image from the progressive HD image supplied from the output phase converter 112.

A progressive HD image supplied from the output phase converter 112 shown in FIG. 8 is supplied to the natural-image prediction unit 113, and more specifically, to the class tap extracting portion 551 and the prediction tap extracting portion 556.

The class tap extracting portion 551 sequentially selects the pixels forming the high-quality natural image determined from the input HD image as subject pixels, and extracts some of the pixels forming the HD image as class taps, which are used for classifying the subject pixels. The class tap extracting portion 551 then supplies the extracted class taps to the ADRC processor 552.

The ADRC processor 552 performs ADRC processing on the pixel values of the pixels forming the class taps supplied from the class tap extracting portion 551 to detect the ADRC code as the feature of the waveform of the class taps. The ADRC processor 552 determines the class based on the detected ADRC code to classify each subject pixel, and then supplies the determined class to the prediction coefficient memory 555.

The coefficient seed memory 553 stores a coefficient seed, which is obtained by learning discussed below with reference to FIGS. 37 through 39, for each class.

The prediction coefficient generator 554 reads a coefficient seed from the coefficient seed memory 553. The prediction coefficient generator 554 then generates a prediction coefficient from the read coefficient seed by using a polynomial containing a parameter h and a parameter v, which are input by a user, for determining the horizontal resolution and the vertical resolution, respectively, and supplies the generated prediction coefficient to the prediction coefficient memory 555.

The prediction coefficient memory 555 reads out the prediction coefficient according to the class supplied from ADRC processor 552, and supplies the read prediction coefficient to the prediction computation portion 557.

The prediction tap extracting portion 556 extracts, from the input HD image, as prediction taps, some of the pixels forming the HD image used for predicting the pixel value of a subject pixel. The prediction tap extracting portion 556 supplies the extracted prediction taps to the prediction computation portion 557.

The prediction computation portion 557 performs prediction computation by using the prediction taps supplied from the prediction tap extracting portion 556 and the prediction coefficient supplied from the prediction coefficient memory 555. Then, the prediction computation portion 557 outputs the HD image to the synthesizer 133.

Figure 34:
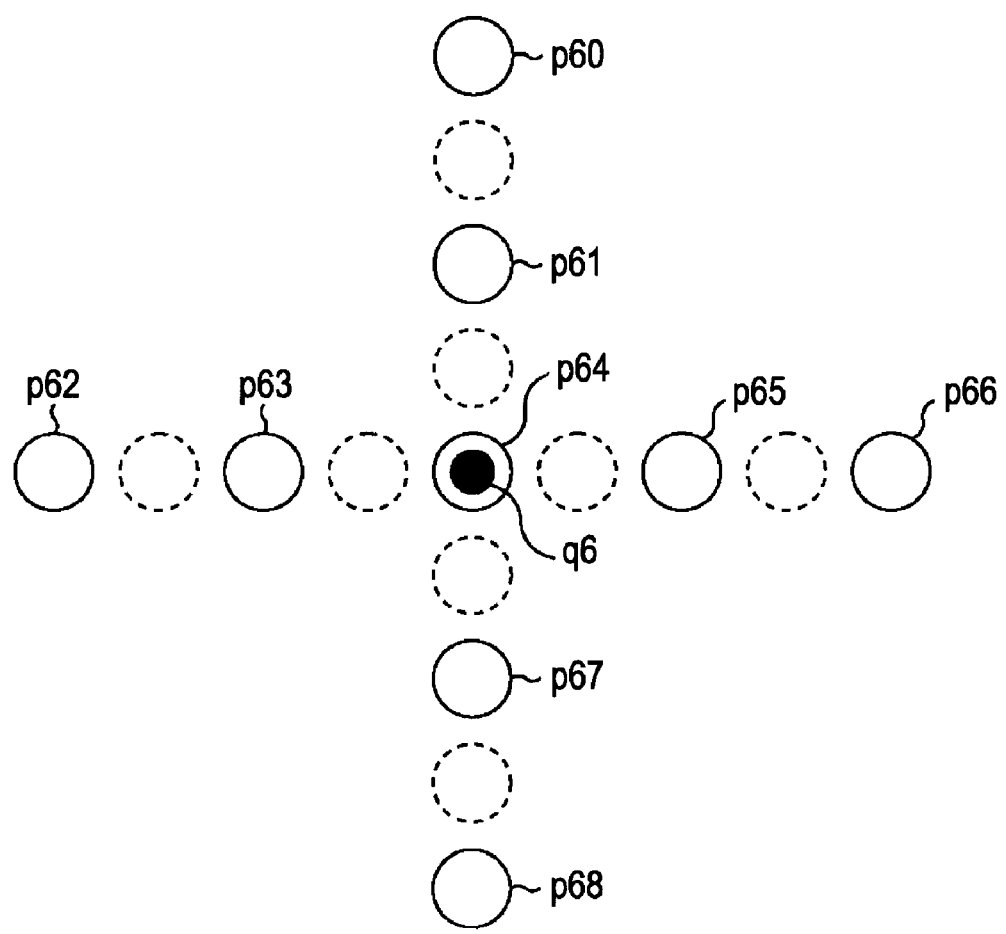
FIG. 34 illustrates an example of the tap structure of class taps.

FIG. 34 illustrates an example of the tap structure of class taps extracted by the class tap extracting portion 551 shown in FIG. 33.

In FIG. 34, among the pixels forming the HD image supplied from the output phase converter 112, the white circles indicate the pixels forming the class taps, the circles represented by broken curves represent the pixels that do not form the class taps, and the black circle designates the subject pixel. The same applies to FIG. 35.

In FIG. 34, nine pixels form the class taps. More specifically, around a pixel p64 forming the HD image corresponding to a subject pixel q6, five pixels p60, p61, p64, p67, and p68 aligned every other pixel in the vertical direction, and four pixels p62, p63, p65, and p66 aligned every other pixel, except for the pixel p64, in the horizontal direction, are disposed as the class taps, i.e., a so-called "cross-shaped" class tap structure is formed.

Figure 35:
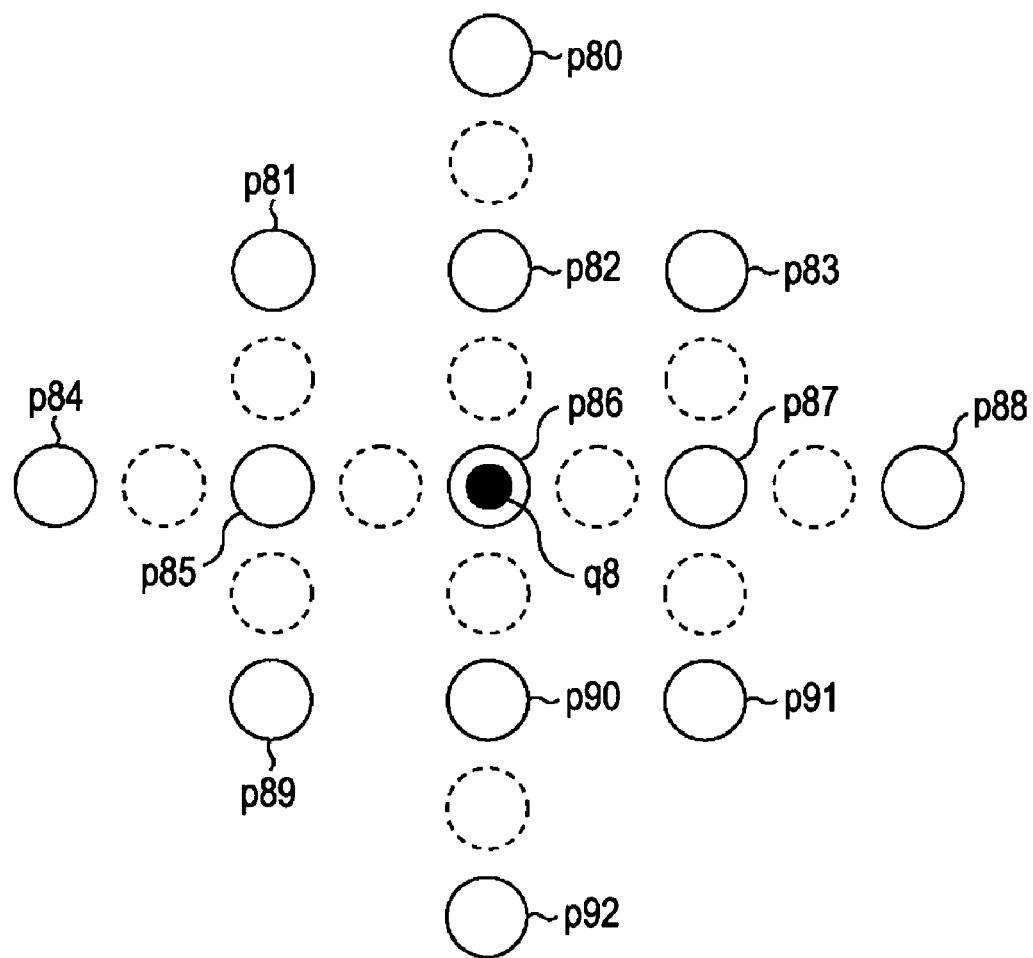
FIG. 35 illustrates an example of the tap structure of prediction taps.

FIG. 35 illustrates an example of the tap structure of prediction taps extracted by the prediction tap extracting portion 556.

In FIG. 35, 13 pixels form the prediction taps. More specifically, among the pixels forming the HD pixel supplied from the output phase converter 112, around a pixel p86 forming the HD image corresponding to a subject pixel q8, five pixels p80, p82, p86, p90, and p92 aligned every other pixel in the vertical direction, four pixels p84, p85, p87, and p88 aligned every other pixel, except for the pixel p86, in the vertical direction, two pixels p81 and p89 aligned every other pixel, except for the pixel p85, in the vertical direction around the pixel p85, and two pixels p83 and p91 aligned every other pixel, except for the pixel p87, in the vertical direction around the pixel p87, are disposed as the prediction taps, i.e., a generally rhomboid prediction tap structure is formed.

In FIGS. 34 and 35, the nine pixels p60 through p68 forming the class taps and the 13 pixels p80 through p92 forming the prediction taps, respectively, are arranged in the vertical direction or in the horizontal direction every other pixel, i.e., at regular intervals of two pixels. However, the intervals of the pixels forming the class taps or the prediction taps are not restricted to two pixels, and may be changed in accordance with the ratio of the number of pixels of the converted HD image to the number of pixels of the SD image before conversion, i.e., the interpolation factor, employed in the output phase converter 112.

It is now assumed, for example, that the output phase converter 112 converts the SD image so that the numbers of pixels in the horizontal and vertical directions are doubled. In this case, if class taps or prediction taps are formed of the pixels arranged at intervals of two pixels in the horizontal or vertical direction, as shown in FIG. 34 or 35, either of the interpolated pixels or the pixels that are not interpolated can form the class taps or the prediction taps. Thus, the precision of the prediction processing performed by the natural-image prediction unit 113 can be improved compared to that, for example, in the case where both the interpolated pixels and the pixels that are not interpolated form class taps or prediction taps, i.e., the class taps or the prediction taps could be arranged adjacent to each other.

Details of the natural-image prediction processing in step S14 in FIG. 13 performed by the natural-image prediction unit 113 shown in FIG. 33 are discussed below with reference to FIG. 36.

In step S551, the class tap extracting portion 551 selects, as a subject pixel, one of the pixels forming the high-quality natural image determined from the HD image supplied from the output phase converter 112 shown in FIG. 27.

In step S552, the class tap extracting portion 551 then extracts, as class taps, some of the pixels forming the input HD image, such as those shown in FIG. 34, used for classifying the subject pixel selected in step S551, and supplies the extracted class taps to the ADRC processor 552.

In step S553, the ADRC processor 552 performs ADRC processing on the pixel values of the pixels forming the class taps supplied from the class tap extracting portion 551, and sets the resulting ADRC code as the pattern of the class taps.

In step S554, the ADRC processor 552 determines the class based on the ADRC code to classify the subject pixel, and then supplies the determined class to the prediction coefficient memory 555.

In step S555, the prediction coefficient generator 554 reads out the corresponding coefficient seed from the coefficient seed memory 553.

In step S556, the prediction coefficient generator 554 generates the prediction coefficient from the coefficient seed read from the coefficient seed memory 553 by using the polynomial containing the parameters h and v input by the user, and supplies the generated prediction coefficient to the prediction coefficient memory 555. Details of the processing for generating a prediction coefficient from a coefficient seed are discussed below.

In step S557, the prediction coefficient memory 555 reads out the prediction coefficient on the basis of the class supplied from the ADRC processor 552, and supplies the read prediction coefficient to the prediction computation portion 557.

In step S558, the prediction tap extracting portion 556 extracts, as prediction taps, some of the pixels forming the input HD image, such as those shown in FIG. 35, used for predicting the pixel value of the subject pixel. The prediction tap extracting portion 556 supplies the extracted prediction taps to the prediction computation portion 557.

In step S559, the prediction computation portion 557 performs prediction computation, for example, linear expression computation, for determining the prediction value of the true value of the subject pixel by using the prediction taps supplied from the prediction tap extracting portion 556 and the prediction coefficient supplied from the prediction coefficient memory 555. More specifically, the prediction computation portion 557 substitutes, for example, in the above-described equation (14), the pixel value of the n-th pixel of the HD image forming the prediction taps for the subject pixel into $x_n$ and the prediction coefficient into $W_n$ to determine the predicted pixel value y of the subject pixel.

In step S560, the prediction computation portion 557 outputs the predicted pixel value of the subject pixel as a result of the prediction computation, i.e., the pixel value of the corresponding pixel forming the high-quality natural image, to the synthesizer 116.

In step S561, the class tap extracting portion 551 determines whether all the pixels forming the high-quality natural image determined from the input HD image have been selected as the subject pixels. If it is determined in step S561 that not all the pixels forming the high-quality natural image have been selected as the subject pixels, the process proceeds to step S562. In step S562, the class tap extracting portion 551 selects a pixel which has not been selected as the subject pixel, and returns to step S552. Steps S552 and the subsequent steps are then repeated. If it is determined in step S561 that all the pixels forming the high-quality natural image have been selected as the subject pixels, the natural-image prediction processing is completed.

As discussed above, the natural-image prediction unit 113 predicts a high-quality natural image from the HD image supplied from the output phase converter 112 and outputs the predicted high-quality natural image. That is, the natural-image prediction unit 113 converts the HD image into the high-quality natural image and outputs it.

As described above, in the image conversion device 101 shown in FIG. 8, the output phase converter 112 converts an SD image supplied from the cyclic converter 122 into an HD image, and then supplies the converted HD image to the natural-image prediction unit 113. Accordingly, the number of pixels forming the image after prediction is the same as that before prediction, and the positions of the pixels forming the image after prediction are not displaced from those of the pixels forming the image before prediction.

Accordingly, the natural-image prediction unit 113 can predict the pixel value of a subject pixel of the high-quality natural image by using the prediction taps formed of the pixels of the HD image which are in phase with the subject pixel. As a result, the natural-image prediction unit 113 can accurately predict the high-quality natural image to perform high-precision image conversion. That is, the output phase converter 112 and the natural-image prediction unit 113 can accurately convert the image P2, which is an SD image supplied from the cyclic converter 122, into a high-quality natural image, which is a high-quality HD image having the number of pixels different from that of the SD image.

Additionally, the natural-image prediction unit 113 determines the feature of the waveform of the pixels forming the class taps, and then classifies the subject pixel by using the determined feature. Accordingly, the subject pixel can be suitably classified according to the feature of a natural image having relatively a small number of flat portions. As a result, the natural-image prediction unit 113 can enhance the quality of the natural image components contained in the HD image.

A description is now given of learning for polynomials for generating prediction coefficients by the prediction coefficient generator 554 shown in FIG. 33 and coefficient seeds used for the polynomials.

If, for example, a polynomial, is used as an expression for generating a prediction coefficient by using input parameters h and v and a coefficient seed, the prediction coefficient $W_n$ for each class and for each set of the parameters h and v can be found by the following equation:

$$W_n = w_{n,0} + w_{n,1}v + w_{n,2}h + w_{n,3}v^2 + w_{n,4}vh + w_{n,5}h^2 + w_{n,6}v^3 + w_{n,7}v^2h + w_{n,8}vh^2 + w_{n,9}h^3 \quad (25)$$

where $w_{n,k}$ (k=0, 1, ..., 9) represents the k-th term coefficient among the coefficient seeds for generating the n-th prediction coefficient $W_n$ which is to be multiplied by the pixel value $x_n$ of the n-th pixel of the HD image, the n-th pixel of the HD image forming the prediction taps for the high-quality natural image pixel having the n-th pixel value y expressed by equation (14).

If the true value of the n-th prediction coefficient corresponding to the parameters h and v is represented by $W_{vhn}$ and if the estimation value of the true value $W_{vhn}$ obtained by equation (25) is indicated by $W_{vhn}'$, the estimation error $e_{vhn}$ can be expressed by the following equation.

$$e_{vhn} = W_{vhn} - W'_{vhn} \quad (26)$$

The estimation value $W_{vhn}'$ in equation (26) can be obtained by equation (25). Accordingly, if equation (25) is substituted into $W_{vhn}'$ in equation (26), the following equation can be found:

$$e_{vhn} = W_{vhn} - \sum_{k=0}^{9} w_{vhn,k} t_k \quad (27)$$

where $W_{vhn,k}$ represents the k-th term coefficient among the coefficient seeds for generating the prediction coefficient $W_{vhn}$. In equation (27), $t_k$ can be defined by the following equations.

$t_0 = 1$ $t_1 = v$ $t_2 = h$ $t_3 = v^2$ $t_4 = vh$ $t_5 = h^2$ $t_6 = v^3$ $$t_7 = v^2 h$$

$$t_8 = vh^2$$

$$t_9 = h^3 \tag{28}$$

The coefficient seed $w_{vhn,k}$ that reduces the prediction error $e_{vhn}$ in equation (26) or (27) to 0 or statistically minimizes the prediction error $e_{vhn}$ is the optimal coefficient seed for estimating the prediction coefficient. Generally, however, it is difficult to determine such a coefficient seed $w_{vhn,k}$ for all prediction coefficients.

If, for example, the method of least squares, is employed as the standard for representing that the coefficient seed $w_{vhn,k}$ is optimal, the optimal coefficient seed $w_{vhn,k}$ can be obtained by minimizing the total error E of square errors expressed by the following equation:

$$E = \sum_{v=1}^{V} \sum_{h=1}^{H} e_{vhn}^2 \tag{29}$$

where V indicates the number of parameters v and H represents the number of parameters h.

The minimum value of the total error E of the square errors in equation (29) can be given by the coefficient seed $w_{vhn,k}$ that allows the value obtained by partially differentiating the total error E with respect to the coefficient seed $w_{vhn,k}$ to be 0, as expressed by equation (30).

$$\frac{\partial E}{\partial w_{vhn,k}} = \sum_{v=1}^{V} \sum_{h=1}^{H} 2\left(\frac{\partial e_{vhn}}{\partial w_{vhn,k}}\right) e_{vhn} = -\sum_{v=1}^{V} \sum_{h=1}^{H} 2t_K e_{vhn} = 0 \tag{30}$$

If $X_{kl}$ and $Y_k$ are defined by equations (31) and (32), respectively, equation (30) can be modified into normal equations expressed by equation (33).

$$X_{kl} = \sum_{v=1}^{V} \sum_{h=1}^{H} t_k t_l \tag{31}$$

$$Y_k = \sum_{v=1}^{V} \sum_{h=1}^{H} t_k W_{vhn} \tag{32}$$

$$\begin{bmatrix} X_{00} & X_{01} & \cdots & X_{09} \\ X_{10} & X_{11} & \cdots & X_{19} \\ \vdots & \vdots & \ddots & \vdots \\ X_{90} & X_{91} & \cdots & X_{99} \end{bmatrix} \begin{bmatrix} w_{n,0} \\ w_{n,i} \\ \vdots \\ w_{n,9} \end{bmatrix} = \begin{bmatrix} Y_0 \\ Y_1 \\ \vdots \\ Y_9 \end{bmatrix} \tag{33}$$

The normal equations expressed by equation (33) can be solved with respect to the coefficient seed $w_{n,k}$ by using, for example, a sweeping-out method (Gauss-Jordan elimination method).

By solving the normal equations in equation (33) for each class, the optimal coefficient seed $w_{n,k}$ that minimizes the total error E of the least squares can be found for each class.

Figure 37:
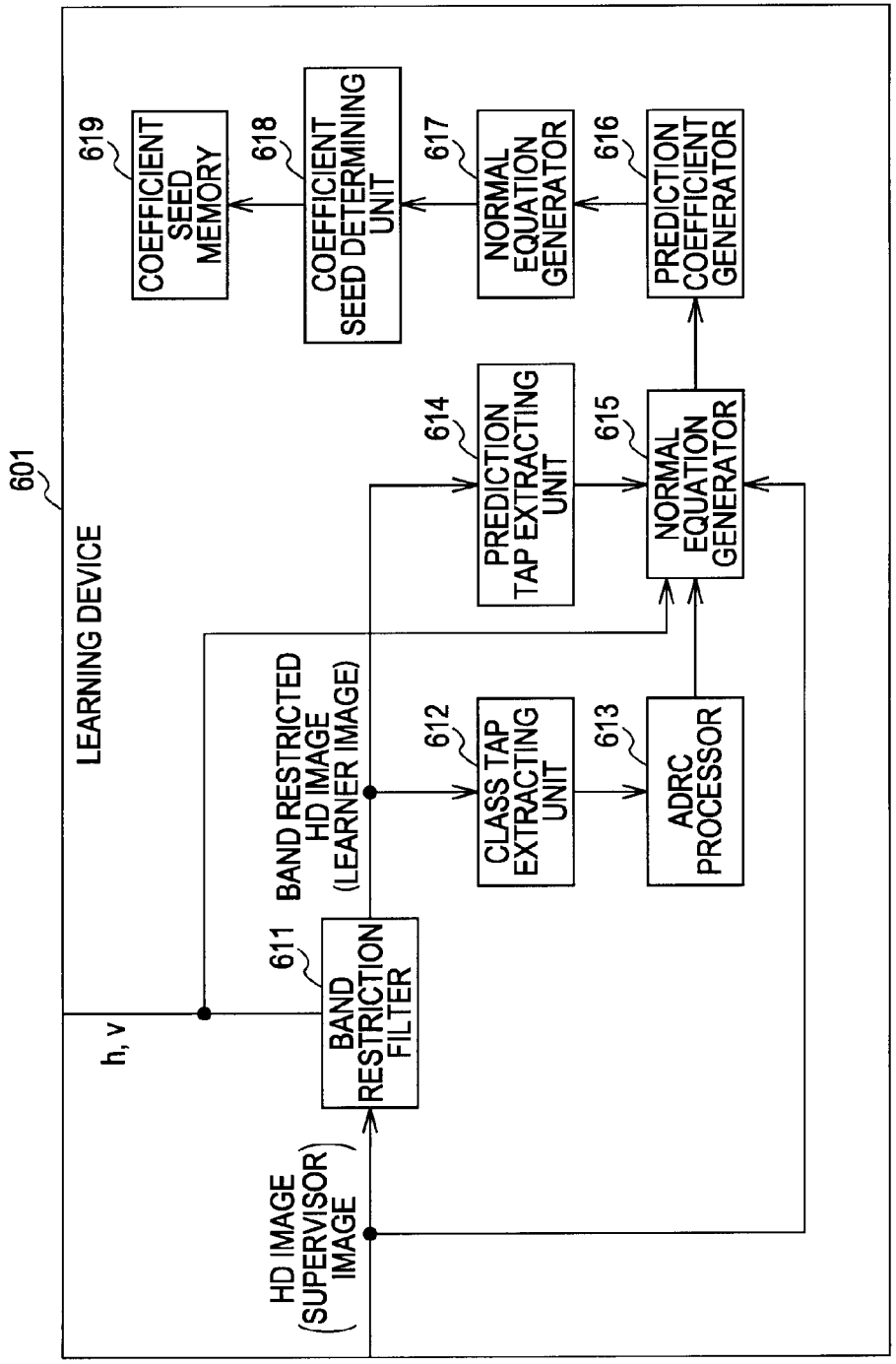
FIG. 37 is a block diagram illustrating the configuration of a learning device.

FIG. 37 is a block diagram illustrating the configuration of a learning device 601 that conducts learning for determining the coefficient seed $w_{n,k}$ for each class by establishing and solving the normal equations expressed by equation (33).

The learning device 601 shown in FIG. 37 includes a band restriction filter 611, a class tap extracting unit 612, an ADRC processor 613, a prediction tap extracting unit 614, a normal equation generator 615, a prediction coefficient generator 616, a normal equation generator 617, a coefficient seed determining unit 618, and a coefficient seed memory 619.

After learning the prediction coefficient $w_{vhn}$, the learning device 601 solves the normal equations expressed by equation (33) to learn the coefficient seed $w_{n,k}$. More specifically, the learning device 601 solves the normal equations expressed by equation (21) for each class and for each combination of parameters h and v by using a supervisor image corresponding to a target natural image after prediction as the supervisor data y and a learner image corresponding to a natural image before prediction as the learner data x, thereby determining the tap coefficient $W_n$ for each combination of parameters h and v and for each class as the prediction coefficient $W_{vhn}$.

Then, according to the prediction coefficient $W_{vhn}$, normal equations expressed by equation (33) are generated for each class, and by solving the normal equations, the coefficient seed $w_{n,k}$ for each class can be generated.

In the learning device 601, a plurality of supervisor images read from a database (not shown) are input into the band restriction filter 611 and the normal equation generator 615. Parameters h and v are also input from an external source to the band restriction filter 611 and the normal equation generator 615 in response to an instruction from a user. In the learning device 601, every time one supervisor image is input, all combinations of parameters h and v are input.

In response to the parameters h and v input from an external source, the band restriction filter 611 performs filtering processing for restricting the bands of a supervisor image obtained from a database (not shown) in the vertical direction and in the horizontal direction. Accordingly, a learner image is generated for each combination of parameters h and v. If the number of parameters h and the number of parameters v are nine, the band restriction filter 611 generates 81 learner images from one supervisor image in accordance with the combinations of parameters h and v.

The band restriction filter 611 supplies the generated learner images to the class tap extracting unit 612 and the prediction tap extracting unit 614.

The configuration of the class tap extracting unit 612 is similar to that of the class tap extracting unit 551 shown in FIG. 33. The class tap extracting unit 612 sequentially selects the pixels forming the supervisor image as subject supervisor pixels, and extracts class taps having the same tap structure, such as that shown in FIG. 34, as that of the class taps extracted by the class tap extracting unit 551 shown in FIG. 33. The class tap extracting unit 612 then supplies the class taps to the ADRC processor 613.

The configuration of the prediction tap extracting unit 614 is similar to that of the prediction tap extracting unit 556 shown in FIG. 33. The prediction tap extracting unit 614 extracts, from a learner image supplied from the band restriction filter 611, as prediction taps, such as those shown in FIG. 35, some of the pixels forming the learner image used for predicting the pixel value of the subject supervisor pixel. The prediction tap extracting unit 614 supplies the prediction taps to the normal equation generator 615.

The normal equation generator 615 establishes the normal equations expressed by equation (21) for each class supplied from the ADRC processor 613 and for each combination of parameters h and v input from an external source by using the input supervisor image and a prediction tap supplied from the prediction tap extracting unit 614 as a learning pair used for learning the prediction coefficient $W_n$. The normal equation generator 615 then supplies the normal equations to the prediction coefficient generator 616.

The prediction coefficient generator 616 solves the normal equations expressed by equation (21) to determine the prediction coefficient $W_{vhn}$ for each class and for each combination of parameters h and v. The prediction coefficient generator 616 then supplies the prediction coefficient $W_{vhn}$ to the normal equation generator 617.

The normal equation generator 617 generates normal equations expressed by equation (33) for each class based on the prediction coefficient $W_{vhn}$ supplied from the prediction coefficient generator 616, and outputs the generated normal equations to the coefficient seed determining unit 618. The coefficient seed determining unit 618 solves the normal equations expressed by equation (33) for each class to determine the coefficient seed $w_{n,k}$ for each class, and stores the coefficient seed $w_{n,k}$ in the coefficient seed memory 619. The coefficient seed stored in the coefficient seed memory 619 is to be stored in the coefficient seed memory 553 shown in FIG. 33.

The positional relationship between the supervisor image and the learner images is described below with reference to FIG. 38.

Figure 38:
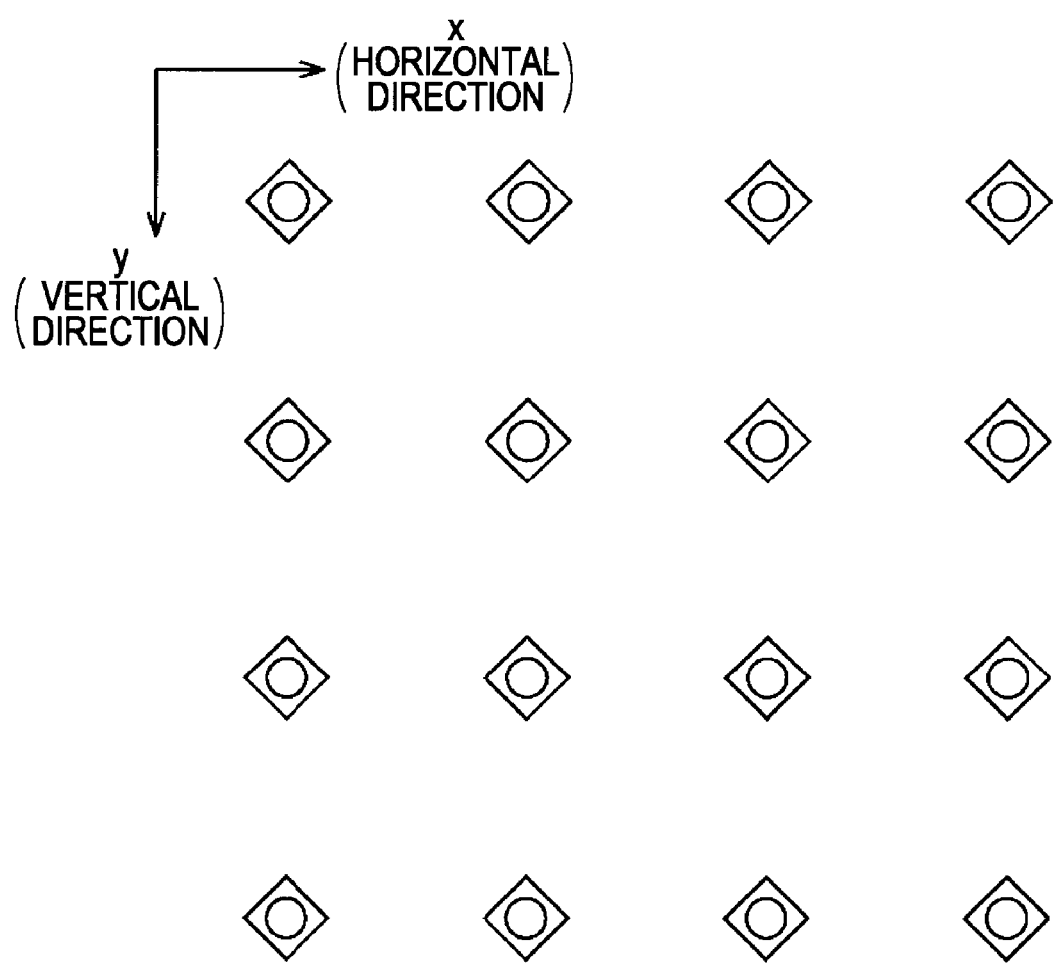
FIG. 38 illustrates the positional relationship between pixels of a supervisor image and pixels of a learner image.
Figure 39:
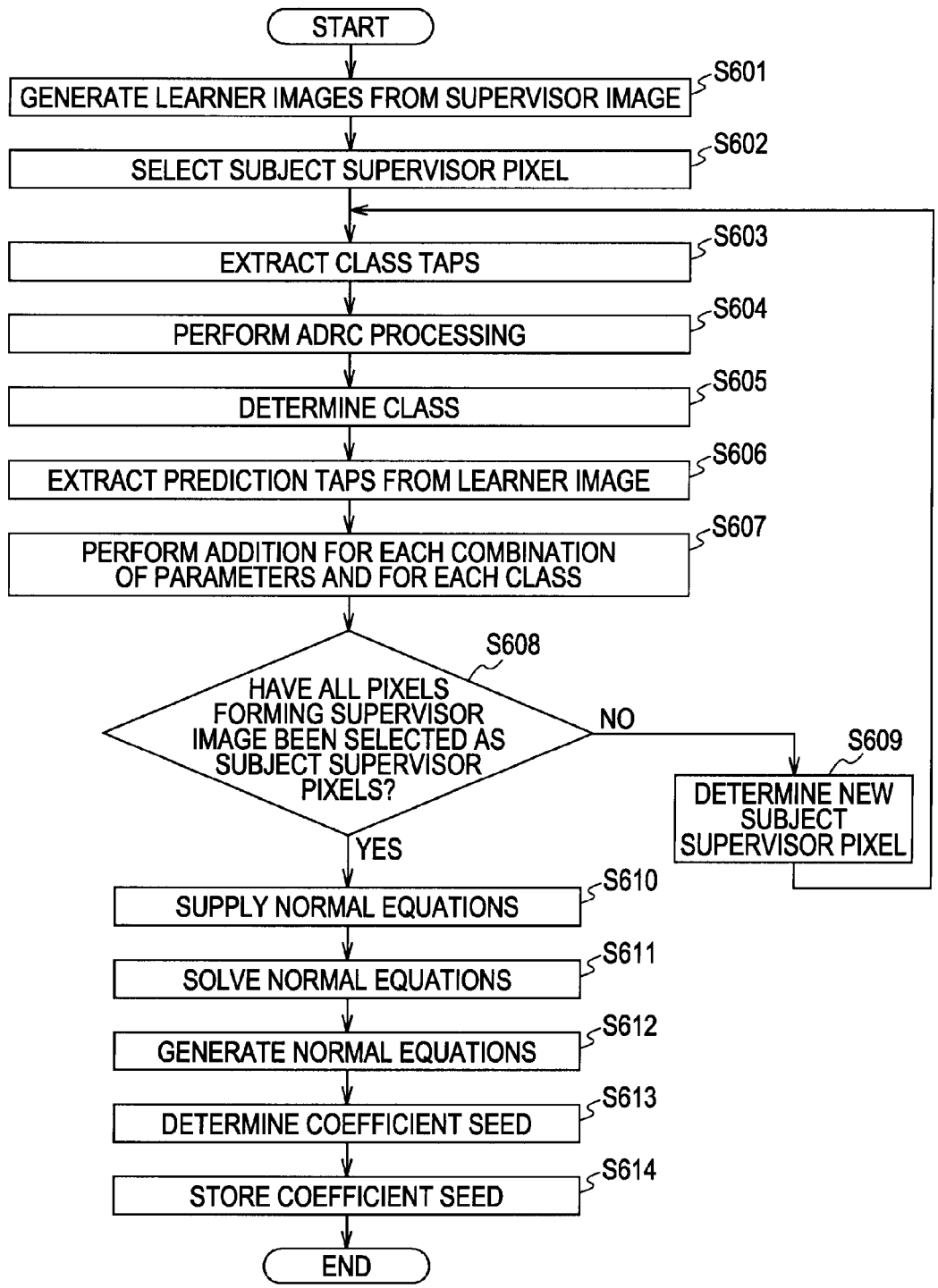
FIG. 39 is a flowchart illustrating an example of learning processing.

In FIG. 38, the rhomboids represent the pixels of a supervisor image, and the white circles represent the pixels of a learner image. In FIG. 38, the horizontal axis represents the horizontal position, while the vertical axis designates the vertical position.

The horizontal and vertical positions of the pixels of the supervisor image are the same as those of the learner image. That is, the supervisor image and the learner image are in phase with each other.

The learning processing performed by the learning device 601 shown in FIG. 37 is discussed below with reference to the flowchart in FIG. 39.

In step S601, in response to input parameters h and v, the band restriction filter 611 performs filtering processing for restricting the bands of an input supervisor image in the horizontal direction and in the vertical direction to generate learner images. The band restriction filter 611 then supplies the generated learner images to the class tap extracting unit 612 and the prediction tap extracting unit 614.

In step S602, as in the class tap extracting portion 551 shown in FIG. 33, the class tap extracting unit 612 selects one of the pixels forming the supervisor image as a subject supervisor pixel.

In step S603, as in the class tap extracting portion 551 shown in FIG. 33, the class tap extracting unit 612 extracts class taps, such as those shown in FIG. 34, from the learner image, and supplies the extracted class taps to the ADRC processor 613.

In step S604, the ADRC processor 613 performs ADRC processing on the pixel values of the pixels forming the class taps. In step S605, the ADRC processor 613 determines the class based on the ADRC code obtained as a result of the ADRC processing, and supplies the determined class to the normal equation generator 615.

In step S606, as in the prediction tap extracting portion 556 shown in FIG. 33, the prediction tap extracting unit 614 extracts prediction taps, such as those shown in FIG. 35, for the subject supervisor pixel from the learner image supplied from the band restriction filter 611, and supplies the prediction taps to the normal equation generator 615.

In step S607, the normal equation generator 615 extracts the subject supervisor pixel from the input supervisor image, and performs addition in equation (21) on the subject supervisor pixel and the learner image forming the prediction taps for the subject supervisor pixel supplied from the prediction tap extracting unit 614 for each combination of parameters h and v and for each class supplied from the ADRC processor 613.

In step S608, the class tap extracting unit 612 determines whether all the pixels forming the input supervisor image have been selected as subject supervisor pixels. If it is determined in step S608 that not all the pixels forming the supervisor image have been selected, the process proceeds to step S609. In step S609, the class tap extracting unit 612 selects a pixel that has not been selected as a subject supervisor pixel. Then, the process returns to step S603, and step S603 and the subsequent steps are repeated.

If it is determined in step S608 that all the pixels forming the supervisor image have been selected as the subject supervisor pixels, the process proceeds to step S610. In step S610, the normal equation generator 615 supplies, as normal equations, a matrix on the left side and the vector on the right side in equation (21) for each combination of parameters h and v and for each class to the prediction coefficient generator 616.

In step S611, the prediction coefficient generator 616 solves the normal equations in equation (21) for each combination of parameters h and v and for each class supplied from the normal equation generator 615 to determine the prediction coefficient $W_{vhn}$ for each combination of parameters h and v and for each class. The prediction coefficient generator 616 outputs the determined prediction coefficient $W_{vhn}$ to the normal equation generator 617.

In step S612, the normal equation generator 617 generates normal equations in equation (33) for each class on the basis of the prediction coefficient $W_{vhn}$, and outputs the generated normal equations to the coefficient seed determining unit 618.

In step S613, the coefficient seed determining unit 618 solves the normal equations in equation (33) to determine the coefficient seed $w_{n,k}$ for each class. In step S614, the coefficient seed $w_{n,k}$ is stored in the coefficient seed memory 619. The coefficient seed $w_{n,k}$ is to be stored in the coefficient seed memory 553 shown in FIG. 33.

As described above, the natural-image prediction unit 113 predicts a high-quality natural image by using the prediction coefficient $W_{vhn}$ generated from the coefficient seed which is obtained by conducting learning using a natural image. It is thus possible to enhance the quality of natural image components contained in an HD image supplied from the output phase converter 112.

Additionally, the natural-image prediction unit 113 classifies subject pixels in accordance with the feature of the waveforms of class taps. With this arrangement, the subject pixels of a natural image can be accurately classified. The natural-image prediction unit 113 can predict a high-quality natural image from the HD image by using a prediction coefficient generated from a coefficient seed obtained by conducting learning for each class and outputs the high-quality natural image.

Figure 40:
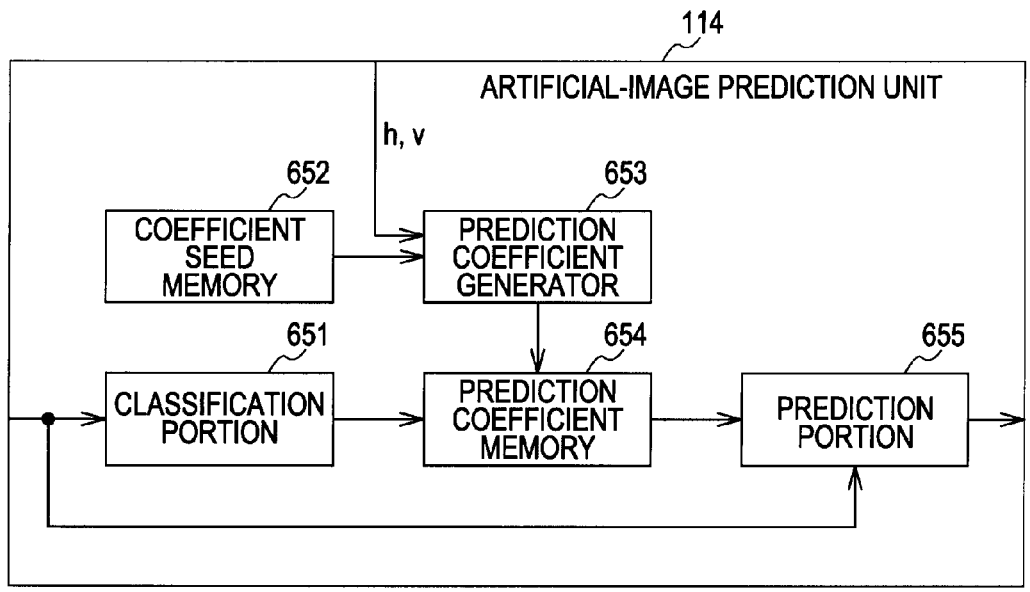
FIG. 40 is a block diagram illustrating the configuration of an artificial-image prediction unit.

FIG. 40 is a block diagram illustrating the configuration of the artificial-image prediction unit 1142 shown in FIG. 8.

The artificial-image prediction unit 114 includes a classification portion 651, a coefficient seed memory 652, a prediction coefficient generator 653, and a prediction coefficient memory 654, and a prediction portion 655. The artificial-image prediction unit 114 predicts a high-quality artificial image from artificial image components contained in a progressive HD image supplied from the output phase converter 112.

The HD image supplied from the output phase converter 112 is input into the classification portion 651 and the prediction portion 655. The classification portion 651 sequentially selects the pixels forming the high-quality artificial image determined from the HD image as subject pixels, and allocates the subject pixels into some classes in accordance with the feature of the phase of the HD image. The classification portion 651 then supplies the classes to the prediction coefficient memory 654.

The coefficient seed memory 652 is formed of, for example, a read only memory (ROM), and stores a coefficient seed obtained by conducting learning, which is discussed below with reference to FIGS. 47 through 49, for each class.

The prediction coefficient generator 653 generates the prediction coefficient $W_n$ from the coefficient seed $w_{n,k}$ read from the coefficient seed memory 652 by using the polynomial expressed by equation (25) containing the parameters h and v input from the user, and stores the generated prediction coefficient $W_n$ in the prediction coefficient memory 654.

The prediction coefficient memory 654 reads out the prediction coefficient $W_n$ based on the class supplied from the classification portion 651, and supplies the prediction coefficient $W_n$ for that class to the prediction portion 655.

The prediction portion 655 performs predetermined prediction computation for determining the prediction value of the true value of the subject pixel by using the HD image and the prediction coefficient $W_n$ supplied from the prediction coefficient memory 654. Accordingly, the prediction portion 655 predicts the pixel value of the subject pixel, i.e., the pixel value of the subject pixel forming the high-quality artificial image, and outputs the predicted pixel value to the synthesizer 116 shown in FIG. 8.

Figure 41:
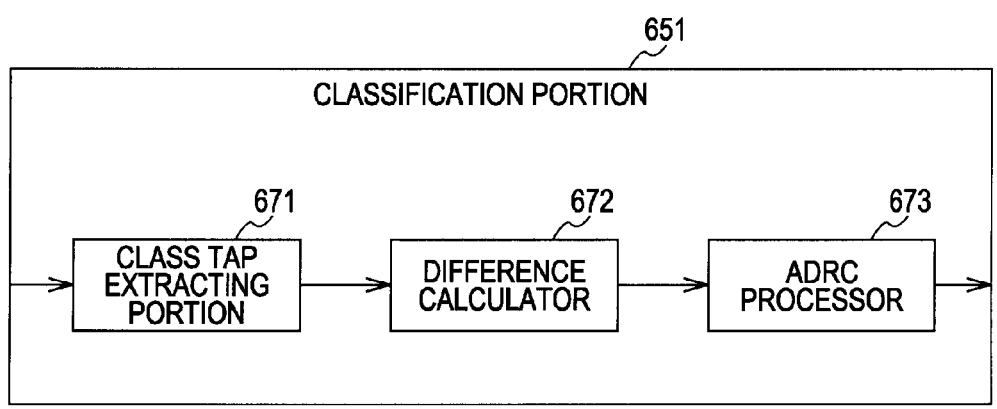
FIG. 41 is a block diagram illustrating the detailed configuration of a classification portion.

FIG. 41 is a block diagram illustrating the detailed configuration of the classification portion 651 shown in FIG. 40.

The classification portion 651 shown in FIG. 41 includes a class tap extracting portion 671, a difference calculator 672, and an ADRC processor 673.

The class tap extracting portion 671 extracts, as class taps, some of the pixels forming the HD image for classifying the subject pixel, and supplies the class taps to the difference calculator 672.

Among the pixels forming the class taps supplied from the class tap extracting portion 671, the difference calculator 672 calculates, as the feature of the phase of the class taps, the absolute value of the difference of the pixel values of two adjacent pixels (hereinafter simply referred to as "adjacent pixels") for each set of adjacent pixels. Such an absolute value is hereinafter referred to as the "adjacent difference absolute value". The difference calculator 672 supplies the adjacent difference absolute value of each set of adjacent pixels to the ADRC processor 673.

The ADRC processor 673 performs one-bit ADRC processing on the adjacent difference absolute values supplied from the difference calculator 672. More specifically, the ADRC processor 673 divides the adjacent difference absolute values of the class taps by the average of the maximum value MAX and the minimum value MIN to re-quantize each adjacent different absolute value into one bit with the decimal fractions omitted. That is, the ADRC processor 673 binarizes the adjacent difference absolute values.

The ADRC processor 673 arranges the one-bit pixel values in a predetermined order, resulting in a bit string, which is determined as the class of the subject pixel. Accordingly, the class serves as phase information concerning the positions of edges in the class taps. That is, the class represents the value degenerated from the phase of the class taps. The ADRC processor 673 supplies the determined class to the prediction coefficient memory 654 shown in FIG. 40.

In this manner, the classification portion 651 classifies the subject pixel in accordance with the feature of the phase of the class taps obtained from the adjacent difference absolute value of each set of adjacent pixels.

Figure 42:
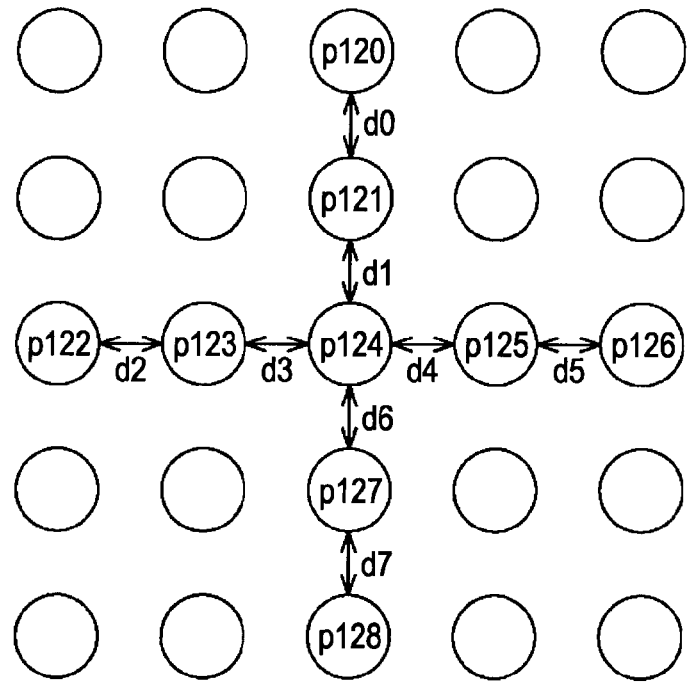
FIG. 42 illustrates another example of the tap structure of class taps.

FIG. 42 illustrates an example of the tap structure of the class taps extracted by the class tap extracting portion 671 shown in FIG. 41. However, this is an example only, and the tap structure of the class taps may be different from that shown in FIG. 42.

In FIG. 42, among an HD image supplied from the output phase converter 112 shown in FIG. 8, nine pixels including a pixel p124 corresponding to a subject pixel and two pixels adjacent to the pixel p124 in each of the upward, leftward, rightward, and downward directions, i.e., pixels p120, p121, p122, p123, p125, p126, p127, and p128, are disposed. That is, a so-called "cross-shaped class tap" structure is formed.

The difference calculator 672 shown in FIG. 41 calculates eight adjacent difference absolute values d0 through d7 between pixels p120 and p121, pixels p121 and p124, pixels p122 and p123, pixels p123 and p124, pixels p124 and p125, pixels p125 and p126, p124 and p127, and p127 and p128, respectively, and supplies the calculated adjacent difference absolute values d0 through d7 to the ADRC processor 673. As a result, the 8-bit class is output from the ADRC processor 673.

Figure 43:
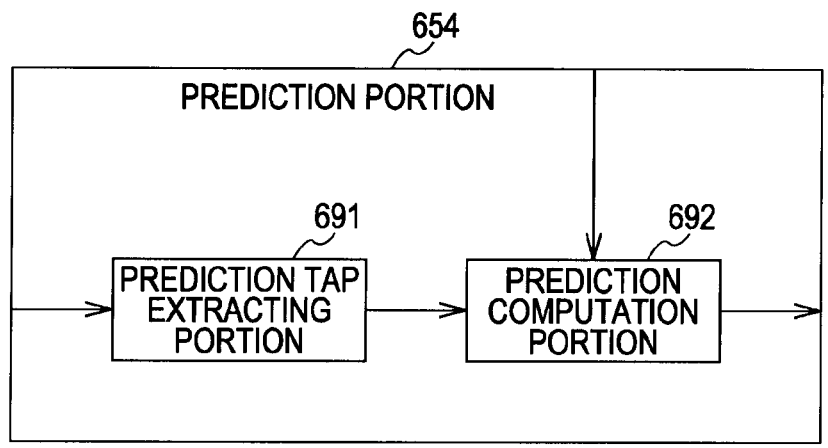
FIG. 43 is a block diagram illustrating the detailed configuration of a prediction portion.

FIG. 43 is a block diagram illustrating the detailed configuration of the prediction portion 655 shown in FIG. 40.

The prediction portion 655 shown in FIG. 43 includes a prediction tap extracting portion 691 and a prediction computation portion 692.

The prediction tap extracting portion 691 extracts, as prediction taps, some of the pixels forming the HD image used for predicting the pixel value of a subject pixel.

More specifically, the prediction tap extracting portion 691 extracts, from the HD image, as prediction taps, pixels corresponding to the subject pixel, for example, a plurality of pixels of the HD image spatially closer to the subject pixel. The prediction tap extracting portion 691 supplies the extracted prediction taps to the prediction computation portion 692.

The prediction taps and the class taps may have the same tap structure or different tap structures.

The prediction computation portion 692 receives, not only the prediction taps from the prediction tap extracting portion 691, but also the prediction coefficient from the prediction coefficient memory 654 shown in FIG. 40. The prediction computation portion 692 performs prediction computation expressed by equation (14) to determine the prediction value of the true value of the subject pixel by using the prediction taps and the prediction coefficient. Accordingly, the prediction computation portion 692 predicts pixel value of the subject pixel, i.e., the pixel value of the subject pixel forming the high-quality artificial image, and outputs the predicted pixel value to the synthesizer 116 shown in FIG. 8.

Figure 44:
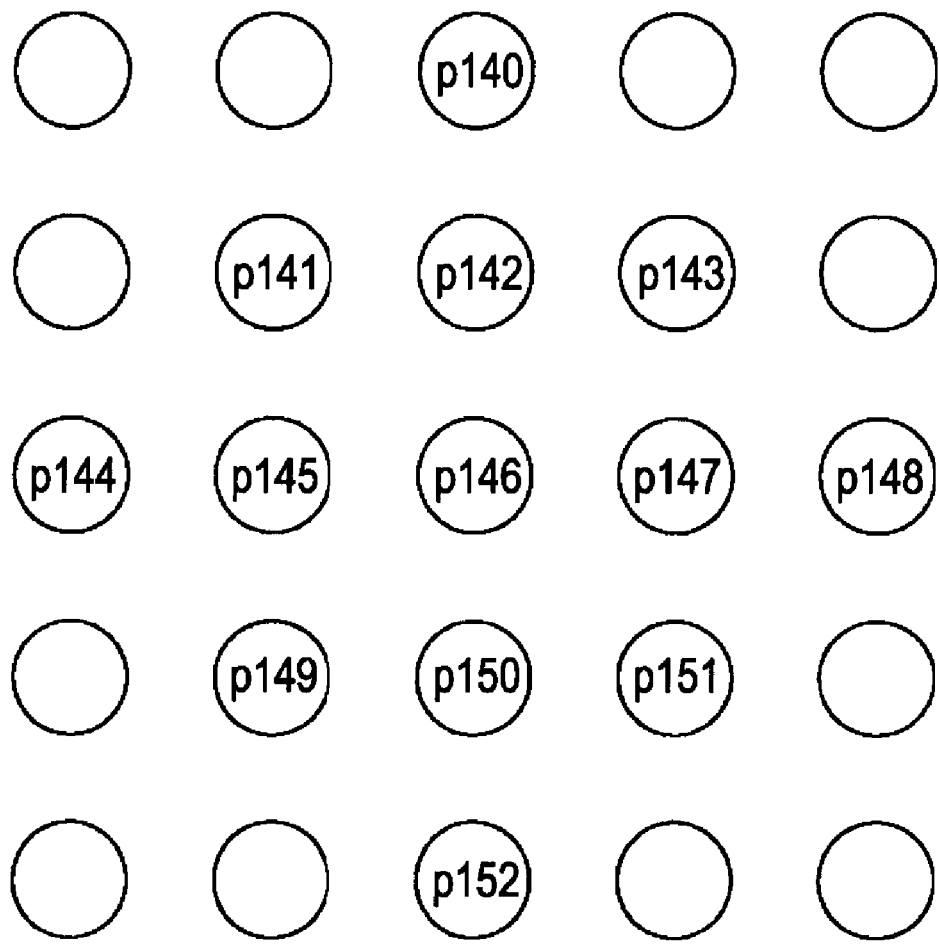
FIG. 44 illustrates another example of the tap structure of prediction taps.

FIG. 44 illustrates an example of the tap structure of the prediction taps extracted by the prediction tap extracting portion 691 shown in FIG. 43. However, this is an example only, and the tap structure of the prediction taps may be different from that shown in FIG. 44.

In FIG. 44, the prediction taps are formed of 13 pixels. More specifically, in FIG. 44, among the HD image supplied from the output phase converter 112, five pixels p140, p142, p146, p150, and p152 vertically arranged around pixel p146 corresponding to the subject pixel, three pixels p141, p145, and p149 vertically arranged around p145, which is left-adjacent to pixel p146, three pixels p143, p147, and p151 vertically arranged around p147, which is right-adjacent to pixel p146, and two pixels p144 and p148 away from pixel p146 in the left and right directions by two pixels, are disposed. That is, a generally rhomboid prediction tap structure is formed.

Details of the artificial-image prediction processing in step S15 in FIG. 13 performed by the artificial-image prediction unit 114 shown in FIG. 40 are discussed below.

In step S701, the classification portion 651 performs classification processing for classifying a predetermined subject pixel of the pixels forming a high-quality artificial image in accordance with the feature of the phase of the HD image corresponding to the subject pixel. Details of the classification processing are discussed below with reference to FIG. 46.

In step S702, the coefficient seed memory 652 reads out the coefficient seed $w_{n,k}$ and outputs it to the prediction coefficient generator 653. In step S703, the prediction coefficient generator 653 generates the prediction coefficient $W_n$ from the coefficient seed $w_{n,k}$ on the basis of the parameters h and v input from the user by using the polynomial expressed by equation (25) containing the parameters h and v, and supplies the generated prediction coefficient $W_n$ to the prediction coefficient memory 654.

In step S704, the prediction coefficient memory 654 reads out the prediction coefficient $W_n$ based on the class determined by the classification portion 651, and supplies the read prediction coefficient $W_n$ to the prediction computation portion 692 of the prediction portion 655.

In step S705, the prediction tap extracting portion 691 extracts, from the HD image supplied from the output phase converter 112, as prediction taps, such as those shown in FIG. 44, some of the pixels forming the HD image used for predicting the pixel value of the subject pixel, and supplies the extracted prediction taps to the prediction computation portion 692.

In step S706, the prediction computation portion 692 performs prediction computation expressed by equation (14) by using the prediction taps supplied from the prediction tap extracting portion 691 and the prediction coefficient $W_n$ supplied from the prediction coefficient memory 654 to determine the pixel value of the subject pixel forming the high-quality artificial image. In step S707, the prediction computation portion 692 outputs the pixel value of the subject pixel forming the high-quality artificial image determined in step S706 to the synthesizer 116 shown in FIG. 8.

In step S708, the classification portion 651 determines whether all the pixels forming the high-quality artificial image have been selected as the subject pixels. If it is determined in step S708 that not all the pixels have been selected, the process proceeds to step S709. In step S709, the classification portion 651 determines a pixel that has not been selected as the next subject pixel and then returns to step S701. Steps S701 and the subsequent steps are repeated.

If the classification portion 651 determines in step S708 that all the pixels forming the high-quality artificial image have been selected as the subject pixels, the artificial-image prediction processing is completed.

As discussed above, the artificial-image prediction unit 114 predicts a high-quality artificial image from an HD image supplied from the output phase converter 112, and outputs the predicted image. That is, the artificial-image prediction unit 114 converts an HD image into a high-quality artificial image and outputs it.

Figure 45:
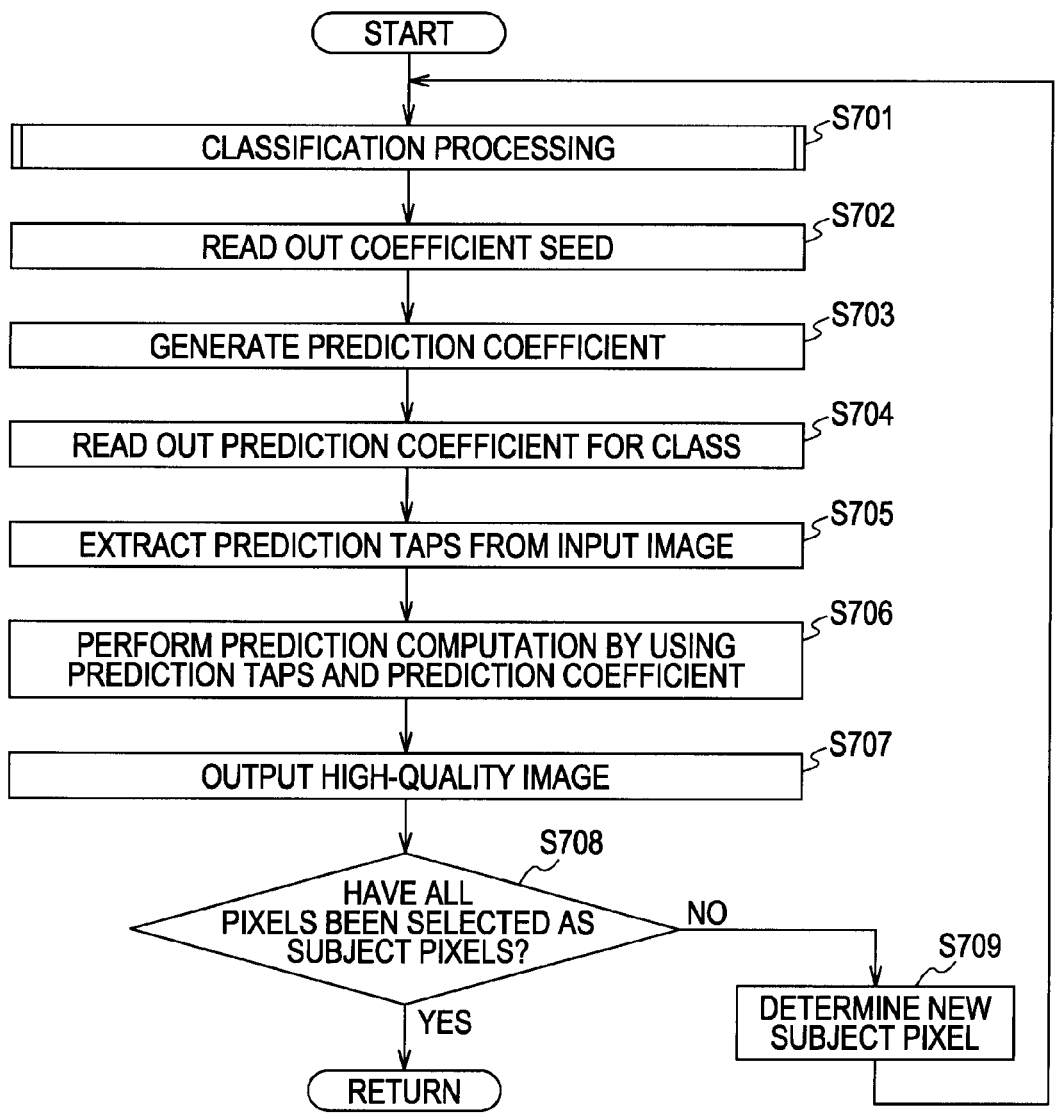
FIG. 45 is a flowchart illustrating artificial-image prediction processing.

Details of the classification processing in step S701 in FIG. 45 are discussed below with reference to the flowchart in FIG. 46.

In step S721, the class tap extracting portion 671 shown in FIG. 41 of the classification portion 651 extracts, as class taps, such as those shown in FIG. 42, some of the pixels forming the HD image used for classifying the subject pixel, and supplies the extracted class taps to the difference calculator 672.

In step S722, the difference calculator 672 calculates, among the pixels forming the class taps supplied from the class tap extracting portion 671, the adjacent difference absolute value of each set of adjacent pixels, and supplies the calculated adjacent difference absolute values to the ADRC processor 673.

In step S723, the ADRC processor 673 performs one-bit ADRC processing on the adjacent difference absolute values supplied from the difference calculator 672. The ADRC processor 673 then determines the resulting ADRC bit string as the class to classify the subject pixel. The ADRC processor 673 then supplies the determined class to the prediction coefficient memory 654 shown in FIG. 40. The process then returns to step S701 in FIG. 45.

Figure 47:
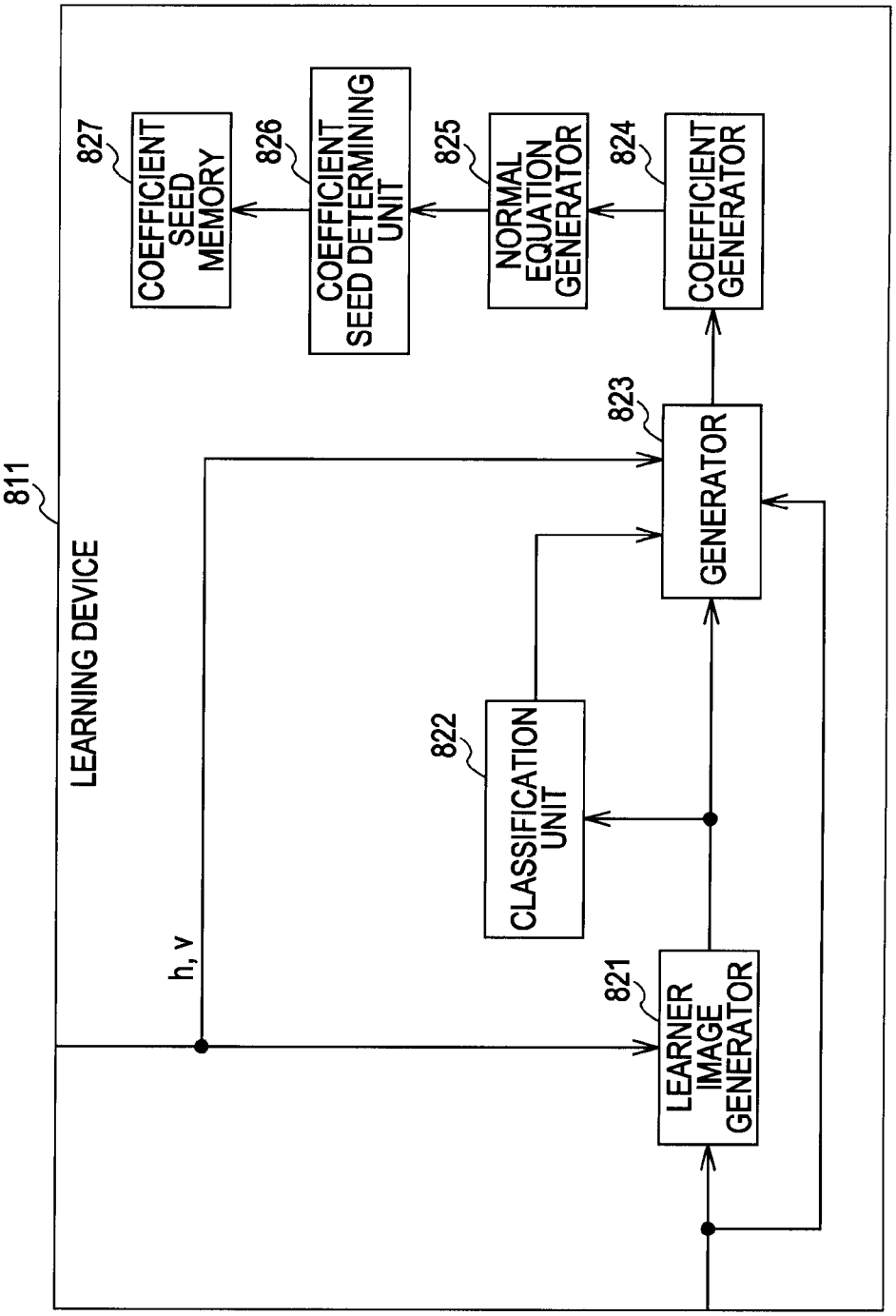
FIG. 47 is a block diagram illustrating the configuration of another learning device.

FIG. 47 is a block diagram illustrating the configuration of a learning device 811 that conducts learning for determining coefficient seeds to be stored in the coefficient memory 652 shown in FIG. 40.

The learning device 811 shown in FIG. 47 includes a learner image generator 821, a classification unit 822, a generator 823, a coefficient generator 824, a normal equation generator 825, a coefficient seed determining unit 826, and a coefficient seed memory 827.

In a manner similar to learning for tap coefficients in the above-described classification processing, the learning device 811 conducts learning for coefficient seeds $w_{n,k}$ by solving the normal equations expressed by equation (33) after learning the prediction coefficient $W_{v,hn}$. More specifically, by using, as supervisor data y, a supervisor image corresponding to a target artificial image after performing prediction processing, and by using, as learner data x, a learner image corresponding to an artificial image before performing prediction processing, the learning device 811 solves the normal equations expressed by equation (21) for each class and for each combination of externally input parameters h and v which are externally input in response to an instruction from the user. As a result, the learning device 811 can determine the prediction coefficient $W_{v,hn}$, which is the tap coefficient $W_n$ for each class and for each combination of parameters h and v.

Then, the learning device 811 solves the normal equations expressed by equation (33) generated for each class based on the prediction coefficient $W_{v,hn}$, thereby generating the coefficient seed $w_{n,k}$ for each class. The learning device 811 then stores the coefficient seed $w_{n,k}$.

A plurality of supervisor images read from a database (not shown) are input into the learning device 811 and are supplied to the learner image generator 821 and the generator 823. Parameters h and v are also input into the learning device 811 and are supplied to the learner image generator 821 and the generator 823.

The learner image generator 821 is formed of, for example, a low-pass filter. The learner image generator 821 decreases the quality of a supervisor image, which is an artificial image, obtained from a database (not shown) in accordance with the parameters h and v, thereby generating a learner image for each combination of parameters h and v. The learner image generator 821 supplies the generated learner image to the classification unit 822 and the generator 823.

The configuration of the classification unit 822 is similar to that of the classification portion 651 shown in FIG. 41 of the artificial-image prediction unit 114. The classification unit 822 sequentially selects the pixels forming the supervisor image as the subject supervisor pixels, and extracts, from the learner image, class taps having the same tap structure as the class taps (FIG. 42) extracted by the class tap extracting portion 671 shown in FIG. 41 for each subject supervisor pixel.

The classification unit 822 calculates the adjacent difference absolute value of each set of adjacent pixels among the pixels forming the class taps, and performs one-bit ADRC processing on the adjacent difference absolute values. The classification unit 822 determines the resulting bit string as the class of the subject supervisor pixel, and supplies the determined class to the generator 823.

The generator 823 establishes the normal equations expressed by equation (21) for each combination of externally input parameters h and v and for each class supplied from the classification unit 822 by using learning pairs, and supplies the normal equations to the coefficient generator 824. The learning pairs are formed of a supervisor image and the learner images supplied from the learner image generator 821 and are used for learning prediction coefficients.

The coefficient generator 824 solves the normal equations supplied from the generator 823 for each combination of parameters h and v and for each class to determine the prediction coefficient $W_{vhn}$ for each combination of parameters h and v and for each class, and outputs the prediction coefficient $W_{vhn}$ to the normal equation generator 825.

The normal equation generator 825 generates normal equations expressed by equation (33) for each class based on the prediction coefficient $W_{vhn}$, and outputs the generated normal equations to the coefficient seed determining unit 826. The coefficient seed determining unit 826 solves the normal equations to determine the coefficient seed $w_{n,k}$ and stores it in the coefficient seed memory 827. The coefficient seed $w_{n,k}$ stored in the coefficient seed memory 827 is to be stored in the coefficient seed memory 652 shown in FIG. 40.

Figure 48:
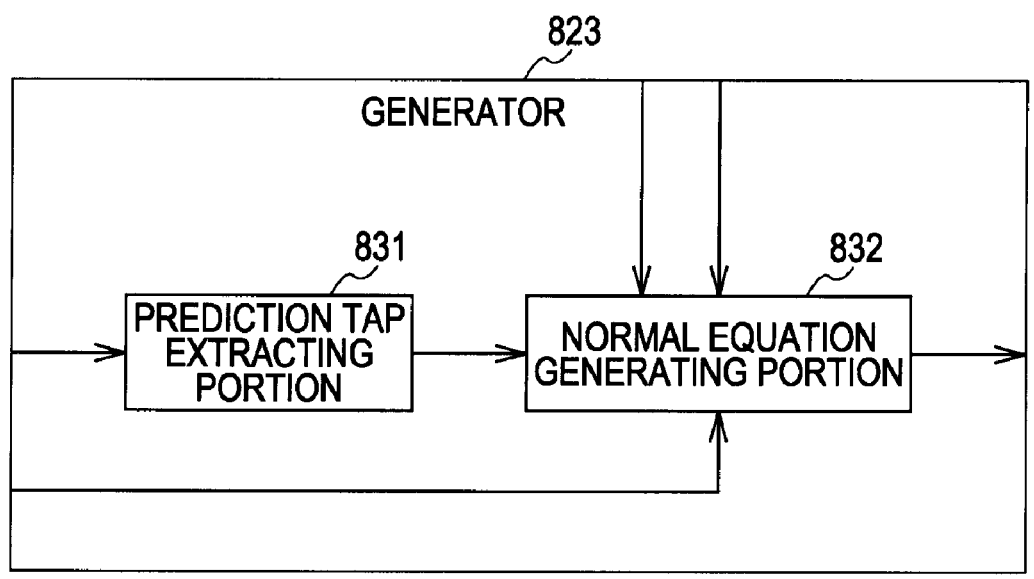
FIG. 48 is a block diagram illustrating the detailed configuration of a generator.
Figure 49:
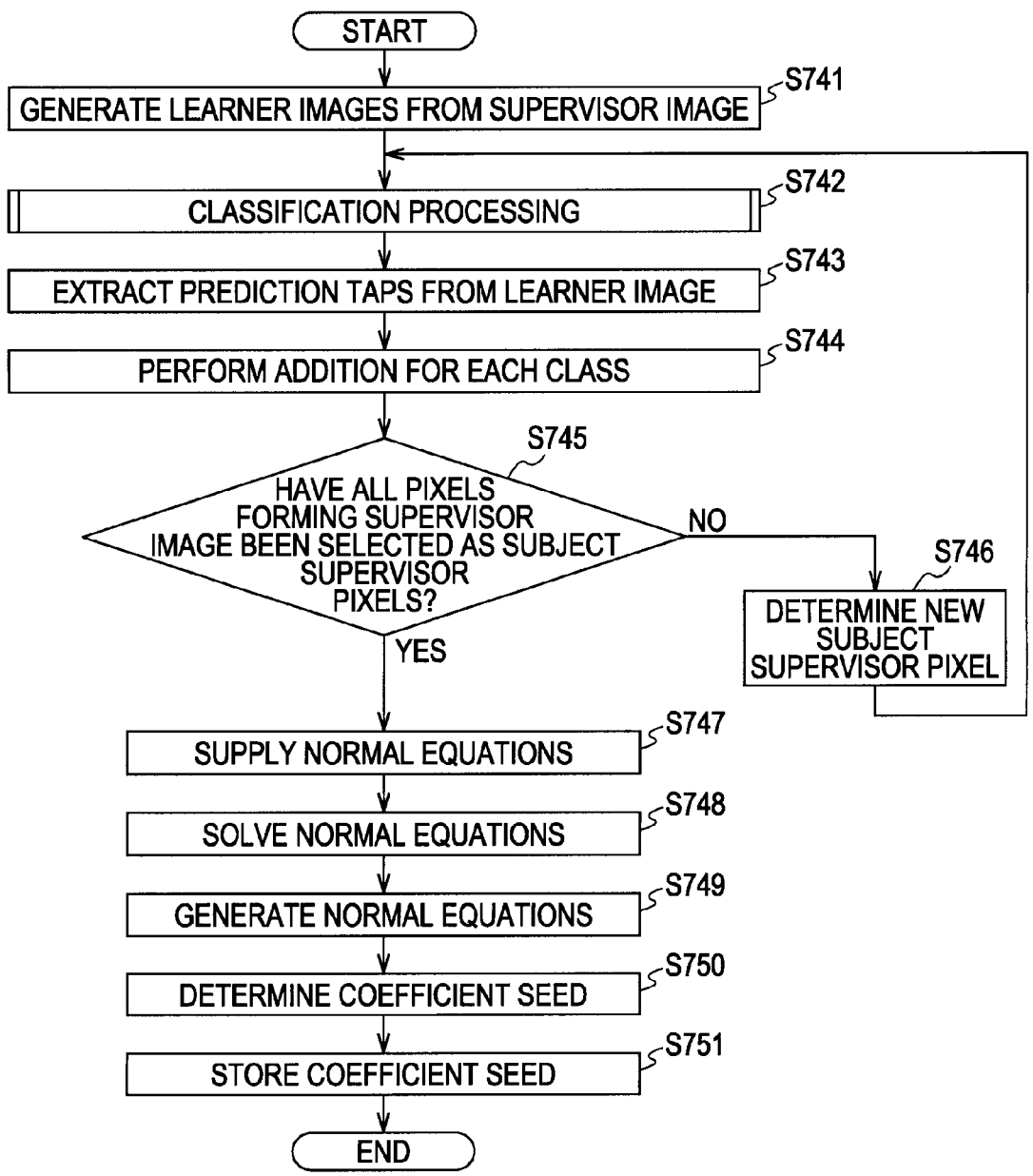
FIG. 49 is a flowchart illustrating another example of learning processing.

FIG. 48 is a block diagram illustrating the detailed configuration of the generator 823 shown in FIG. 47.

The generator 823 shown in FIG. 48 includes a prediction tap extracting portion 831 and a normal equation generating portion 832.

The learner image and the supervisor image of a learning pair input into the generator 823 are supplied to the prediction tap extracting portion 831 and the normal equation generating portion 832, respectively.

The prediction tap extracting portion 831 sequentially selects the pixels forming the supervisor image of the learning pair as the subject supervisor pixels. The prediction tap extracting portion 831 then extracts, from the learner image of the learning pair, prediction taps having the same tap structure as the prediction taps (FIG. 44) extracted by the prediction tap extracting portion 691 shown in FIG. 43, and supplies the prediction taps to the normal equation generating portion 832.

The normal equation generating portion 832 extracts the subject supervisor pixel from the supervisor image, and performs addition processing on the subject supervisor pixel and the learner image forming the prediction taps extracted for the subject supervisor pixel for each combination of externally input parameters h and v and for each class supplied from the classification unit 822.

The normal equation generating portion 832 performs the above-described addition processing by setting all the pixels forming the supervisor image input into the learning device 811 as the subject supervisor pixels to establish the normal equations expressed by equation (21) for each class, and then supplies the normal equations to the coefficient generator 824 shown in FIG. 47.

The learning processing performed by the learning device 811 shown in FIG. 47 is described below with reference to the flowchart in FIG. 49.

In step S741, the learner image generator 821 generates learner images from an input supervisor image in accordance with externally input parameters h and v, and supplies the generated learner images to the classification unit 822 and the generator 823.

Figure 46:
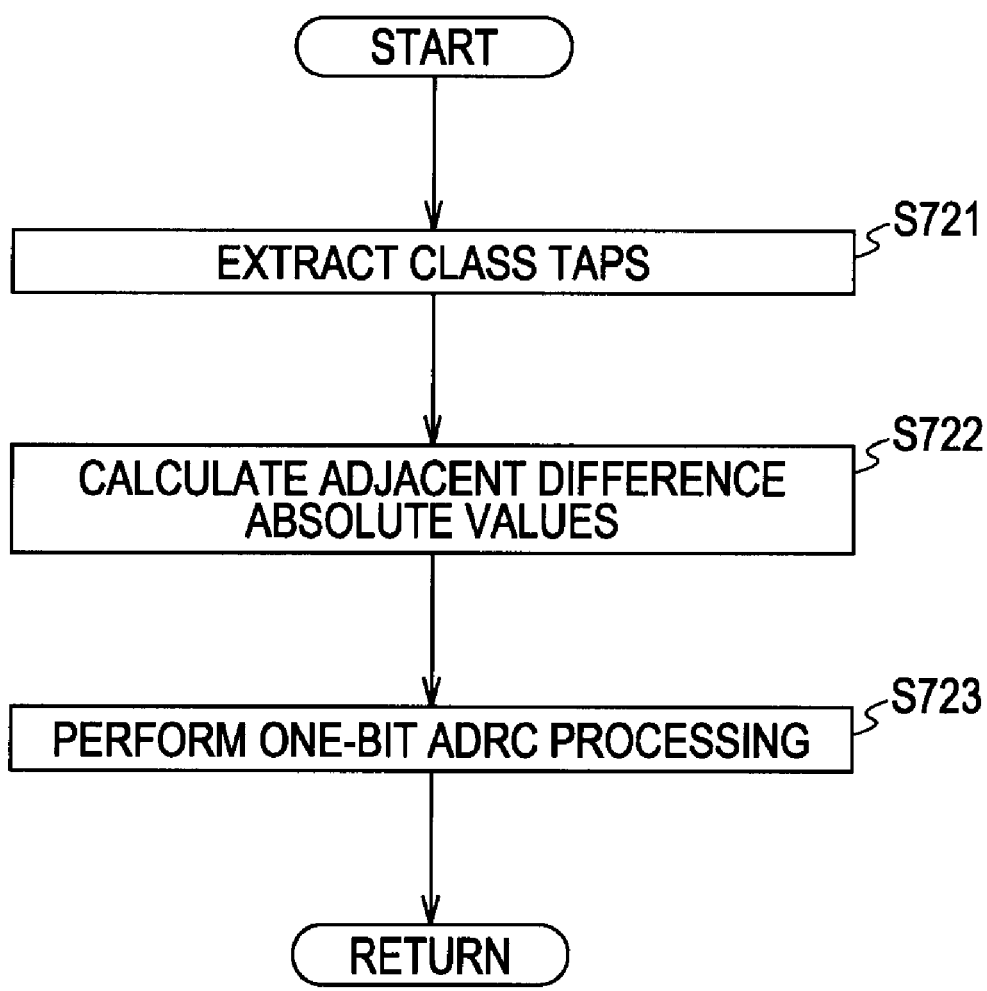
FIG. 46 is a flowchart illustrating classification processing.

In step S742, the classification unit 822 performs classification processing, as in the classification processing shown in FIG. 46, for classifying a predetermined subject supervisor pixel of the supervisor image in accordance with the phase of the learner image associated with the subject supervisor pixel. The classification unit 822 supplies the determined class to the normal equation generating portion 832 (FIG. 48) of the generator 823.

In step S743, the prediction tap extracting portion 831 shown in FIG. 48 extracts prediction taps for the subject supervisor pixel from the learner image supplied from the learner image generator 821, and supplies the extracted prediction taps to the normal equation generating portion 832.

In step S744, the normal equation generating portion 832 extracts the subject supervisor pixel from the input supervisor image, and performs addition processing expressed by equation (21) on the subject supervisor pixel and the learner image forming the associated prediction taps supplied from the prediction tap extracting portion 831 for each combination of parameters h and v and for each class supplied from the classification unit 822.

In step S745, the classification unit 822 determines whether all the pixels forming the supervisor image have been selected as the subject supervisor pixels. If it is determined in step S745 that not all the pixels have been selected as the subject supervisor pixels, the process proceeds to step S746. In step S746, the prediction tap extracting portion 831 selects a pixel of the supervisor image which has not been selected as the next subject supervisor pixel, and then returns to step S742. Steps S742 and the subsequent steps are repeated.

If it is determined in step S745 that all the pixels forming the supervisor image have been selected as the subject supervisor pixels, the process proceeds to step S747. In step S747, the normal equation generating portion 832 supplies the matrix on the left side and the vector on the right side in equation (21) for each combination of parameters h and v and for each class to the coefficient generator 824 as the normal equations.

In step S748, the coefficient generator 824 solves the normal equations containing the matrix on the left side and the vector on the right side in equation (21) for each combination of parameters h and v and for each class to determine the prediction coefficient $W_{vhn}$ for each combination of parameters h and v and for each class. The coefficient generator 824 then supplies the determined prediction coefficient $W_{vhn}$ to the normal equation generator 825.

In step S749, the normal equation generator 825 generates normal equations expressed by equation (33) for each class based on the prediction coefficient $W_{vhn}$, and outputs the normal equations to the coefficient seed determining unit 826. In step S750, the coefficient seed determining unit 826 solves the normal equations expressed by equation (33) for each class to determine the coefficient seed $w_{n,k}$ for each class. In step S751, the coefficient seed $w_{n,k}$ is stored in the coefficient seed memory 827 and is also stored in the coefficient seed memory 652 shown in FIG. 40.

As discussed above, the artificial-image prediction unit 114 predicts a high-quality artificial image by using a prediction coefficient generated from a coefficient seed obtained by conducting learning using an artificial image. It is thus possible to enhance the quality of the artificial image components contained in the HD image supplied from the output phase converter 112.

Additionally, the artificial-image prediction unit 114 classifies subject pixels in accordance with the positions of the edges of class taps as the feature of the phase. With this arrangement, the subject pixels of an artificial image having small number of grayscale levels and distinct phase information can be accurately classified. Accordingly, the artificial-image prediction unit 114 can predict a high-quality artificial image from an HD image by using a prediction coefficient generated from a coefficient seed obtained by conducting learning for each class. As a result, it is possible to output a higher-quality artificial image.

The synthesizer 116 then combines the pixel values of the pixels of the high-quality natural image output from the natural-image prediction unit 113 with those of the high-quality artificial image output from the artificial-image prediction unit 114 in accordance with the degrees of artificiality, and then outputs the synthesized image.

That is, the synthesizer 116 disposes the HD image converted by the natural-image prediction unit 113 in the natural image area of the HD image output from the output phase converter 112 and the HD image converted by the artificial-image prediction unit 114 in the artificial image area of the HD image. As a result, the image conversion device 101 can output the high-quality HD image.

In the above-described example, although learning is conducted on coefficient seeds, prediction coefficient themselves may be learned. In this case, the natural-image prediction unit 113 and the artificial-image prediction unit 114 perform prediction by using the prediction coefficients themselves obtained by learning.

The above-described series of processing operations may be executed by hardware or software. If software is used, a corresponding software program is installed into, for example, a general-purpose computer.

Figure 50:
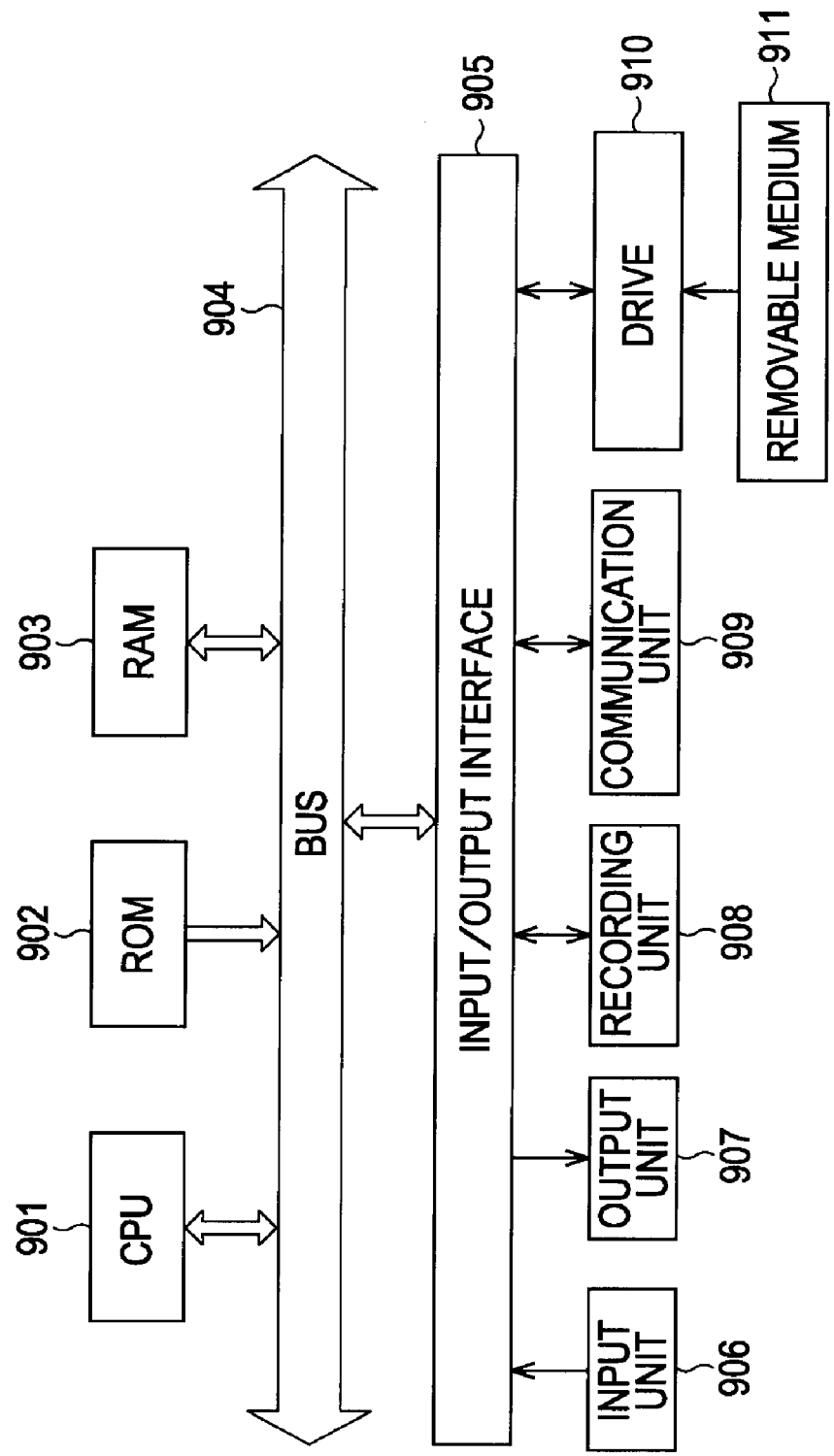
FIG. 50 is a block diagram illustrating the configuration of a computer implementing the image conversion device.

FIG. 50 is a block diagram illustrating an example of the configuration of a computer into which a program executing the above-described series of processing operations is installed.

The program may be recorded on a recording unit 908 or a read only memory (ROM) 902 as a recording medium built in the computer.

Alternatively, the program may be temporarily or permanently recorded on a removable medium 911, such as a flexible disk, a compact disc read only memory (CD-ROM), a magneto-optical (MD) disk, a digital versatile disc (DVD), a magnetic disk, or a semiconductor memory. The removable medium 911 can be provided as so-called "package media".

Instead of installing the program into the removable medium 911, the program may be wirelessly transferred into the computer via a digital-broadcasting artificial satellite or transferred by wired means via a network, such as a local area network (LAN) or the Internet, from a download site. The computer may then receive the transferred program by a communication unit 909 and installs the program into the built-in recording unit 908.

The computer includes a central processing unit (CPU) 901. An input/output interface 905 is connected to the CPU 901 with a bus 904 therebetween. In response to an instruction input from a user via the input/output interface 905 by operating an input unit 906 including a keyboard, a mouse, or a microphone, the CPU 901 executes the program stored in the ROM 902. Alternatively, the CPU 901 executes the program stored in the recording unit 908, the program installed in the recording unit 908 by being transferred from a satellite or a network and received by the communication unit 909, or the program loaded into a random access memory (RAM) 903 by being read from the removable medium 911 installed in a drive 910 and being installed into the recording unit 908.

The CPU 901 then executes the processing indicated by the above-described flowcharts or the processing by using the blocks shown in the corresponding drawings. If necessary, the CPU 901 then outputs processing results from an output unit 907 including a liquid crystal display (LCD) or a speaker via the input/output interface 905 or sends the processing results from the communication unit 909 or records them on the recorder 908 via the input/output interface 905.

In this specification, steps forming the program for allowing a computer to execute various processing operations may be executed in chronological order indicated in the flowcharts. Alternatively, they may be executed in parallel or individually (for example, parallel processing or object processing).

To process the program, central processing using a single computer or distributed processing using a plurality of computers may be performed. The program may be transferred to a remote computer and be executed.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   conversion means for converting a standard definition interlace image including a first number of pixels into a first standard definition progressive image;
   interpolation means for interpolating the first standard definition progressive image to generate a first high definition progressive image including a second number of pixels, higher than the first number of pixels, which are equal to a number of pixels of a target high definition image;
   classification means for classifying, in accordance with a feature of the first high definition progressive image, into classes, subject pixels forming a second high definition progressive image, which serves as the target high definition image, including the second number of pixels and having a quality higher than the first high definition progressive image, the second high definition progressive image being determined from the first high definition progressive image;
   storage means for storing a prediction coefficient for each of the classes, the prediction coefficient being obtained by conducting learning using a plurality of high definition progressive images, each including the second number of pixels; and
   computation means for performing computation using the first high definition progressive image and the prediction coefficient for each of the classes into which the subject pixels are classified to determine the second high definition progressive image, which serves as the target high definition image, from the first high definition progressive image, wherein the conversion means includes,
      interlace-progressive conversion means for converting the standard definition interlace image into a progressive intermediate image,
      motion-vector detection means for detecting motion vectors and macro-block differences of the standard definition interlace image by using, as a minimum unit, a distance shorter than an interval between pixels forming the progressive intermediate image, cyclic-coefficient setting means for setting, based on a vertical motion, which is a vertical component of each of the motion vectors, a first cyclic coefficient for a first type of pixel that is located at a position where a pixel forming the standard definition interlace image exists, the first cyclic coefficient calculated by using the corresponding motion vector and the macro-block difference, and a second cyclic coefficient for a second type of pixel, which is located at a position where a pixel forming the standard definition interlace image does not exist, the second cyclic coefficient calculated by using the corresponding motion vector and the macro-block difference, motion compensation means for motion-compensating, on a basis of the motion vectors, a past first progressive image to generate a motion-compensated image, and output image generating means for generating the first standard definition progressive image by adding pixel values of the first type of pixels located at corresponding positions of the intermediate image and the motion-compensated image by using the first cyclic coefficients as weights and by adding pixel values of the second type of pixels located at corresponding positions of the intermediate image and the motion-compensated image by using the second cyclic coefficients as weights.

2. The image processing apparatus according to claim 1, wherein the computation means includes a means for predicting a natural image of the first high definition progressive image, a means for predicting an artificial image of the first high definition progressive image, a means for determining a ratio between the natural image and the artificial image of the first high definition progressive image, and a means for synthesizing an output from the means for predicting the natural image and the means for predicting the artificial image based on the determined ratio to form the second high definition image.

3. An image processing method comprising the steps of:
converting a standard definition interlace image including a first number of pixels into a first standard definition progressive image;
generating a first high definition progressive image including a second number of pixels, higher than the first number of pixels, which are equal to a number of pixels of a target image by interpolating the first standard definition progressive image;
classifying, in accordance with a feature of the first high definition progressive image, into classes, subject pixels forming a second high definition progressive image, which serves as the target high definition image, including the second number of pixels and having a quality higher than the first high definition progressive image, the second high definition progressive image being determined from the first high definition progressive image; and
determining the second high definition progressive image, which serves as the target high definition image, from the first high definition progressive image by performing computation using the first high definition progressive image and a prediction coefficient for each of the classes into which the subject pixels are classified among prediction coefficients obtained by conducting learning using a plurality of high definition progressive images, each including the second number of pixels, wherein said step of converting includes,
converting the standard definition interlace image into a progressive intermediate image,
detecting motion vectors and macro-block differences of the standard definition interlace image by using, as a minimum unit, a distance shorter than an interval between pixels forming the progressive intermediate image,
setting, based on a vertical motion, which is a vertical component of each of the motion vectors, a first cyclic coefficient for a first type of pixel that is located at a position where a pixel forming the standard definition interlace image exists, the first cyclic coefficient calculated by using the corresponding motion vector and the macro-block difference, and a second cyclic coefficient for a second type of pixel, which is located at a position where a pixel forming the standard definition interlace image does not exist, the second cyclic coefficient calculated by using the corresponding motion vector and the macro-block difference,
motion-compensating, on a basis of the motion vectors, a past first progressive image to generate a motion-compensated image, and
generating the first standard definition progressive image by adding pixel values of the first type of pixels located at corresponding positions of the intermediate image and the motion-compensated image by using the first cyclic coefficients as weights and by adding pixel values of the second type of pixels located at corresponding positions of the intermediate image and the motion-compensated image by using the second cyclic coefficients as weights.

4. A non-transitory computer readable medium having computer instructions recorded thereon, the computer instructions configured to perform a method when executed on a computer, the method comprising the steps of:
converting a standard definition interlace image including a first number of pixels into a first standard definition progressive image;
generating a first high definition progressive image including a second number of pixels, higher than the first number of pixels, which are equal to a number of pixels of a target high definition image by interpolating the first standard definition progressive image;
classifying, in accordance with a feature of the first high definition progressive image, into classes, subject pixels forming a second high definition progressive image, which serves as the target high definition image, including the second number of pixels and having a quality higher than the first high definition progressive image, the second high definition progressive image being determined from the first high definition progressive image; and
determining the second high definition progressive image, which serves as the target high definition image, from the first high definition progressive image by performing computation using the first high definition progressive image and a prediction coefficient for each of the classes into which the subject pixels are classified among prediction coefficients obtained by conducting learning using a plurality of high definition progressive images, each including the second number of pixels, wherein said step of converting includes,
converting the standard definition interlace image into a progressive intermediate image, detecting motion vectors and macro-block differences of the standard definition interlace image by using, as a minimum unit, a distance shorter than an interval between pixels forming the progressive intermediate image, setting, based on a vertical motion, which is a vertical component of each of the motion vectors, a first cyclic coefficient for a first type of pixel that is located at a position where a pixel forming the standard definition interlace image exists, the first cyclic coefficient calculated by using the corresponding motion vector and the macro-block difference, and a second cyclic coefficient for a second type of pixel, which is located at a position where a pixel forming the standard definition interlace image does not exist, the second cyclic coefficient calculated by using the corresponding motion vector and the macro-block difference, motion-compensating, on a basis of the motion vectors, a past first progressive image to generate a motion-compensated image, and generating the first standard definition progressive image by adding pixel values of the first type of pixels located at corresponding positions of the intermediate image and the motion-compensated image by using the first cyclic coefficients as weights and by adding pixel values of the second type of pixels located at corresponding positions of the intermediate image and the motion-compensated image by using the second cyclic coefficients as weights.

5. An image processing apparatus comprising:

a converter configured to convert a standard definition interlace image including a first number of pixels into a first standard definition progressive image;

an interpolator configured to interpolate the first standard definition progressive image to generate a first high definition progressive image including a second number of pixels, higher than the first number of pixels, which are equal to a number of pixels of a target high definition image;

a classification unit configured to classify, in accordance with a feature of the first high definition progressive image, into classes, subject pixels forming a second high definition progressive image, which serves as the target high definition image, including the second number of pixels and having a quality higher than the first high definition progressive image, the second high definition progressive image being determined from the first high definition progressive image;

a storage unit configured to store a prediction coefficient for each of the classes, the prediction coefficient being obtained by conducting learning using a plurality of high definition progressive images, each including the second number of pixels; and a computation unit configured to perform computation using the first high definition progressive image and the prediction coefficient for each of the classes into which the subject pixels are classified to determine the second high definition progressive image, which serves as the target high definition image, from the first high definition progressive image, wherein the converter includes, an interlace-progressive converter configured to convert the standard definition interlace image into a progressive intermediate image, a motion-vector detector configured to detect motion vectors and macro-block differences of the standard definition interlace image by using, as a minimum unit, a distance shorter than an interval between pixels forming the progressive intermediate image, a cyclic-coefficient setting unit configured to set, based on a vertical motion, which is a vertical component of each of the motion vectors, a first cyclic coefficient for a first type of pixel that is located at a position where a pixel forming standard definition the interlace image exists, the first cyclic coefficient calculated by using the corresponding motion vector and the macro-block difference, and a second cyclic coefficient for a second type of pixel, which is located at a position where a pixel forming the standard definition interlace image does not exist, the second cyclic coefficient calculated by using the corresponding motion vector and the macro-block difference, a motion compensator configured to motion-compensate, on a basis of the motion vectors, a past first progressive image to generate a motion-compensated image, and an output image generator configured to generate the first standard definition progressive image by adding pixel values of the first type of pixels located at corresponding positions of the intermediate image and the motion-compensated image by using the first cyclic coefficients as weights and by adding pixel values of the second type of pixels located at corresponding positions of the intermediate image and the motion-compensated image by using the second cyclic coefficients as weights.

* * * * *